US012103165B2

(12) United States Patent
Kato et al.

(10) Patent No.: US 12,103,165 B2
(45) Date of Patent: Oct. 1, 2024

(54) ACTUATOR APPARATUS, OBJECT TAKING-OUT METHOD USING ACTUATOR APPARATUS, AND OBJECT TAKING-OUT SYSTEM

(71) Applicant: Panasonic Corporation, Osaka (JP)

(72) Inventors: Yusuke Kato, Chiba (JP); Jun Ozawa, Nara (JP)

(73) Assignee: PANASONIC HOLDINGS CORPORATION, Osaka (JP)

(*) Notice: Subject to any disclaimer, the term of this patent is extended or adjusted under 35 U.S.C. 154(b) by 1049 days.

(21) Appl. No.: 17/020,176

(22) Filed: Sep. 14, 2020

(65) Prior Publication Data
US 2020/0406476 A1 Dec. 31, 2020

Related U.S. Application Data

(63) Continuation of application No. PCT/JP2019/015093, filed on Apr. 5, 2019.

(30) Foreign Application Priority Data

Apr. 26, 2018 (JP) ................................. 2018-085411
Jan. 23, 2019 (JP) ................................. 2019-009661

(51) Int. Cl.
B25J 15/06 (2006.01)
B25J 9/16 (2006.01)
(Continued)

(52) U.S. Cl.
CPC ......... *B25J 15/0616* (2013.01); *B25J 9/1612* (2013.01); *B25J 13/085* (2013.01); *B65G 65/005* (2013.01); *B65G 65/34* (2013.01)

(58) Field of Classification Search
CPC .... B25J 15/0616; B25J 9/1612; B25J 13/085; B65G 65/005; B65G 65/34
See application file for complete search history.

(56) References Cited

U.S. PATENT DOCUMENTS 8,473,094 B2 * 6/2013 Becker ................. B65G 47/918
414/796
9,108,322 B2 * 8/2015 Chisholm ......... H01L 21/68742
(Continued)

FOREIGN PATENT DOCUMENTS

JP   H09262786 A  * 10/1997
JP   2003-225880       8/2003
(Continued)

OTHER PUBLICATIONS

"Herzog, A. et al; Template-based learning of grasp selection; 2012, 2012 IEEE international conference on robotics and automation" (Year: 2012).*

(Continued)

*Primary Examiner* — Russell Frejd
*Assistant Examiner* — Christopher R Cardimino
(74) *Attorney, Agent, or Firm* — Wenderoth, Lind & Ponack, L.L.P.

(57) ABSTRACT

An actuator apparatus includes an actuator, a setter, an operation controller, and an acquirer. The operation controller is configured to control the actuator to take out an object from a placement table. The actuator includes a suction nozzle configured to suck and hold the object. The acquirer is configured to acquire a difference between a first moment applied to the suction nozzle and a second moment applied to the suction nozzle when the object is taken out by the suction nozzle by a first taking-out movement distance. The operation controller is configured to control whether or not to further continue taking-out the object, based on the difference between the first moment and the second moment.

16 Claims, 52 Drawing Sheets

(51) Int. Cl.
  *B25J 13/08* (2006.01)
  *B65G 65/00* (2006.01)
  *B65G 65/34* (2006.01)

(56) References Cited

U.S. PATENT DOCUMENTS

| | | | |
|---|---|---|---|
| 9,126,337 B2 * | 9/2015 | Iwatake | B25J 9/1694 |
| 9,327,397 B1 * | 5/2016 | Williams | B25J 3/04 |
| 10,124,489 B2 * | 11/2018 | Chitta | B25J 9/1687 |
| 10,730,708 B2 * | 8/2020 | Otsuru | B65G 61/00 |
| 2014/0316573 A1 | 10/2014 | Iwatake | |
| 2016/0207195 A1 | 7/2016 | Eto et al. | |

FOREIGN PATENT DOCUMENTS

| | | |
|---|---|---|
| JP | 5327722 B2 * | 10/2013 |
| JP | 2014-210310 | 11/2014 |
| JP | 2016-028836 | 3/2016 |
| JP | 2016-132521 | 7/2016 |
| JP | 2017-064910 | 4/2017 |
| KR | 100760300 B1 * | 9/2007 |

OTHER PUBLICATIONS

"Krug, R. et al; The Next Step in Robot Commissioning: Autonomous Picking & Palletizing; Jan. 2016; IEEE Robotics and Automation Letters" (Year: 2016).*

"Nakamoto, H; A Gripper System for Robustly Picking Various Objects Placed Densely by Suction and Pinching; Oct. 1, 2018; 2018 IEEE/RSJ International Conference on Intelligent Robots and Systems (IROS)" (Year: 2018).*

Extended European Search Report issued May 26, 2021 in European Application No. 19793873.1.

International Search Report of PCT application No. PCT/JP2019/015093 dated Jul. 2, 2019.

* cited by examiner

FIG. 3G

| | Fx [N] | Fy [N] | Fz [N] | Mx [Nm] | My [Nm] | Mz [Nm] |
|---|---|---|---|---|---|---|
| 1 | -0.8291 | 0.778209 | 24.34264 | -0.05217 | -0.25226 | -0.03165 |
| 2 | -0.8291 | 0.778209 | 24.34264 | -0.05217 | -0.25226 | -0.03165 |
| 3 | -0.30874 | 0.59382 | 24.1908 | -0.04671 | -0.25471 | -0.02737 |
| 4 | -0.73727 | 0.716746 | 24.25153 | -0.04671 | -0.25532 | -0.01575 |
| 5 | -0.64544 | 1.116254 | 24.49447 | -0.05156 | -0.24921 | -0.00536 |
| ... | ... | ... | ... | ... | ... | ... |

FIG. 3H

| | Fx [N] | Fy [N] | Fz [N] | Mx [Nm] | My [Nm] | Mz [Nm] |
|---|---|---|---|---|---|---|
| 1 | 1.21429 | 0.215974 | 10.29014 | -0.66064 | -0.00375 | -0.01645 |
| 2 | 1.27339 | 0.243219 | 10.20086 | -0.65097 | -0.04811 | -0.0154 |
| 3 | 1.52806 | 0.225134 | 10.08121 | -0.65264 | -0.09161 | -0.01304 |
| 4 | 1.54921 | 0.184027 | 10.04614 | -0.66259 | -0.07918 | -0.01218 |
| 5 | 1.48948 | 0.164444 | 10.12354 | -0.66402 | -0.07432 | -0.01259 |
| ... | ... | ... | ... | ... | ... | ... |

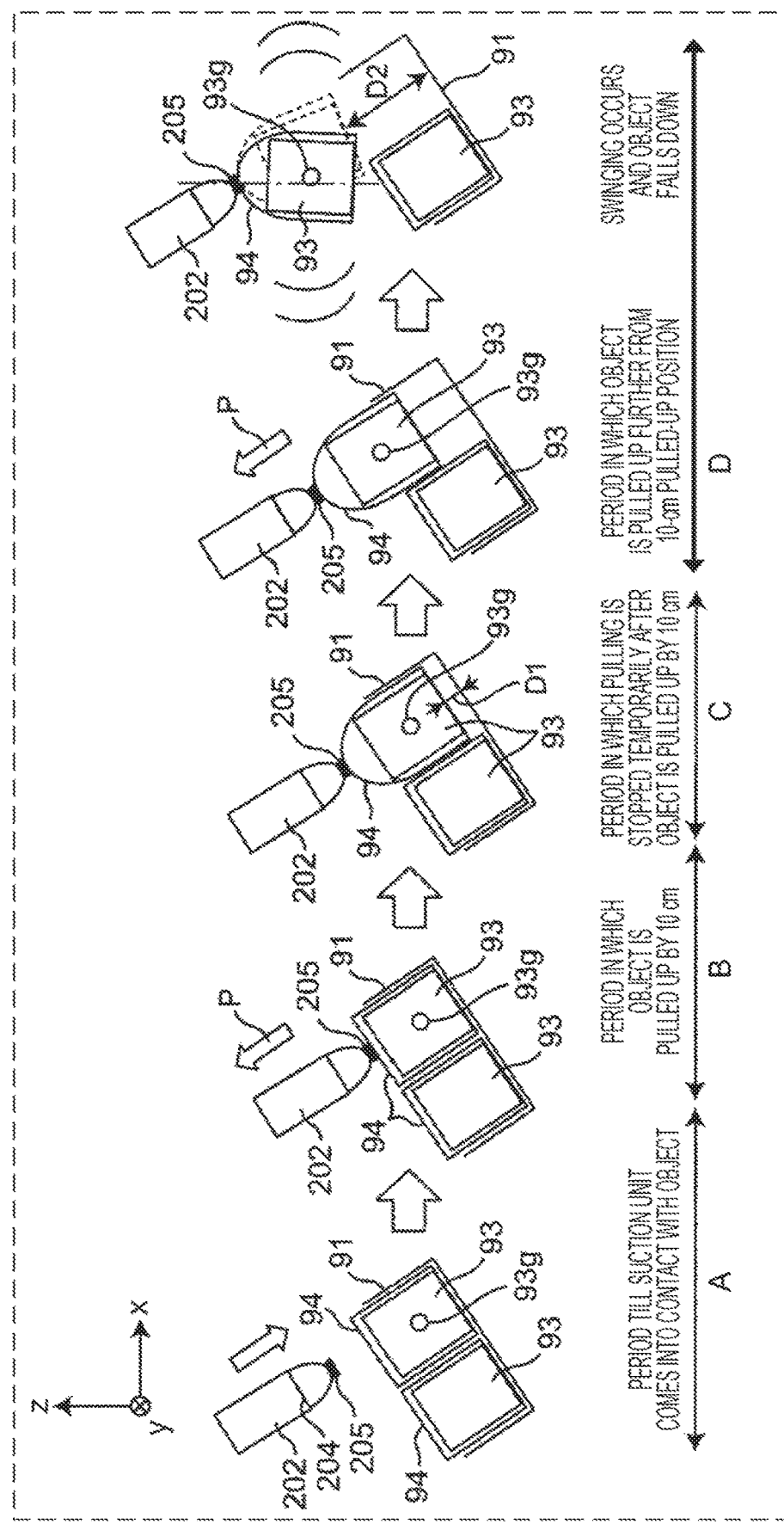

FIG. 7

| INCLINATION θ OF OBJECT | OPTIMUM MOMENT VALUE | GRAPHICAL REPRESENTATION OF STATE |
|---|---|---|
| 0° (HORIZONTAL) | −0.1 TO 0.1 N · m | θ = 0° |
| 10° | 0.1 TO 0.2 N · m | θ = 10° |
| 20° | 0.2 TO 0.4 N · m | θ = 20° |
| . . . | . . . | |

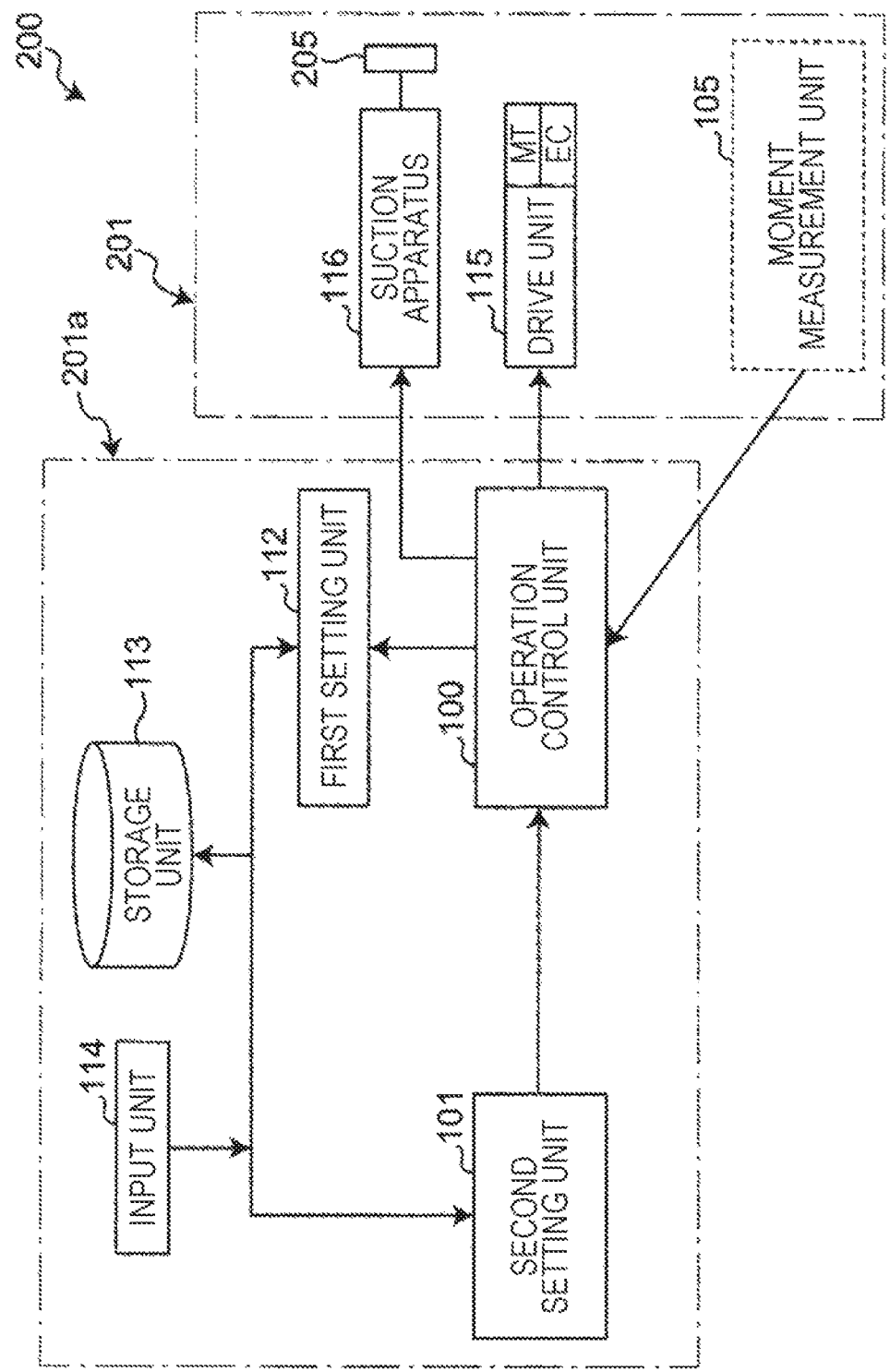

FIG. 9

| OBJECT | | SUCTION POSITION | | | | | | SIZE | | | WEIGHT OF ONE OBJECT [g] |
|---|---|---|---|---|---|---|---|---|---|---|---|
| | | x [m] | y [m] | z [m] | φ [deg] | θ [deg] | ψ [deg] | WIDTH [m] | DEPTH [m] | HEIGHT [m] | |
| A | 1 | 0.5 | 0.16 | 0.34 | 180 | 20 | 180 | 0.16 | 0.17 | 0.14 | 95.0 |
| | 2 | 0.5 | 0.0 | 0.34 | | | | | | | |
| | 3 | 0.5 | -0.16 | 0.34 | | | | | | | |
| | 4 | 0.36 | 0.16 | 0.31 | | | | | | | |
| | 5 | 0.36 | 0.0 | 0.31 | | | | | | | |
| | 6 | 0.36 | -0.16 | 0.31 | | | | | | | |
| B | 1 | 0.62 | 0.19 | 0.44 | 180 | 15 | 180 | 0.12 | 0.38 | 0.20 | 121.0 |
| | 2 | 0.62 | -0.19 | 0.44 | | | | | | | |
| | 3 | 0.50 | -0.19 | 0.42 | | | | | | | |
| | 4 | 0.50 | 0.19 | 0.42 | | | | | | | |
| ... | ... | ... | ... | ... | ... | ... | ... | ... | ... | ... | ... |

FIG. 11A

| ORIGINAL SUCTION POSITION | | |
|---|---|---|
| X | Y | Z |
| X1 | Y1 | Z1 |

FIG. 11B

| SUCTION POSITION NUMBER | CORRECTED SUCTION POSITION | | |
|---|---|---|---|
| | X | Y | Z |
| 1 | X1 | Y1 | Z2 |
| 2 | X2 | Y1 | Z1 |
| 3 | X3 | Y1 | Z2 |
| 4 | X1 | Y2 | Z2 |
| 5 | X1 | Y3 | Z2 |

| ORIGINAL SUCTION POSITION 1-0 | | |
|---|---|---|
| X | Y | Z |
| X1 | Y1 | Z1 |

| SUCTION POSITION NUMBER | CORRECTED SUCTION POSITION | | |
|---|---|---|---|
| | X | Y | Z |
| 1-1 | X4 | Y1 | Z1 |
| 1-2 | X5 | Y1 | Z1 |
| 2-1 | X6 | Y1 | Z1 |
| 2-2 | X7 | Y1 | Z1 |

FIG. 23

| OBJECT ID | HEIGHT (mm) (H) | INTERMEDIATELY TAKING-OUT DISTANCE (mm) (D1) | FULLY TAKING-OUT DISTANCE (mm) (D2) | INCLINATION OF SHELF BOARD ($\theta$) | OPTIMUM MOMENT |
|---|---|---|---|---|---|
| 001 | 100 | 40 | 120 | 0° (HORIZONTAL) | -0.1 TO 0.1 N·m |
|  |  |  |  | 5° | 0.1 TO 0.2 N·m |
|  |  |  |  | 10° | 0.2 TO 0.4 N·m |
| 002 | 120 | 40 | 140 | 0° (HORIZONTAL) | -0.1 TO 0.1 N·m |
|  |  |  |  | 5° | 0.1 TO 0.2 N·m |
|  |  |  |  | 10° | 0.2 TO 0.4 N·m |
| 003 | 110 | 40 | 130 | 0° (HORIZONTAL) | -0.1 TO 0.1 N·m |
|  |  |  |  | 5° | 0.1 TO 0.2 N·m |
|  |  |  |  | 10° | 0.2 TO 0.4 N·m |
| ... | ... |  |  | ... | ... |
| ... | ... |  |  | ... | ... |

FIG. 25

| OBJECT ID | INCLINATION OF SHELF BOARD ($\theta$) | OPTIMUM MOMENT | TIME OF OPERATION EXPERIMENT | SUCTION POSITION (DEVIATION FROM CENTER (mm)) | MOMENT DIFFERENCE $\Delta M$ | SWING |
|---|---|---|---|---|---|---|
| 001 | 0° (HORIZONTAL) | −0.1 TO 0.1 N·m | 2017.2.3 10:45:30 | 0 | 0.03 | ○ |
| | | | 2017.2.3 10:45:50 | 5 | 0.08 | ○ |
| | | | 2017.2.3 10:46:10 | 10 | 0.11 | × |
| | 5° | 0.1 TO 0.2 N·m | 2017.2.3 10:46:30 | 0 | 0.06 | × |
| | | | 2017.2.3 10:46:50 | 5 | 0.10 | ○ |
| | | | 2017.2.3 10:47:10 | 10 | 0.15 | ○ |
| | | | 2017.2.3 10:47:30 | 15 | 0.22 | × |
| | 10° | 0.2 TO 0.4 N·m | 2017.2.3 10:48:10 | 0 | 0.10 | × |
| | | | 2017.2.3 10:48:30 | 5 | 0.14 | × |
| | | | 2017.2.3 10:49:50 | 10 | 0.18 | × |
| | | | 2017.2.3 10:50:10 | 15 | 0.22 | ○ |
| ... | ... | ... | ... | ... | ... | ... |

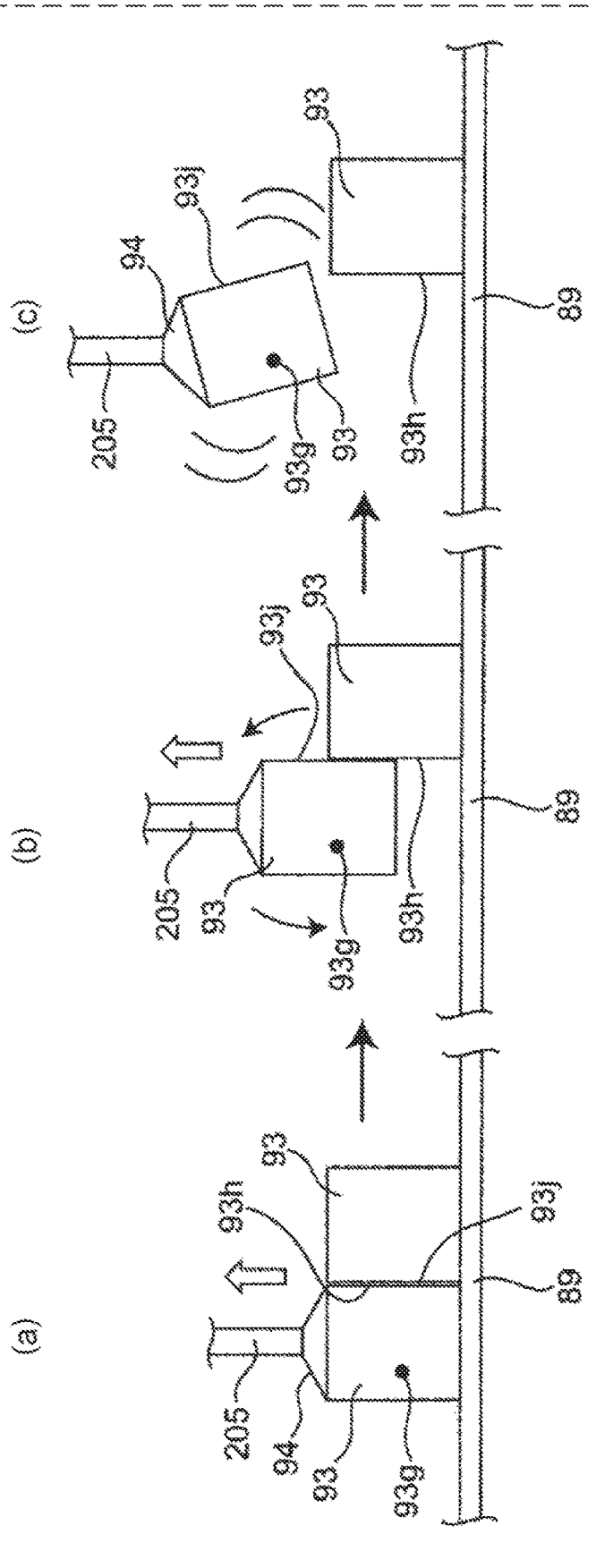

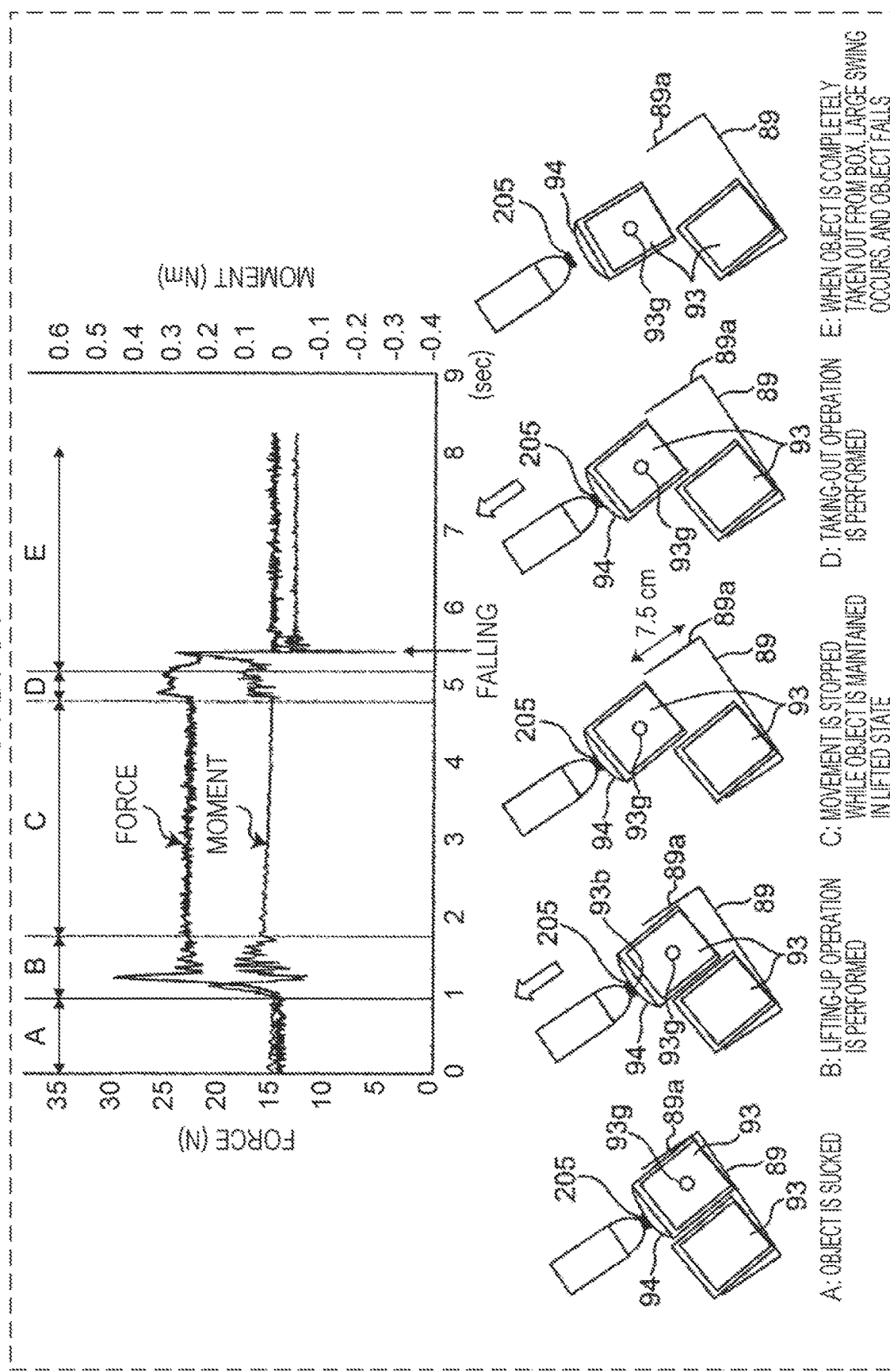

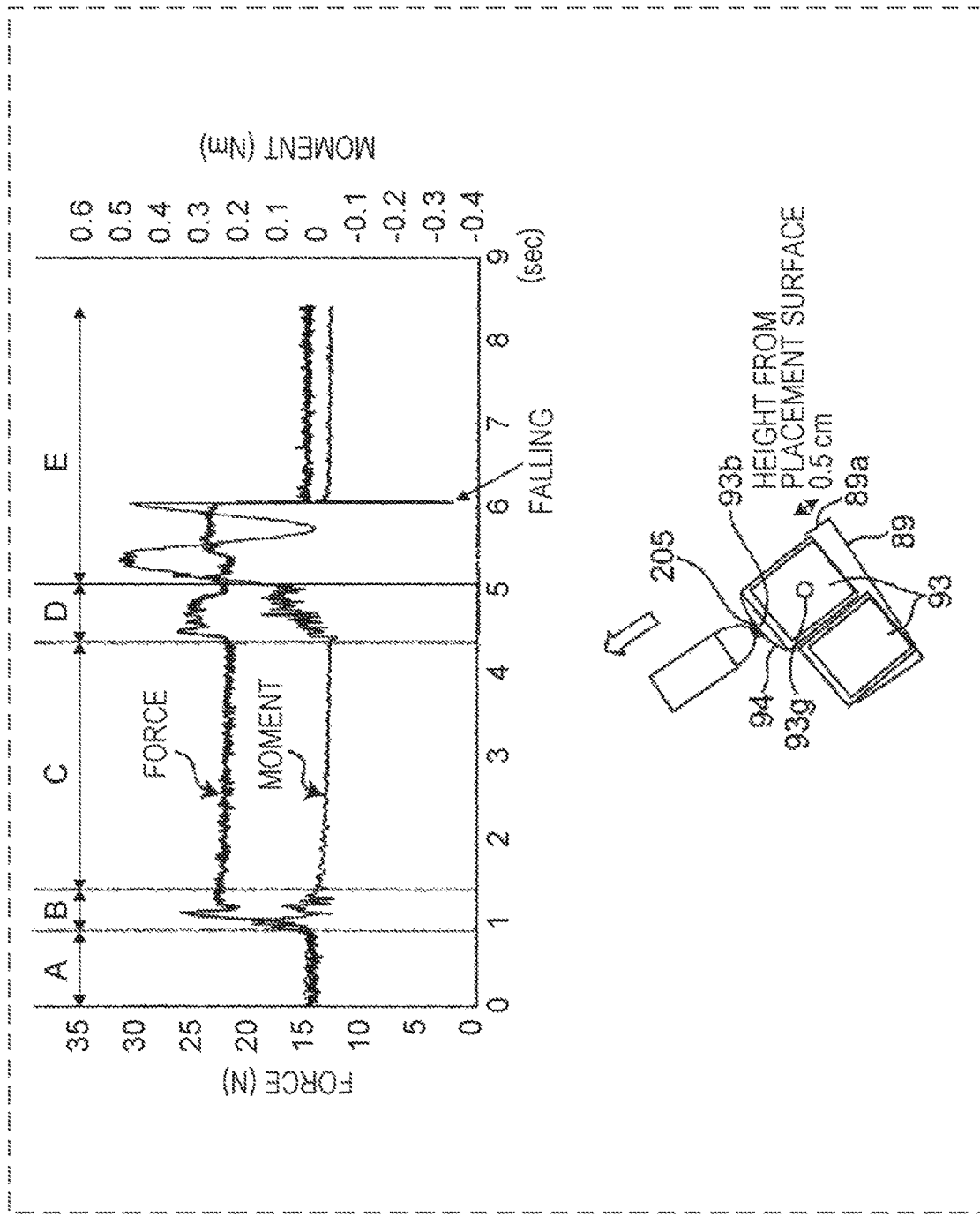

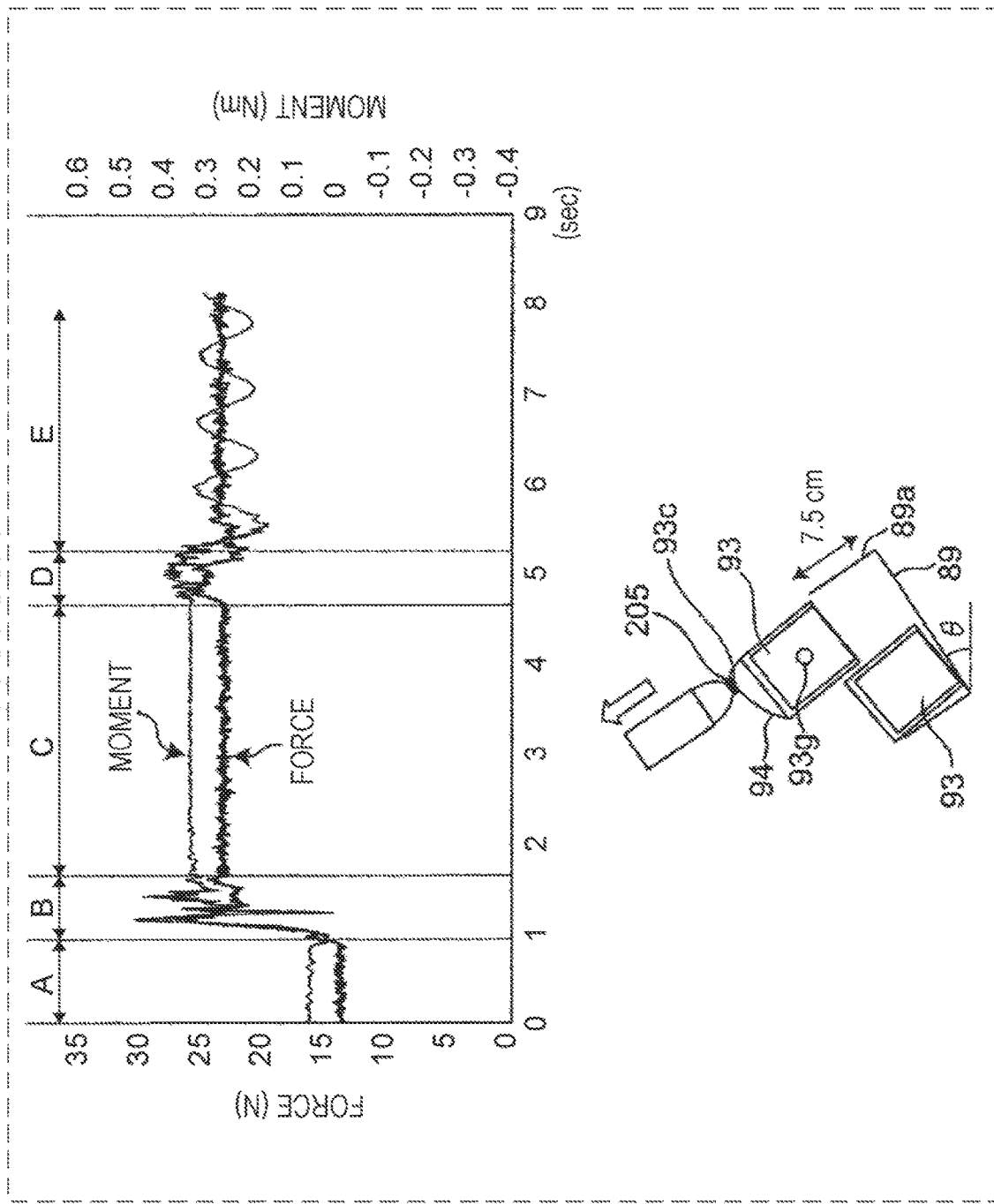

FIG. 34

| STATE OF OBJECT / INCLINATION OF OBJECT | [FIG. 27A] | [FIG. 27G] | [FIG. 27J] |
|---|---|---|---|
| 0° (HORIZONTAL) | −0.1 TO 0.1 N·m | −0.1 TO 0.1 N·m | −0.1 TO 0.1 N·m |
| 10° | 0.05 TO 0.1 N·m | 0.1 TO 0.2 N·m | 0.1 TO 0.3 N·m |
| 20° | 0.1 TO 0.15 N·m | 0.2 TO 0.4 N·m | 0.3 TO 0.5 N·m |
| ... | ... | ... | ... |

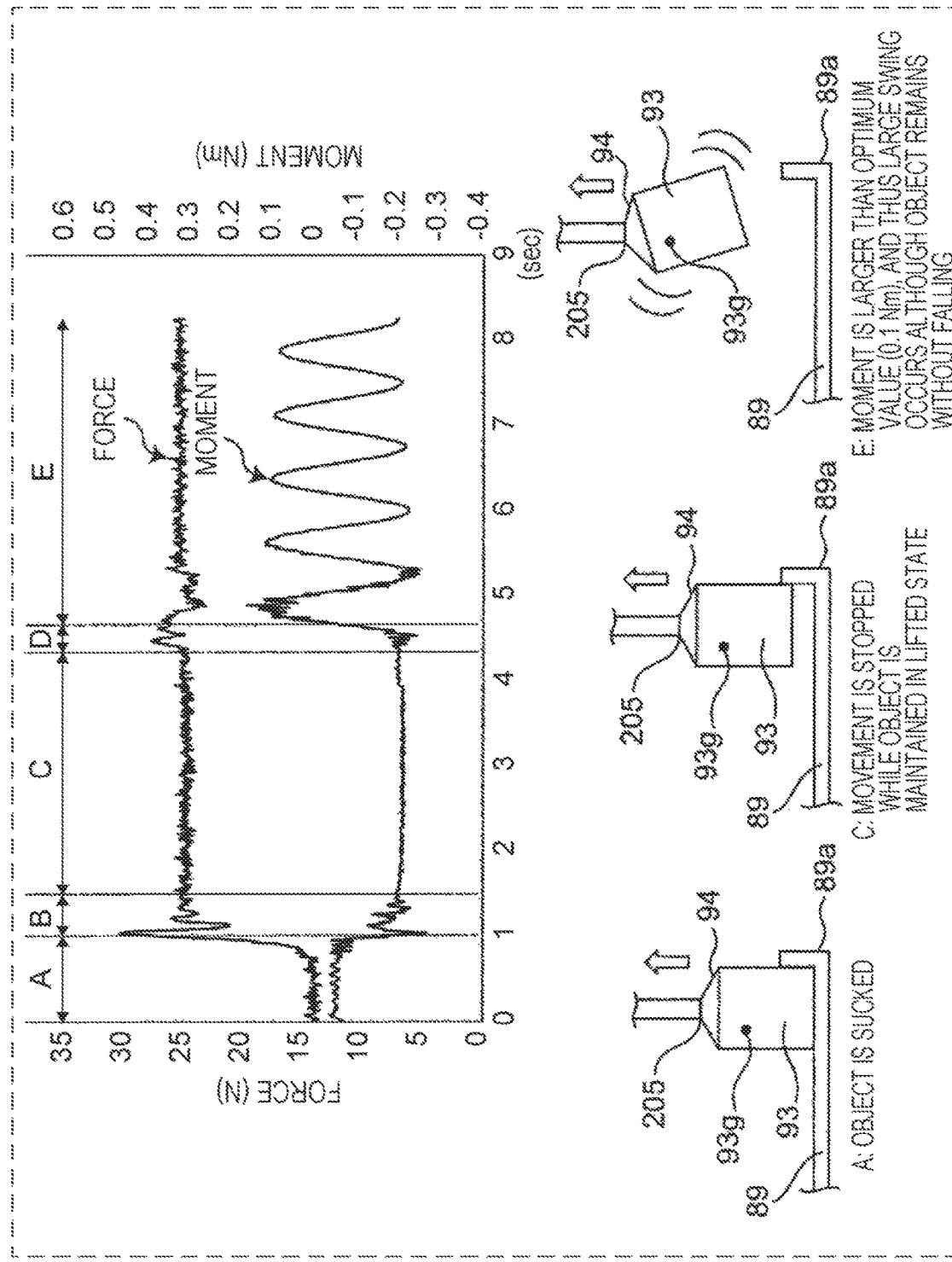

ACTUATOR APPARATUS, OBJECT TAKING-OUT METHOD USING ACTUATOR APPARATUS, AND OBJECT TAKING-OUT SYSTEM

BACKGROUND

1. Technical Field

The present disclosure relates to an actuator apparatus, an object taking-out method using the actuator apparatus, and an object taking-out system, in which an actuator equipped with one suction nozzle holds an object by suction with a nozzle and carries the object in a carrying robot system, and which can perform an object taking-out operation so as to reduce the amount of swing when the object in a packed state is taken out by suction.

2. Description of the Related Art

Conventionally, as a method for causing a robot system to learn an object taking-out operation, a method is known in which a state of an object is observed using a sensor such as a camera, and a human teaches the robot system a position of the object is to be gripped so that the robot system learns the taking-out operation. In the method in which a human teaches the gripping position of an object as described above, it is necessary to again perform teaching depending on the difference in the hands of the robot system. In addition, the gripping position of the object taught by the human may be a position at which the robot system cannot grip the object. Therefore, it is effective that the robot system actually executes the gripping operation and learns the taking-out operation from the result of the operation which may be successful or unsuccessful. As described above, a method of changing a reward function for learning according to the result of the success or failure of the taking-out operation when the robot system actually executes the grasping operation from the observation result of the state of the object has been disclosed (Japanese Unexamined Patent Application Publication No. 2017-64910).

SUMMARY

In the technique disclosed in Japanese Unexamined Patent Application Publication No. 2017-64910, an operation of taking out an object from objects placed in bulk is learned using a robot system having a two-fingered hand. However, in warehouse environments, objects are often packed in line in a single large box rather than placed in bulk. In such a packed state, spaces between the packed objects are small, and it is difficult to hold an object by gripping it with a multi-fingered hand. To handle such a situation, it is effective to hold an object by sucking.

However, in warehouse environments, shelf boards of storage shelves are inclined such that objects can be easily taken out. In the case where the shelf board is inclined as described above, the object is suspended when the object is held by suction and taken out, and the object swings. The swing of the object may have a risk that the object comes off from the suction part and falls down. Therefore, in the taking-out operation in the warehouse environment, it is necessary to perform an operation such that the object does not swing when the object is taken out.

One non-limiting and exemplary embodiment provides a technique of preventing an object from dropping caused by a large swing when a taking-out operation is performed.

In one general aspect, the techniques disclosed here feature an actuator apparatus configured to take out an object from a placement table while sucking the object with a suction nozzle, among objects being placed on the placement table such that side surfaces of the objects are in contact with each other, the actuator apparatus including an actuator, a first setter, an operation controller, and a first acquirer, wherein the actuator includes the suction nozzle for sucking the object and takes out the object from the placement table while the suction nozzle sucks the object at a first suction position and a side surface of the object is in contact with another object, the first setter sets a taking-out movement distance by which the object is to be moved by the actuator from the placement table, the operation controller controls sucking and taking-out operations performed by the actuator, the first acquirer acquires a moment applied to the suction nozzle, (i) the first acquirer acquires, as the moment, a difference between a first moment applied to the suction nozzle when the object is sucked by the suction nozzle and a second moment applied to the suction nozzle when the object is taken out by a first taking-out movement distance by the suction nozzle from the placement table, where the first taking-out movement distance is a distance by which the object is moved until the object is taken out from the placement table, and (ii) the operation controller controls whether or not to further continue the taking-out operation based on the difference between the first and second moments acquired by the first acquirer.

According to the present disclosure, it is possible to prevent an object from dropping caused by a large swing when a taking-out operation is performed.

It should be noted that this comprehensive or specific aspect may be implemented in a method, a system, an integrated circuit, a computer program, or a computer readable storage medium, or any combination of an apparatus, a system, a method, an integrated circuit, a computer program, and a computer readable storage medium. Examples of the computer-readable storage medium include a nonvolatile storage medium such as a compact disc-read only memory (CD-ROM).

Further advantages and effects of the aspect of the present disclosure will be apparent from the description and the drawings. Such advantages and/or effects are provided by features described in embodiments, the specification, and drawings, but all features do not necessarily need to be provided to achieve one or more of features.

BRIEF DESCRIPTION OF THE DRAWINGS

FIG. 3G is a diagram illustrating an example of a measurement result of a moment M1 measured using a force sensor of an actuator;

FIG. 3H is a diagram illustrating an example of a measurement result of a moment M2 measured using a force sensor of an actuator;

FIG. 5A is a diagram illustrating an example of an operation of taking out an object from a packing box placed on a shelf board with an inclination angle of 20°;

FIG. 7 is a diagram showing an appropriate range of a moment varying depending an inclination angle θ of a board on which an object is placed;

FIG. 8A is a functional block diagram of a robot arm apparatus as an example of an actuator apparatus;

FIG. 9 is a diagram illustrating examples of coordinates of a suction position on an upper surface of an object, a size of the object, a weight per one object stored in a storage unit;

FIG. 11A is a diagram showing XYZ coordinates of an original suction position before being changed;

FIG. 11B is a diagram showing, in a table, XYZ-coordinate sets of suction positions 1 to 5 after being changed;

FIG. 23 is a diagram showing article data information as an example of content of an operation target object database in the system shown in FIG. 21 according to Modification 2;

FIG. 25 is a diagram showing examples of moments and measurement results in a warehouse experiment environment in Modification 2;

FIG. 30B is a diagram for explaining an example of swinging that occurs when the object placed on the placement board shown in FIG. 27G is taken out;

FIG. 31 is a diagram illustrating an example of a situation in which objects are placed, and an example of an operation of taking out an object placed on a placement board inclined by an angle of 20°;

FIG. 32B illustrates, in a graph, time-series data of a moment applied to a suction position for periods A to D and a following period in FIG. 31 in which an object is taken out from a placement board with a fence having a height of 0.5 cm, and the object finally falls down, and also illustrates a situation when the taking-out operation is stopped;

FIG. 33A illustrates, in a graph, time-series data of a moment which is applied to a suction position during a period in which, after the suction position is changed to a position closer to a fence than a center position 93b corresponding to the center of gravity is close to, an operation of taking out an object from a placement board with a fence with a height of 7.5 cm in periods A to D and a following period in FIG. 31 until the object is successfully held by suction, and also illustrates a situation when the taking-out operation is stopped;

FIG. 34 is a diagram showing an appropriate range of a moment varying depending on a situation in which an object is placed and depending on an inclination angle θ of the object;

FIG. 36 illustrates, in a graph, time-series data of a moment applied to a suction position that occurs in a case, unlike the situation shown in FIG. 35, where a taking-out operation is changed as an exceptional operation performed in a situation in which an object is placed as shown in FIG. 27A, and also illustrating the taking-out operation.

DETAILED DESCRIPTION

Embodiments

Figure 1A:
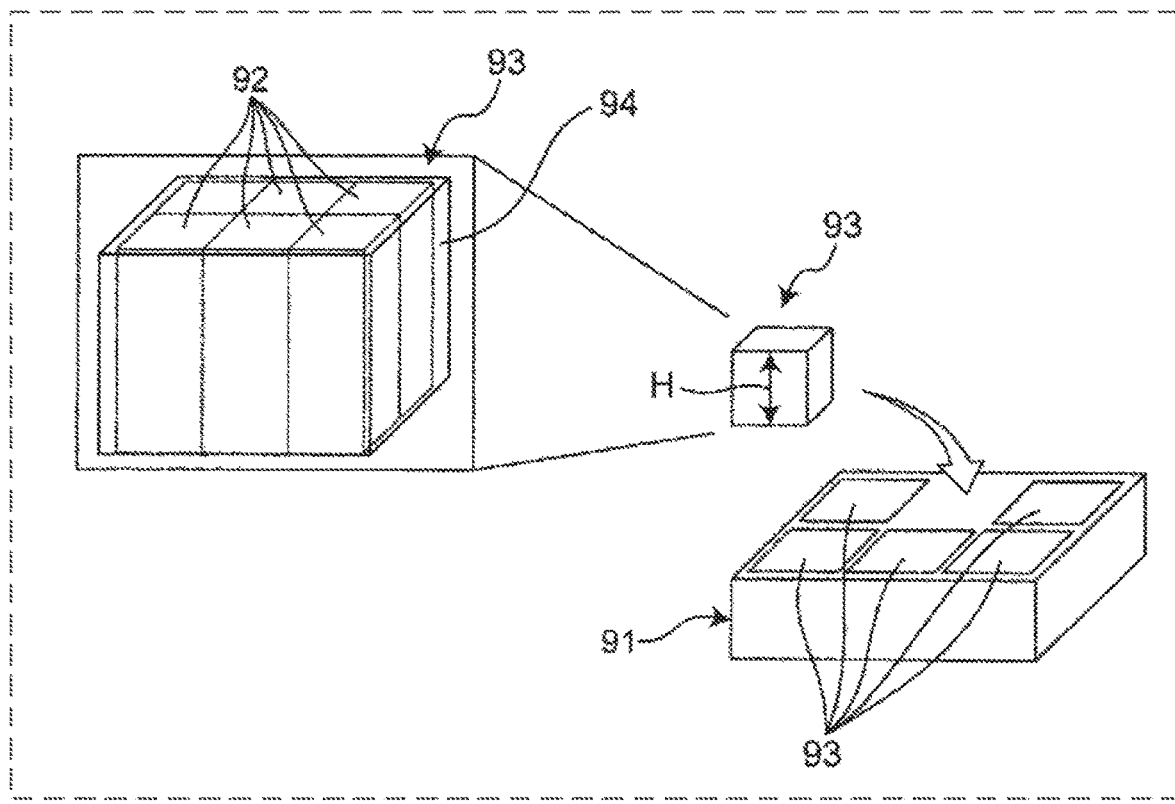
FIG. 1A is a diagram illustrating an example of an object to be taken out by an actuator apparatus.

Embodiments of the present disclosure are described in detail below with reference to drawings.

Before the embodiments of the present disclosure are described below with reference to drawings, various aspects of the present disclosure are described.

According to a first aspect, the present disclosure provides an actuator apparatus configured to take out an object from a placement table while sucking the object with a suction nozzle, among objects being placed on the placement table such that side surfaces of the objects are in contact with each other, the actuator apparatus including an actuator, a first setter, an operation controller, and a first acquirer, wherein the actuator includes the suction nozzle for sucking the object and takes out the object from the placement table while the suction nozzle sucks the object at a first suction position and a side surface of the object is in contact with another object, the first setter sets a taking-out movement distance by which the object is to be moved by the actuator from the placement table, the operation controller controls sucking and taking-out operations performed by the actuator, the first acquirer acquires a moment applied to the suction nozzle, (i) the first acquirer acquires, as the moment, a difference between a first moment applied to the suction nozzle when the object is sucked by the suction nozzle and a second moment applied to the suction nozzle when the object is taken out by a first taking-out movement distance by the suction nozzle from the placement table, where the first taking-out movement distance is a distance by which the object is moved until the object is taken out from the placement table, and (ii) the operation controller controls whether or not to further continue the taking-out operation based on the difference between the first and second moments acquired by the first acquirer.

In this aspect, the first acquirer acquires the difference between the first moment applied to the suction nozzle when the object is sucked by the suction nozzle and the second moment applied to the suction nozzle when the object is taken out by the first taking-out movement distance by the suction nozzle from the placement table, and, based on the acquired moment difference, the operation controller controls whether or not to further continue the taking-out operation. Thus, it is possible to prevent the object from falling down caused by too large a swing when the taking-out operation is performed.

A second aspect of the present disclosure provides the actuator apparatus according to the first aspect, in which the placement table is a packing box in which the objects are placed such that the packing box is filled with the objects, and the object is sucked by the suction nozzle and taken out from the packing box while the object is in contact with a side face of another object remaining in the packing box or with an inner wall of the packing box.

A third aspect of the present disclosure provides the actuator apparatus according to the first aspect, in which the object is a rectangular parallelepiped.

A fourth aspect of the present disclosure provides the actuator apparatus according to the first aspect, in which the operation controller performs control such that in a case where the difference between the first and second moments is equal to or greater than a first threshold value, the taking-out operation is continued, while in a case where the difference is smaller than the first threshold value, the taking-out operation is not continued and is stopped.

According to this aspect, in the case where the difference between the first and second moments is equal to or greater than the first threshold value, the operation controller may perform control such that the taking-out operation is continued. In the case where the difference between the first and second moments is smaller than the first threshold value, control may be performed such that the taking-out operation is stopped. Thus, it is possible to prevent an object from dropping caused by too large a swing when the taking-out operation is performed.

A fifth aspect of the present disclosure provides the actuator apparatus according to the first aspect, further including a second setter configured to set a second suction position at which the object is to be sucked by the suction nozzle, wherein in a case where the taking-out operation for an object is stopped and the object is returned to a state in which the object is placed before the object is taken out from the placement table, the second setter sets the second suction position different from the first suction position, and the operation controller performs control such that the object is sucked at the second suction position and a taking-out operation from the placement table is performed.

According to this aspect, in the case where the taking-out operation for an object is stopped, the object is returned to a state in which the object is placed before the object is taken out from the placement table, and the second setter sets the second suction position different from the first suction position, and the taking-out operation control is again performed. Thus, when the taking-out operation is stopped without being continued, the suction position can be autonomously changed without manually setting a new suction position.

A sixth aspect of the present disclosure provides the actuator apparatus according to the first aspect, in which the operation controller performs control such that, based on the difference between the first and second moments acquired by the first acquirer, the taking-out operation is further continued and the object is moved by a distance greater than the first taking-out movement distance and greater than the height of the object so that the object is taken out from the placement table to the outside of the placement table.

According to this aspect, based on the difference between the first and second moments acquired by the first acquirer, the operation controller can perform control such that the taking-out operation is further continued to take out the object from the placement table to the outside of the placement table. This aspect makes it possible to take out the object from the placement table without dropping the object in the middle of the taking-out operation.

A seventh aspect of the present disclosure provides the actuator apparatus according to the first aspect, in which the first suction position of the object is covered with vinyl or cellophane.

According to this aspect, it is possible to achieve effects similar to those achieved in the first to sixth aspects, even in the case where the surface of the object is covered with vinyl or cellophane.

An eighth aspect of the present disclosure provides the actuator apparatus according to the first aspect, in which the placement table is placed on a shelf board inclined by an acute inclination angle.

According to this aspect, it is possible to achieve effects similar to those achieved in the first to seventh aspects, even in the case where the object is placed on a shelf board inclined by an acute inclination angle.

A ninth aspect of the present disclosure provides the actuator apparatus according to the first aspect, in which the placement table is placed on a shelf board with an inclination angle of 0°.

According to this aspect, it is possible to achieve effects similar to those achieved in the first to seventh aspects, even in the case where the object is placed on a shelf board with an inclination angle of 0°.

A tenth aspect of the present disclosure provides the actuator apparatus according to the first aspect, in which the operation controller controls the suction pressure at the first suction position to be changeable between a first suction pressure and a second suction pressure higher than the first suction pressure, when the operation controller performs control, based on the difference between the first and second moments acquired by the first acquirer, not to continue the taking-out operation by the actuator, the control is performed such that after the taking-out operation is stopped and the object is returned to its original position in the placement table, the suction pressure at the first suction position is changed from the first suction pressure to the second suction pressure, and the operation of the actuator is controlled such that the object is sucked at the first suction position and the taking-out operation is again performed, the difference between the first and second moments is acquired again by the first acquirer, and control is performed whether or not the taking-out operation by the actuator is continued.

According to this aspect, in the case where control is performed not to continue the taking-out operation by the actuator, the suction pressure is changed to the second suction pressure higher than the original suction pressure, that is, the first suction pressure, and then the taking-out operation is again performed. Thus, when the sucking fails, the suction pressure is increased from the previous suction pressure, and the sucking is performed again.

An eleventh aspect of the present disclosure provides the actuator apparatus according to one of the first to tenth aspects, in which in a case where the difference between the first and second moments is equal to or greater than a first threshold value and is greater than a second threshold value, the operation controller performs control such that the taking-out operation is stopped without being continued.

An twelfth aspect of the present disclosure provides an object taking-out method for taking out an object from a placement table, while sucking the object with a suction nozzle, among objects being placed on the placement table such that surfaces of the objects are in contact with each other, the method including, by using an actuator apparatus including an actuator, a first setter, an operation controller, and a first acquirer, setting, by the first setter, a taking-out movement distance by which the object is to be moved by the actuator from the placement table, and controlling, by the operation controller, a suction and taking-out operation performed by the actuator including the suction nozzle for sucking the object such that the object is sucked by the suction nozzle at a first suction position and taken out from the placement table while a side surface of the object is in contact with another object, (i) acquiring, by the first acquirer, as a moment applied to the suction nozzle and acquired by the first acquirer, a difference between a first moment applied to the suction nozzle when the object is sucked by the suction nozzle and a second moment applied to the suction nozzle when the object is taken out by a first taking-out movement distance by the suction nozzle from the placement table, where the first taking-out movement distance is a distance by which the object is moved until the object is taken out from the placement table, and (ii) controlling, by the operation controller based on the difference between the first and second moments acquired by the first acquirer, whether or not the taking-out operation is further continued.

In this aspect, the first acquirer acquires the difference between the first moment applied to the suction nozzle when the object is sucked by the suction nozzle and the second moment applied to the suction nozzle when the object is taken out by the first taking-out movement distance by the suction nozzle from the placement table, and, based on the acquired moment difference, the operation controller controls whether or not to further continue the taking-out operation. Thus, it is possible to prevent the object from falling down caused by too large a swing when the taking-out operation is performed.

A thirteenth aspect of the present disclosure provides a storage medium, the storage medium being nonvolatile and computer-readable, the storage medium including a program for an actuator apparatus to take out an object from a placement table while sucking the object with a suction nozzle, among objects being placed on the placement table such that side surfaces of the objects are in contact with each other, the actuator apparatus including an actuator, a first setter, an operation controller, and a first acquirer, the actuator including the suction nozzle for sucking the object, the program causing a computer to have a function of sucking the object at a first suction position by the suction nozzle and taking out the object from the placement table while a side surface of the object is in contact with another object, a function for the first setter to set a taking-out movement distance by which the actuator is to move the object from the placement table, the operation controller controlling the sucking and taking-out operation of the actuator, a function for the first acquirer to acquire a moment applied to the suction nozzle, (i) a function for the first acquirer to acquire, as the moment, a difference in the moment between a first moment applied to the suction nozzle when the object is sucked by the suction nozzle and a second moment applied to the suction nozzle when the object is taken out by a first taking-out movement distance by the suction nozzle from the placement table, where the first taking-out movement distance is a distance by which the object is moved until the object is taken out from the placement table, and (ii) a function for the operation controller to control whether or not to further continue the taking-out operation based on the difference between the first and second moments acquired by the first acquirer.

In this aspect, the first acquirer acquires the difference between the first moment applied to the suction nozzle when the object is sucked by the suction nozzle and the second moment applied to the suction nozzle when the object is taken out by the first taking-out movement distance by the suction nozzle from the placement table, and, based on the acquired moment difference, the operation controller controls whether or not to further continue the taking-out operation. Thus, it is possible to prevent the object from falling down caused by too large a swing when the taking-out operation is performed.

A fourteenth aspect of the present disclosure provides an object taking-out system including actuator apparatuses each disposed in an environment and each configured to take out an object from a placement table while sucking the object with a suction nozzle, among objects being placed on the placement table such that side surfaces of the objects are in contact with each other, each actuator apparatus including an actuator, an operation controller, and a first acquirer, the system including a first setter, a server, an operation target object database, and an operation result database, wherein the server is connected to the actuator apparatus, and also to the first setter, the operation target object database, and the operation result database, the actuator includes the suction nozzle for sucking the object and takes out the object from the placement table such that the object is sucked at a first suction position by the suction nozzle based on the taking-out position stored in the object data base and the object is taken out while a side surface of the object is in contact with another object, the first setter sets a taking-out movement distance by which the object is to be moved by the actuator from the placement table, the operation controller controls sucking and taking-out operations performed by the actuator, the first acquirer acquires a moment applied to the suction nozzle, (i) the first acquirer acquires, as the moment, a difference between a first moment applied to the suction nozzle when the object is sucked by the suction nozzle and a second moment applied to the suction nozzle when the object is taken out by a first taking-out movement distance by the suction nozzle from the placement table, where the first taking-out movement distance is a distance by which the object is moved until the object is taken out from the placement table, and (ii) based on the difference between the first and second moments acquired by the first acquirer and further based on the object taking-out information stored in the operation result database, the operation controller controls whether or not to continue the taking-out operation, and stores the control result and the taking-out information such as the difference between the first and second moments in the operation result database via the server.

According to this aspect, the operation controller controls a sucking and taking-out operation by the actuator based on the object taking-out movement distance stored in the operation result database, and controls, based on the difference between the first and second moments, whether or not the taking-out operation is continued, and stores the control result as taking-out information in the database via the server. This makes it possible to use a result of an operation performed in a laboratory in another place such as a factory or the like. In particular, in logistics distribution centers that deliver articles, in many cases, articles handled there are standardized in respective warehouse, and thus parameter values obtained laboratories or other distribution centers can be shared, which makes it possible to perform taking-out operations and distribution works in a highly efficient manner. Furthermore, shelves used to place articles are of the same type in many cases, and thus angles of shelves or the like may be shared among first and second or more distribution centers, which makes it possible to achieve higher efficiency.

A fifteenth aspect of the present disclosure provides an object taking-out method, including causing a nozzle to suck a first part of an object; acquiring, in a first period starting immediately after the sucking, first moments output by a force sensor provided between the nozzle and arms; causing the arms to move the object immediately after the first period; causing the arms to stop moving the object when the object moves by a first distance; acquiring, in a second period starting immediately after the stopping, second moments output by the force sensor; continuing the stopping over the second period; and causing the nozzle to suck a second part different from the first part in a case where an average value of the second moments is equal to or greater than a sum of an average value of the first moments and a predetermined value.

A sixteenth aspect of the present disclosure provides an apparatus including an actuator having a suction nozzle and a computer for controlling the actuator, the computer performing, when an object is taken out from a placement table while sucking the object with a suction nozzle, among objects being placed on the placement table such that side surfaces of the objects are in contact with each other, acquiring a difference between a first moment applied to the suction nozzle when the object is sucked by the suction nozzle and a second moment applied to the suction nozzle when the object is in a process of being taken out by the suction nozzle, and controlling, based on the difference between the first and second moments, whether or not the taking-out operation is to be further continued.

Basic experiments performed are described first and then a first embodiment according to the present disclosure is described in detail with reference to drawings.

Basic Experiments

In the present disclosure, for example, experiments were performed in terms of holing an object by sucking using a robot arm apparatus, which is an example of an actuator apparatus, for simulating operations in actual logistics distribution circumstances, and problems and solutions thereto were analyzed. An outline thereof is described below.

As shown in FIG. 1A to 1E, by way of example, articles 92 of the same shape, type, and weight are bundled in part or in whole with a flexible material 94, such as vinyl or cellophane, to form a single rectangular parallelepiped aggregate 93 and the suction position is covered with the flexible material 94. Aggregates 93 are packed in one large rectangular packing box 91 such that the aggregates 93 are aligned in the rectangular packing box 91. Here, one aggregate 93 is an example of the object 93. One large rectangular parallelepiped packing box 91 is an example of a placement table 90 on which the objects 93 are placed such that side surfaces of the objects 93 are in contact with each other.

Figure 1B:
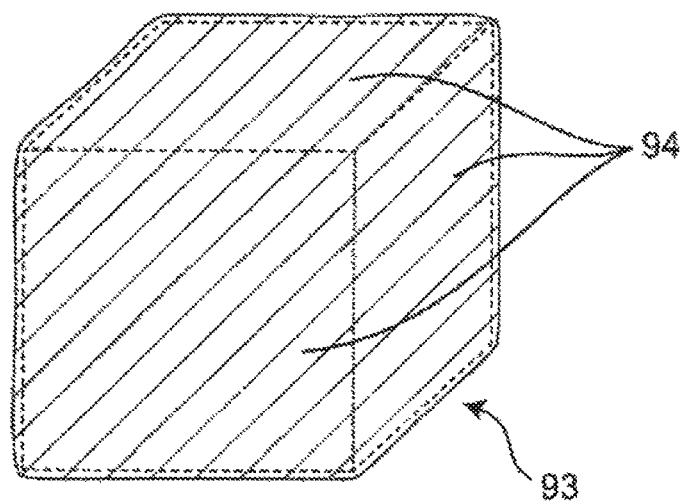
FIG. 1B is a perspective view of an example of an object.
Figure 1C:
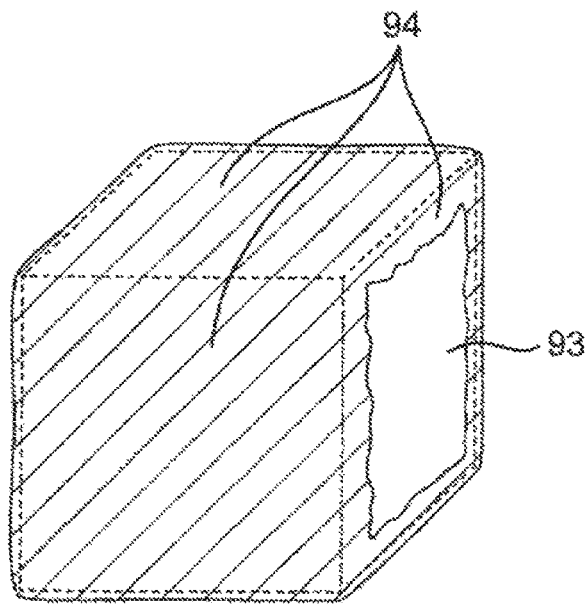
FIG. 1C is a perspective view of another example of an object.
Figure 1D:
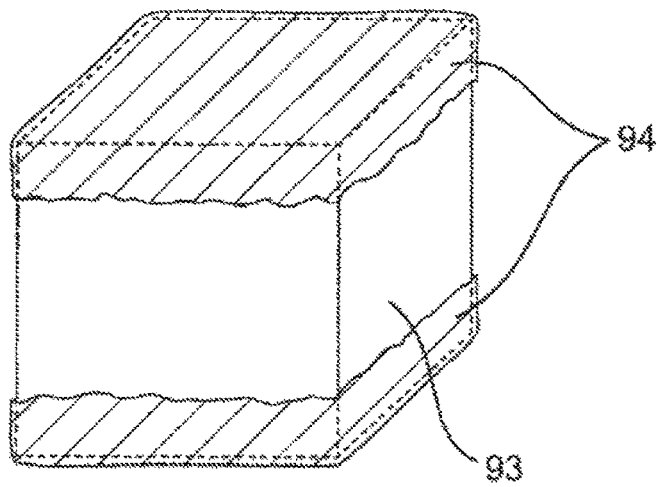
FIG. 1D is a perspective view of another example of an object.
Figure 1E:
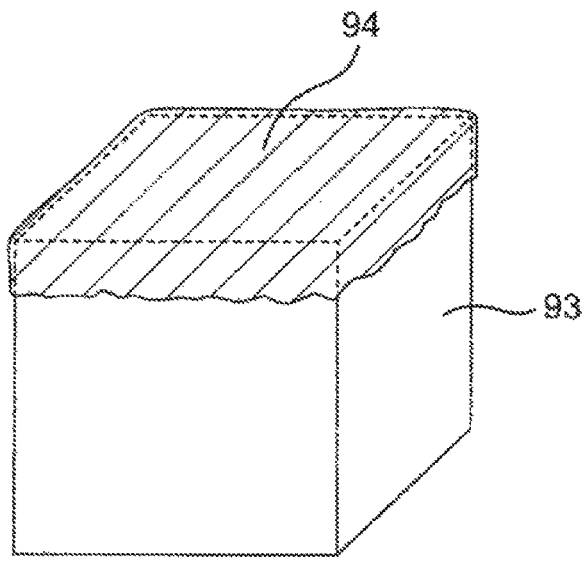
FIG. 1E is a perspective view of another example of an object.

FIGS. 1B to 1E, for easy understanding, the flexible materials 94 are hatched. FIG. 1A and FIG. 1B each show an example of an object 93 when the entire surface of a rectangular parallelepiped aggregate in which articles 92 are aligned is packaged with a flexible article 94. FIG. 1C shows another example of an object 93 in a rectangular parallelepiped aggregate in which articles 92 are aligned, wherein the left and right side surfaces, except for the central portion thereof, are packed with a flexible material 94. FIG. 1D shows another example of an object 93 in a rectangular parallelepiped aggregate in which articles 92 are aligned, wherein an upper surface, a lower surface, portions partially extending downward from four sides of the upper surface, and portions partially extending upward from four sides of the lower surface are packed with a flexible material 94. FIG. 1E shows another example of an object 93 in a rectangular parallelepiped aggregate in which articles 92 are aligned, wherein an upper surface and portions partially extending downward from four sides of the upper surface are packed with a flexible material 94. In the object 93 of these examples, the upper surface on which the suction position is located is entirely covered with the flexible material 94.

The object 93 is not limited to a bundle articles 92 having the same shape, type, and weight as described above. The object 93 may be an object satisfying at least a condition that the object 93 is a rectangular parallelepiped as an overall shape, and part or the whole of the rectangular parallelepiped is packed with the flexible material 94, and the suction position of the object 93 is covered with the flexible material 94.

Figure 2A:
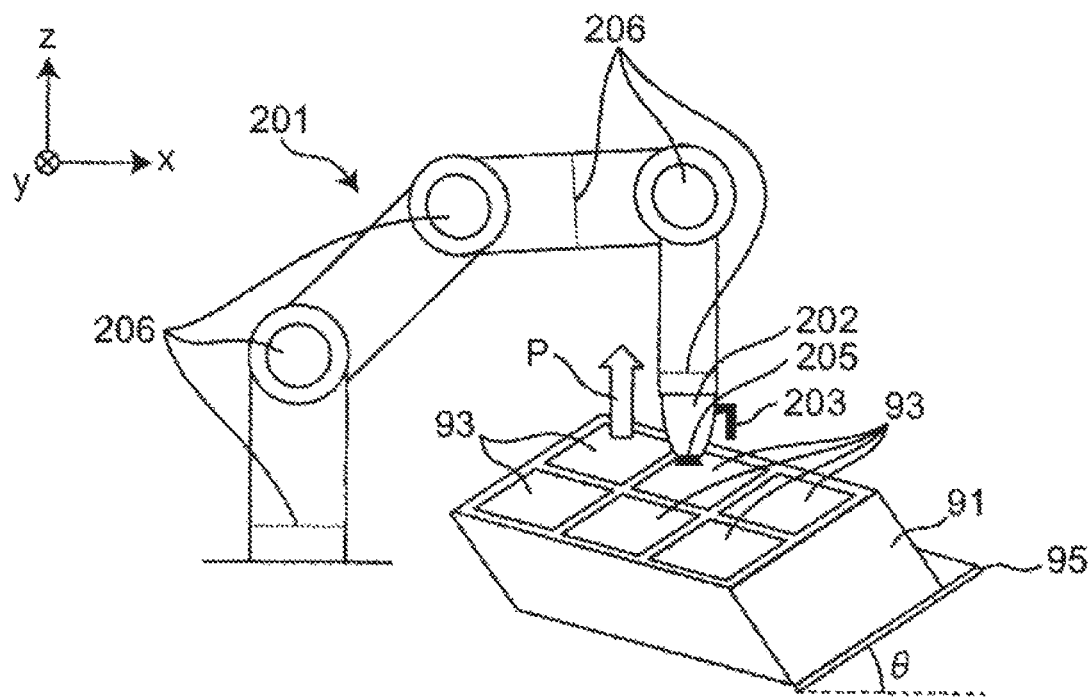
FIG. 2A is a schematic diagram illustrating an operation of an actuator apparatus to take out an object from a packing box.
Figure 2B:
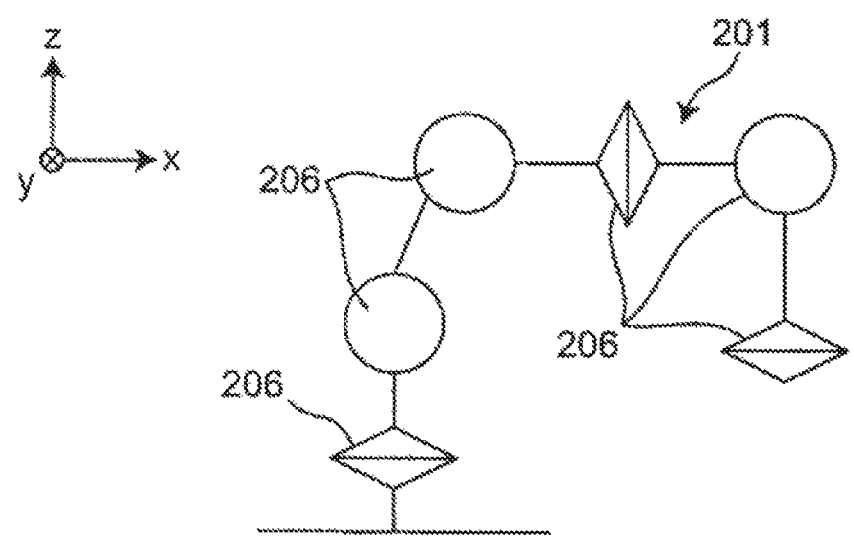
FIG. 2B is a diagram illustrating an actuator of an actuator apparatus.

In an example of a physical distribution warehouse environment, as shown in FIGS. 2A and 2B, in order to make it easier for an operator to take out an object 93, a packing box 91 accommodating objects 93 is placed on a shelf board 95. The shelf board 95 is disposed so as to be inclined at an acute angle θ such that a front portion of the shelf board 95 is lower than a rear portion thereof. Inclining the shelf board 95 in the above-described manner is for facilitating the operator to confirm the object 93 in the packing box 91 and to take out the object 93 from the packing box 91. Furthermore, when the objects 93 are fully taken out from the inside of the packing box 91 and the packing box 91 is removed from the shelf board 95, another packing box 91 located adjacent to and above the removed packing box 91 automatically moves by its own weight to the position where the packing box 91 was previously located.

Figure 3A:
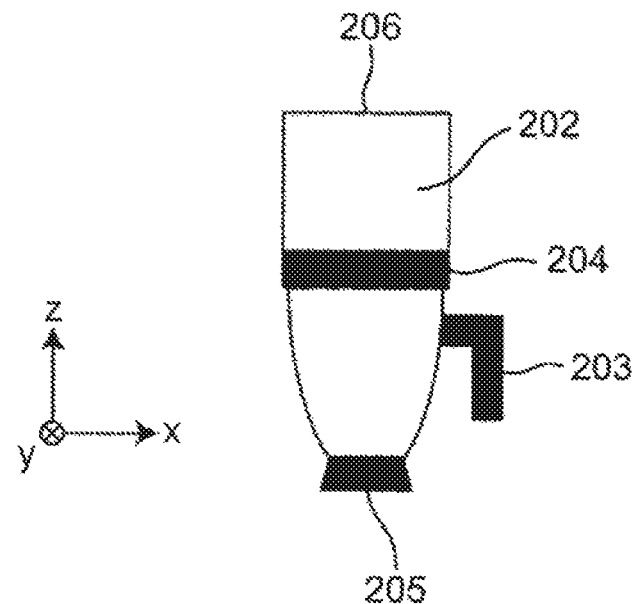
FIG. 3A is a diagram illustrating a hand of an actuator.
Figure 3B:
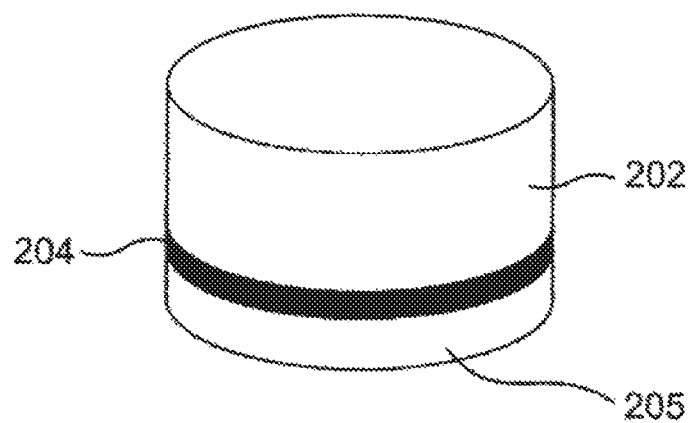
FIG. 3B is a diagram illustrating an actuator in which a force sensor is disposed.

An example of a robot arm apparatus 200, which is an example of an actuator apparatus, is shown in FIGS. 2A and 2B. Here, a robot arm 201 is an example of an actuator. The robot arm apparatus 200 includes a robot arm controller 201a and the robot arm 201. The robot arm 201 of the robot arm apparatus 200 performs an operation of taking out the object 93. Here, the robot arm 201 is configured to have six rotary joints 206 and have six or more ° of freedom. A suction nozzle 205 with a camera 203 such as that shown in FIG. 3A is attached to a hand 202 of the robot arm 201. The camera 203 functioning as an example of the second acquirer detects a suction position (for example, a first suction position) of an object 93 in a packing box 91. After the detection, it is possible to perform a taking-out operation such that the suction nozzle 205 holds the object 93 by sucking it and takes out the object 93 from the packing box 91 to a tray or the like thereby achieving sorting.

Figure 3C:
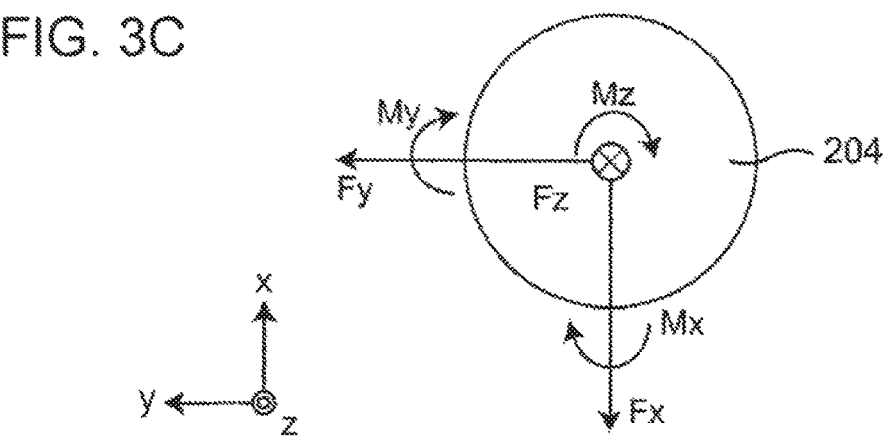
FIG. 3C is a diagram illustrating measurement of a moment using a force sensor of an actuator.
Figure 3D:
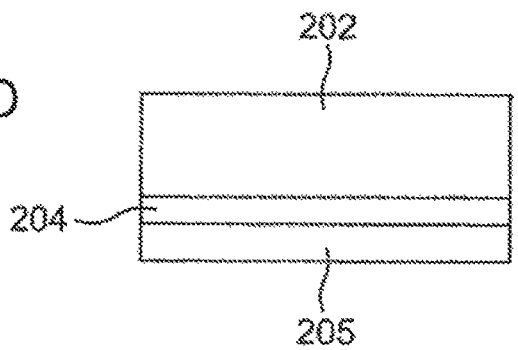
FIG. 3D is a diagram illustrating measurement of a moment using a force sensor of an actuator.
Figure 3E:
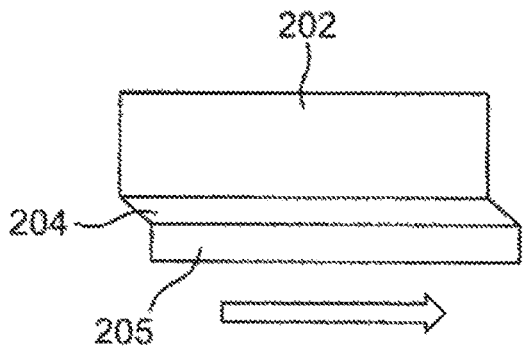
FIG. 3E is a diagram illustrating measurement of a moment using a force sensor of an actuator.
Figure 3F:
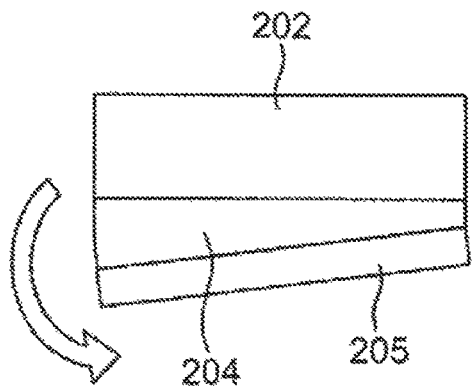
FIG. 3F is a diagram illustrating measurement of a moment using a force sensor of an actuator.

As shown in FIG. 3A, the force sensor 204 is provided between one part of the hand 202 and the other part of the hand 202. The other part of the hand 202 is located between the force sensor 204 and the suction nozzle 205. The force sensor 204 has a coordinate system having three axial directions orthogonal to each other. As shown in FIG. 3C, the force sensor 204 in the present embodiment has an x-axis, a y-axis, and a z-axis that are orthogonal to each other and that have the central axis as the origin. The Z axis is an axis extending in a thickness direction of the force sensor, and the x axis and the y axis are axes lying in a plane perpendicular to the z axis and being orthogonal to each other.

The force sensor 204 measures forces Fx, Fy, and Fz respectively acting in the x-axis direction, the y-axis direction, and the z-axis direction. The force sensor 204 also measures moments Mx, My, and Mz about the x-axis, the y-axis, and the z-axis. In the present basic experiment, as for the force sensor, one manufactured by WACOH-TECH Inc. was used. The x-axis, y-axis, and z-axis coordinates may be represented by a coordinate system uniquely defined in the inside of the sensor or may be represented by a world coordinate system.

In the present embodiment, as shown in FIG. 3A, when the suction nozzle 205 and the force sensor 204 are expressed using the same x-axis, y-axis, and z-axis, a center axis of the suction nozzle 205 extending in the z-axis direction and a center axis of the force sensor 204 extending in the z-axis direction coincide with each other. The cross section perpendicular to the z-axis of the suction nozzle 205 and the cross section perpendicular to the z-axis of the force sensor both may have a circular shape whose center is coincident with each other. The distance between the suction nozzle 205 and the force sensor 204 is short from the viewpoint of comparing the force applied to the suction nozzle and the force measured by the force sensor. The distance between the suction nozzle 205 and the force sensor 204 is short from the viewpoint of comparing the force applied to the suction nozzle and the force measured by the force sensor. That is, the force applied to the suction nozzle can be regarded as the force measured by the force sensor, and the moment applied to the suction nozzle can be regarded as the moment force measured by the force sensor.

When the suction nozzle holds the object 93, the moments M1 and M2 that are applied to the force sensor 204 via the suction nozzle 205 are measured. FIG. 3G shows examples of forces (Fx, Fy, Fz) acting on respective axes detected by the force sensor 204 when the object is sucked by the suction nozzle at the suction positions 1 to 5, and moments (Mx, My, Mz) about the x axis, the y axis and the z-axis. FIG. 3H shows examples of the moment M2. The difference ΔM between the two moments M1 and M2 acquired by the force sensor 204 of the moment measurement unit 105 can be obtained by calculating M2−M1 by the calculation unit 204a.

In a case where the objects 93 are packed in the packing box 91, gaps between adjacent objects 93 are so small that a multi-finger such as a gripper cannot be inserted into gaps, and thus, it is difficult to grip an object 93 by holding the object 93 between fingers. Therefore, it is effective to hold the object 93 by suction with the suction nozzle 205. However, holding the object 93 by suction is not stable compared with the stability obtained in grabbing with multiple fingers. This tendency is more apparent, in particular, when a bellows of a suction pad of the suction nozzle 205 has multiple stages or the surface of the object 93 is covered with a flexible material 94 such as vinyl.

That is, in a case where objects 93, each of which is packed with a flexible material 94 such as vinyl, are packed in a packing box 91 placed on an inclined shelf board 95, to take out an object 93 from the packing box 91, the object 93 covered with the flexible material 94 is held by sucking the object 93 at a suction position with the suction nozzle 205, and then the object 93 is taken out from the packing box 91. In this case, the object 93 goes into a state in which the object 93 is suspended by the flexible material 94, and the object 93 in this state is taken out from the packing box 91 while sliding a side surface of an adjacent object 93. As a result, the object 93 swings greatly with respect to the suction nozzle 205, which may cause the object 93 to come off from the suction nozzle 205 and fall down.

This is because when the object 93 is taken out from the packing box 91 after the object 93 is sucked and held, the suction nozzle 205 sucks the soft material 94 such as vinyl covering the object 93 completely over the sucking position of the object 93 but the suction nozzle 205 cannot directly suck and hold the object 93 itself. Therefore, the flexible object 94 is stretched by the weight of the object 93, and thus the object 93 is suspended from the suction nozzle 205 via the flexible material 94. When the object 93 gets out of the packing box 91, supporting of the side surface by the adjacent object 93 is suddenly lost, and thus the object 93 starts to swing around the part sucked by the suction nozzle 205.

Figure 4A:
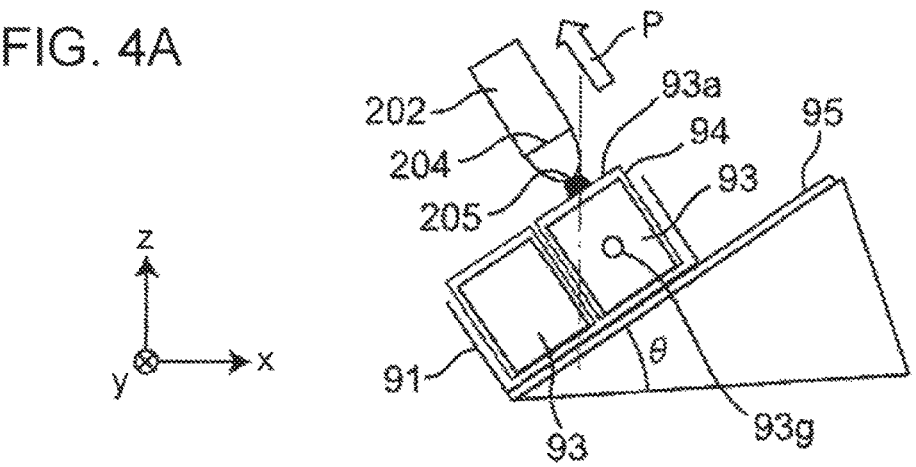
FIG. 4A is a diagram for explaining an example of swinging that occurs when an object is taken out from a packing box placed on a shelf board with an inclination angle θ.
Figure 4B:
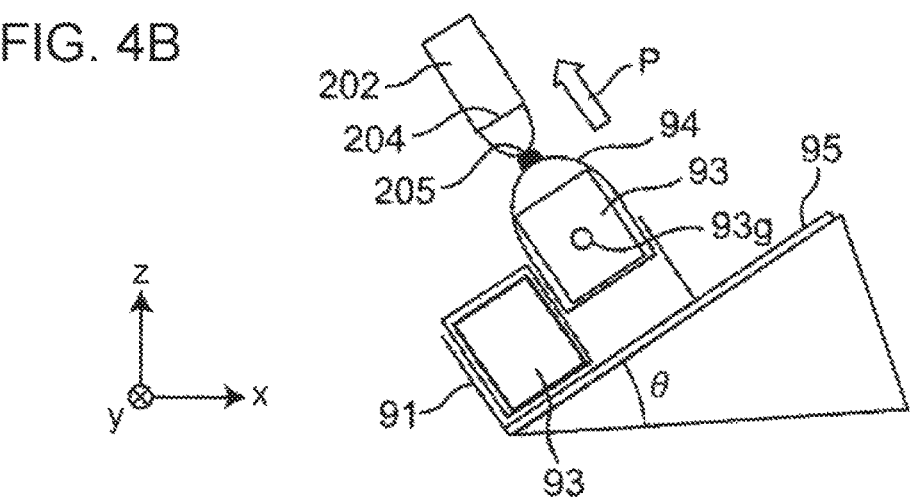
FIG. 4B is a diagram for explaining an example of swinging that occurs when an object is taken out from a packing box placed on a shelf board with an inclination angle θ.
Figure 4C:
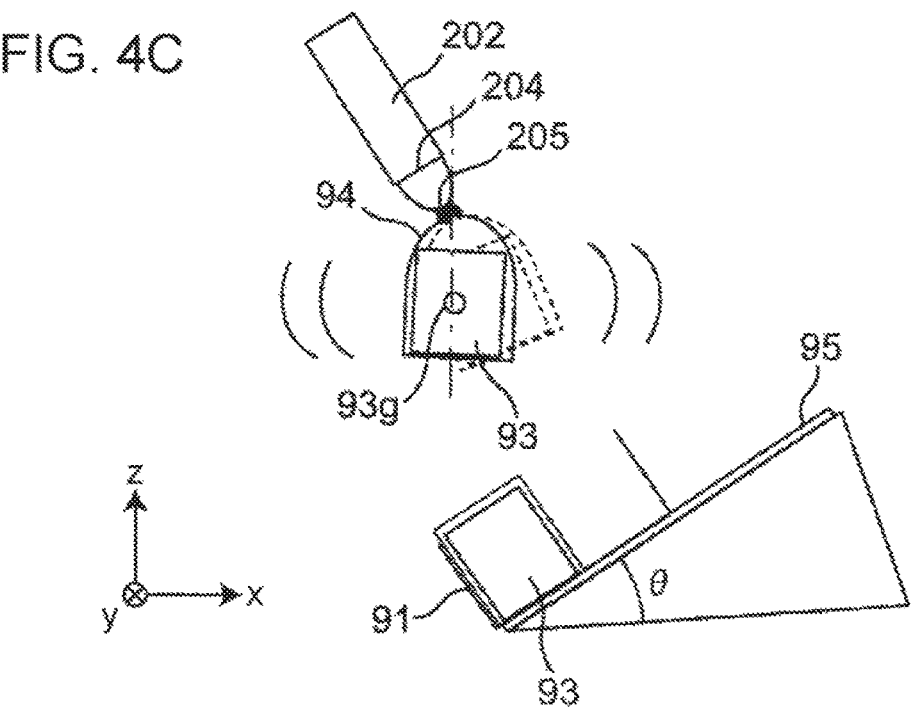
FIG. 4C is a diagram for explaining an example of swinging that occurs when an object is taken out from a packing box placed on a shelf board with an inclination angle θ.
Figure 4D:
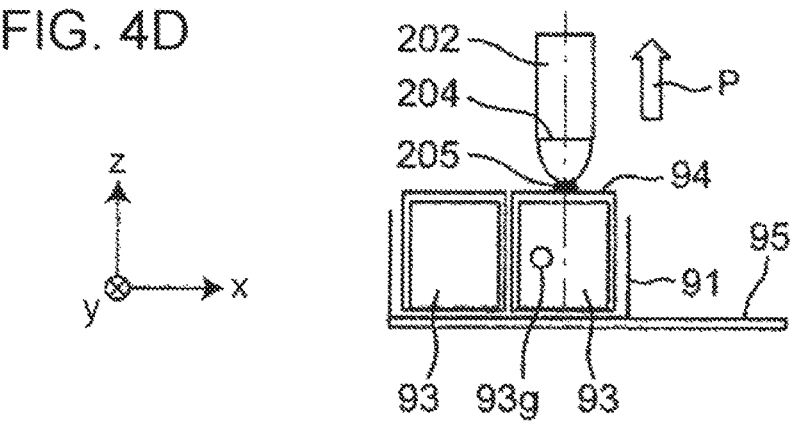
FIG. 4D is a diagram for explaining an example of swinging that occurs when an object is taken out from a packing box placed on a shelf board with an inclination angle 0°.
Figure 4E:
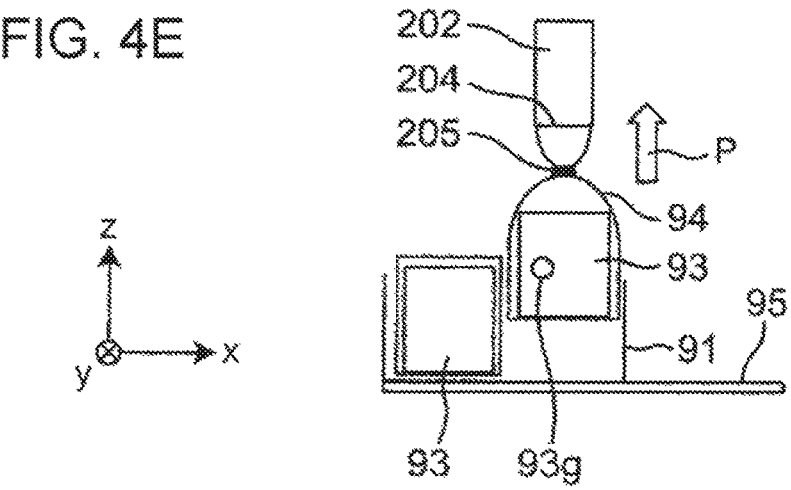
FIG. 4E is a diagram for explaining an example of swinging that occurs when an object is taken out from a packing box placed on a shelf board with an inclination angle 0°.
Figure 4F:
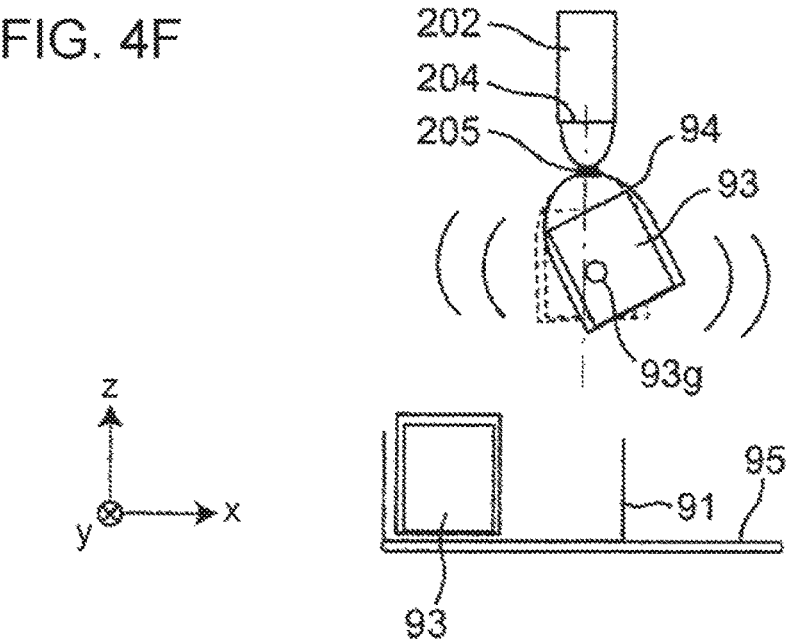
FIG. 4F is a diagram for explaining an example of swinging that occurs when an object is taken out from a packing box placed on a shelf board with an inclination angle 0°.
Figure 4G:
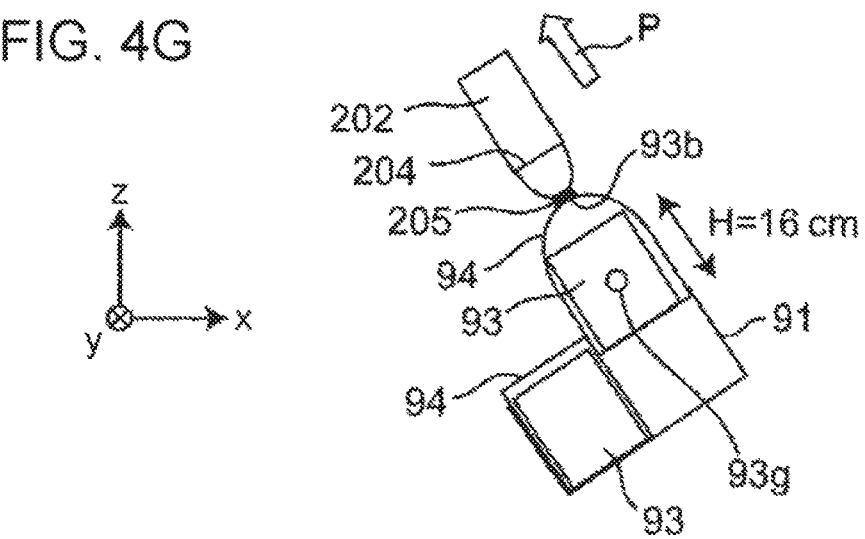
FIG. 4G is a diagram illustrating a situation in which a suction position is at the center of an upper surface of an object, for explaining that the object may or may not fall down depending on the suction position.
Figure 4H:
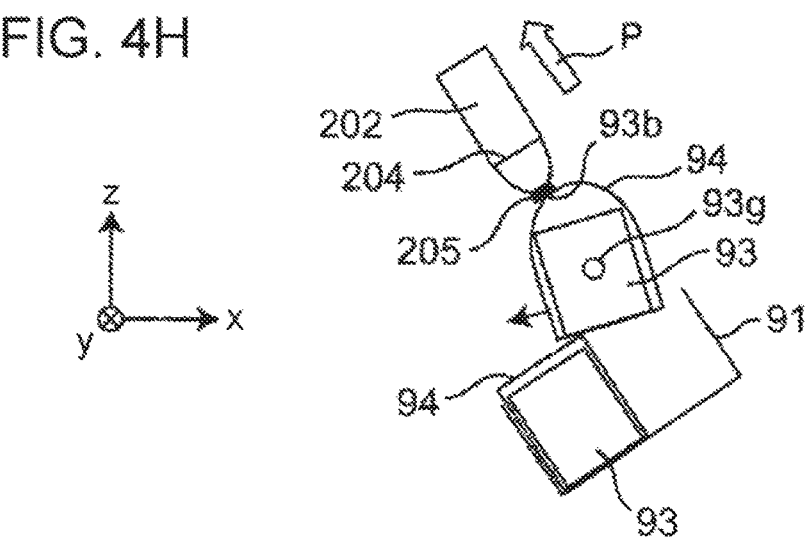
FIG. 4H is a diagram illustrating a situation in which a suction position is at the center of an upper surface of an object, for explaining that the object may or may not fall down depending on the suction position.
Figure 4I:
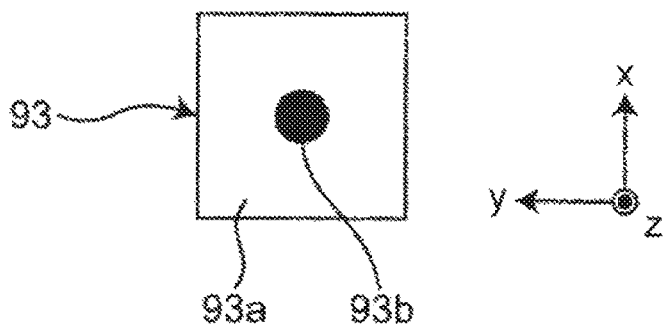
FIG. 4I is a diagram illustrating an object seen from the upper surface thereof in a situation in which a suction position is at the center of an upper surface of the object, for explaining that the object may or may not fall down depending on the suction position.

In other words, large swinging occurs when the center of gravity of the object 93 is not located at a vertical lower position below the suction position at which the object 93 is sucked by the suction nozzle 205 and when the side surface of the object 93 taken out from the packing box 91 is not supported by the adjacent object 93. This is because, as shown in FIGS. 4A to 4C, when the object 93 inclined by the inclination of the shelf board 95 is taken out from the packing box 91 filled with objects 93, the taken-out object 93 loses the support of another object such as an inner wall of the packing box 91 or a side surface of another adjacent object 93 remaining in the packing box 91, and the attitude of the object 93 with respect to the suction nozzle is changed by the weight of the object 93 such that the gravity center of the object 93 comes to a location vertically below the suction position of the object 93. This phenomenon also occurs even when the inclination angle is 0°, that is, even when the object 93 is placed on a flat place, if the object 93 is sucked by suction nozzle 205 at a suction position apart away from the center of gravity of the object 93 (FIGS. 4D to 4F). Therefore, sucking of the object 93 by the suction nozzle 205 needs to be performed at an appropriate suction position.

However, in an environment such as a warehouse environment in which there are many types of articles forming the object 93 and new articles are added daily, it is very difficult and unrealistic to previously check and set the suction position that allows the object 93 does not shake when the object 93 is taken out from the packing box 91. Therefore, it is necessary to have a method of finding, before taking out the object 93 from the packed packing box 91, a suction position of the object 93 that allows it to take out the object 93 without causing swinging to occur.

For example, as shown in FIGS. 4A to 4C and FIGS. 4G to 4I, when rectangular parallelepiped objects 93 are packed in the packing box 91 on the shelf board 95 inclined at an inclination angle θ, the center position 93b of a rectangular quadrangular upper surface 93a of the object 93 is set as the suction position, and the object 93 is taken out by putting it in a direction denoted by an arrow P from the packing box 91. Then, as shown in FIG. 4C, when the object 93 gets out from the packing box 91 as a result of being pulled out, the object 93 immediately starts to shake greatly to the left and right about the suction nozzle 205, object which causes the object 93 to fall down from the suction nozzle 205. Note that a small circle 93g at the center of the side surface of the object 93 denotes the position of the center of gravity of the object 93.

Figure 4J:
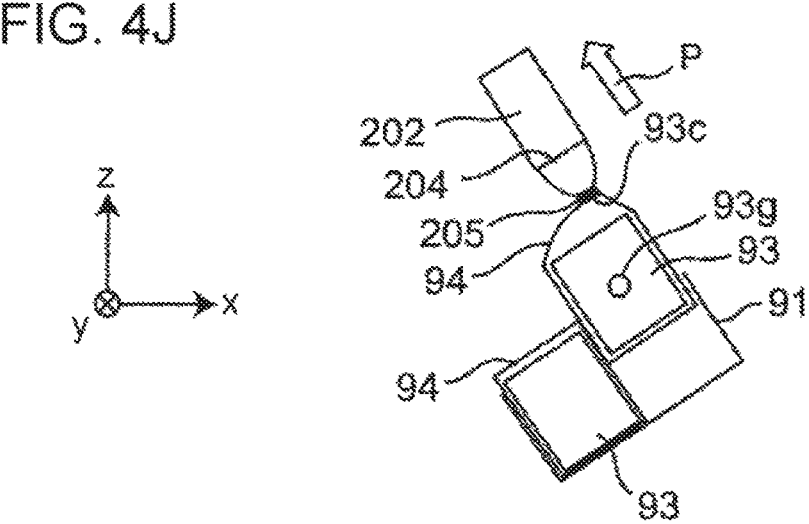
FIG. 4J is a diagram illustrating a situation in which a suction position is at an upper end of an upper surface of an object, for explaining that the object may or may not fall down depending on the suction position.
Figure 4K:
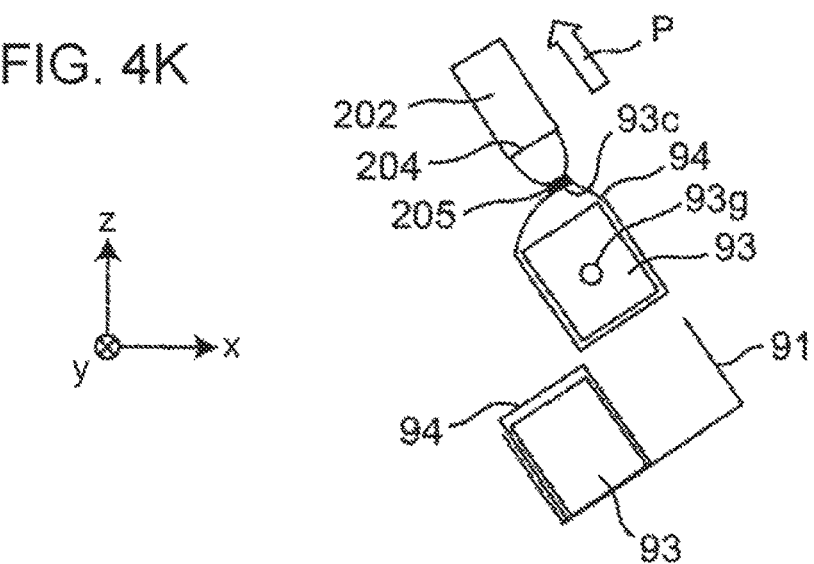
FIG. 4K is a diagram illustrating a situation in which a suction position is at an upper end of an upper surface of an object, for explaining that the object may or may not fall down depending on the suction position.
Figure 4L:
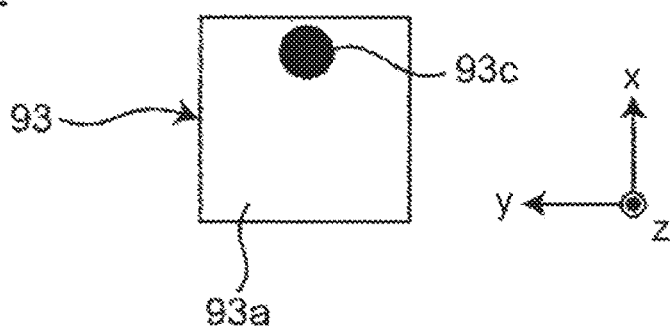
FIG. 4L is a diagram illustrating an object seen from the upper surface thereof in a situation in which a suction position is at an upper end of an upper surface of the object, for explaining that the object may or may not fall down depending on the suction position.

On the other hand, as shown in FIGS. 4J to 4L, the suction position of the object 93 may be set at a position 93c shifted from the center position 93b of the rectangular upper surface 93a to an upper end of the rectangular upper surface 93a, and the object 93 may be sucked at this suction position 93c and taken out from the packing box 91. In this case, the object 93 can be stably held without swaying left and right about the suction nozzle 205 after the object 93 is taken out from the packing box 91. In order not to drop the object 93 from the suction nozzle 205, if it is possible to estimate, before the object 93 is fully taken out from the packing box 91, whether or not the object 93 swings about the suction nozzle 205, it is possible to correct the suction position.

Next, an experiment performed to estimate the swinging is described below.

Figure 5B:
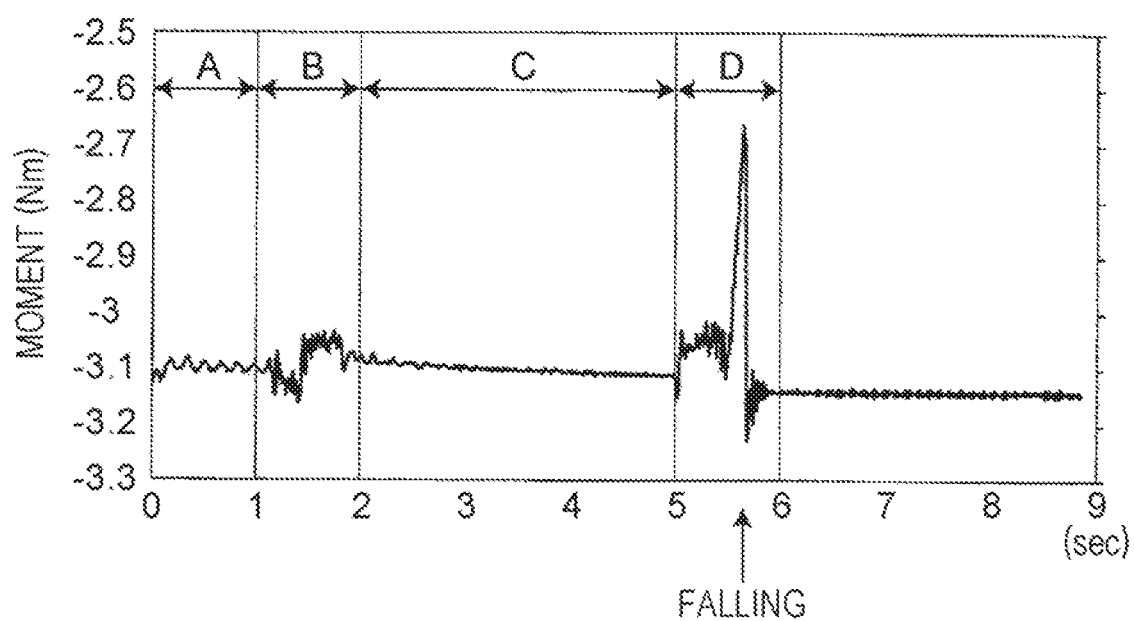
FIG. 5B is a graph illustrating time-series data of a moment applied to a suction position for a period from period A to a period D and a further period in FIG. 5A until an object falls down.

As shown in period A to period C in FIG. 5A, when objects 93 are given which are densely arranged in a packing box 91 inclined by an inclination angle θ, an object 93 is taken out partially by pulling the object 93 in a direction P perpendicular to the surface of the inclined shelf board 95 by a distance about one-half the height of the object 93, and the pulling is stopped temporarily in this position. Thereafter, the object 93 is again pulled up to a position equal to or higher than the height of the object 93. The moment acting on the suction position is measured by the force sensor 204 time serially during the above-described operation (see FIG. 5B). It is experimentally verified that it is possible to estimate, before the object 93 is fully taken out from the packing box 91, based on the measured moment, whether or not the object 93 will have a large swing when the object 93 is fully taken out from the packing box 91.

First, details of the operation are described below. The robot arm 201 was operated such that when an object 93 in the packing box 91 placed on the shelf board 95 inclined by an inclination angle of θ=20° was sucked and held, the suction position of the suction nozzle 205 came to the center position 93b of the object 93. This experiment is denoted as Experiment 1. That is, in period A in FIG. 5A, the robot arm 201 is driven such that the suction nozzle 205 comes into contact, at a suction position, with an object 93 which is one of those packed in the packing box 91, and the object 93 is sucked by the suction nozzle 205.

In following period B, the robot arm 201 is driven such that the object 93 sucked by the suction nozzle 205 is moved such that it is pulled up in a direction denoted by an arrow P by a distance (for example, 10 cm) about one-half the height of the object 93 thereby partially taking out the object 93.

In following period C, the robot arm 201 is driven such that the object 93 sucked by the suction nozzle 205 is pulled up by a distance (for example, 10 cm) about one-half the height of the object 93 until the object 93 is partially taken out, and in this state, the pulling is temporarily stopped. In this state, the object 93 is not fully taken out from the packing box 91, and a lower half part of the object 93 is in contact with an adjacent object 93 or an inner wall of the packing box 91, which causes the object 93 to be supported so as not to swing.

After that, in period D following period C, the robot arm 201 is driven such that the object 93 is further pulled up from the state in which the object 93 has been partially taken out by being pulled up by the distance (for example, 10 cm) about one-half the height of the object 93 to fully tasking out the object 93 from the packing box 91. In this operation, in period D, at a time at which the object 93 gets out completely from the packing box 91, a large moment is applied to the object 93, and thus the object 93 swings greatly about the suction nozzle 205, and the suction nozzle 205 fails to further keep the object 93 in the held state by suction, which causes the object 93 to fall down from the suction nozzle 205. Thus, the taking-out of the object 93 failed FIG. 5B is a graph illustrating time-series data of a moment (in units of Nm) applied to a suction position from period A to period D, that is, for a period starting when the object is sucked and ending when the object 93 falls down. In this case, it can be seen that no significant difference in moment occurs between period A and period C, and the difference is smaller than a particular value corresponding to the first threshold value.

Next, after the suction position of the object 93 is changed to a position 93c shifted up the slope from the center position 93b of the object 93, the robot arm 201 is operated so as to hold the object 93 by suction by the suction nozzle 205. That is, in a case where the object 93 was taken out from the packing box 91 placed on the shelf board 95 inclined by an angle of θ=20°, the robot arm 201 was operated such that the object 93 was sucked by the suction nozzle 205 at a suction position 93c located higher on the slope than the center position 93b of the object 93. This experiment is denoted as Experiment 2.

Figure 6A:
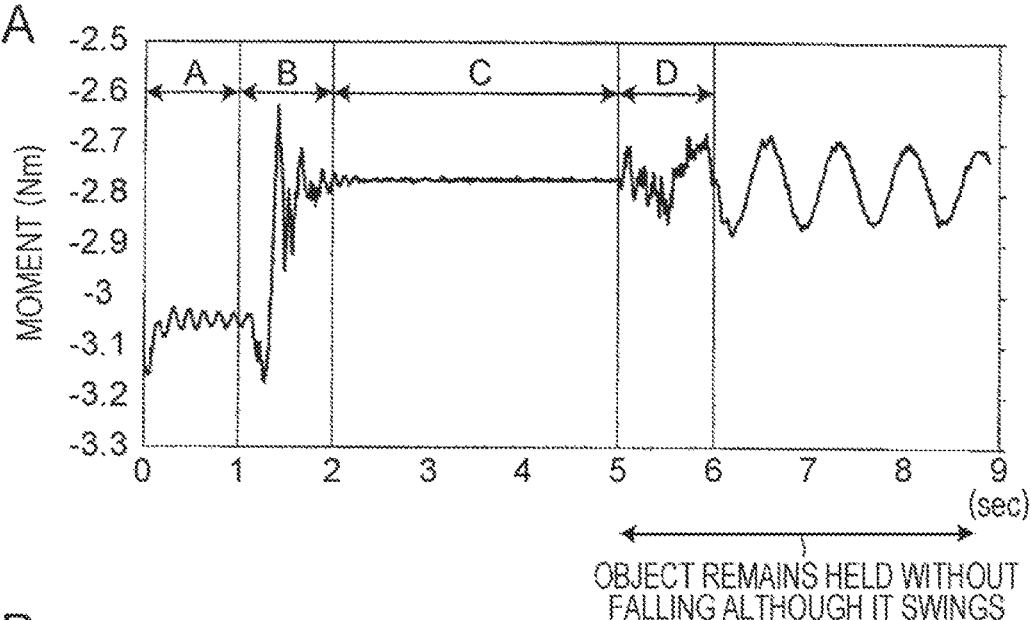
FIG. 6A is a graph illustrating time-series data of a moment applied to a suction position for a period from period A to a period D and a further period in FIG. 5A until an object is successfully held.

In this case, when the object 93 was fully taken out from the packing box 91 after period D, the object 93 did not fall down although a small swing occurred. FIG. 6A is a graph illustrating time-series data of a moment (in units of Nm) applied to a suction position from period A to a time after period D until the object 93 is successfully held by suction. In this figure, operations in the respective periods A, B, and C are the same as the operations in the periods A, B, and C in FIG. 5B. In the operation in period D in Experiment 2, unlike the operation in period D in Experiment 1, no large moment was applied to the object 93, and the operation of fully taking out the object from the packing box 91 was successful. In this case, it can be seen that a large difference in moment occurs between period A and period C in FIG. 6A, and the different is as large as corresponding to the first threshold value.

From the results obtained in Experiments 1 and 2, it can be seen that the swing that will occur when the object 93 is taken out from the packing box 91 can be estimated based on the difference in moment applied to the object 93 between period A and period C.

In Experiment 1, as shown in FIG. 5B, there is almost no difference in the value of the moment between period A and period C. In period D in which the object 93 is fully taken out, a large moment is suddenly applied to the object 93, which causes the object 93 to fall down from the suction nozzle 205.

On the other hand, in Experiment 2, a larger moment than in period A already occurs in period C. As a result, in period D, almost no further increase in the moment from the moment in period C occurs. Thus, by comparing the moment applied in period A when the object 93 is sucked and the moment applied in period C when the object 93 is lifted by a distance about one-half the height of the object 93, it is possible to estimate how much the object 93 swings when the object 93 is taken out from the packing box 91.

The results of these experiments described above are for the case in which the object 93 was placed on the shelf board 95 inclined by an inclination angle θ of 20°.

Figure 6B:
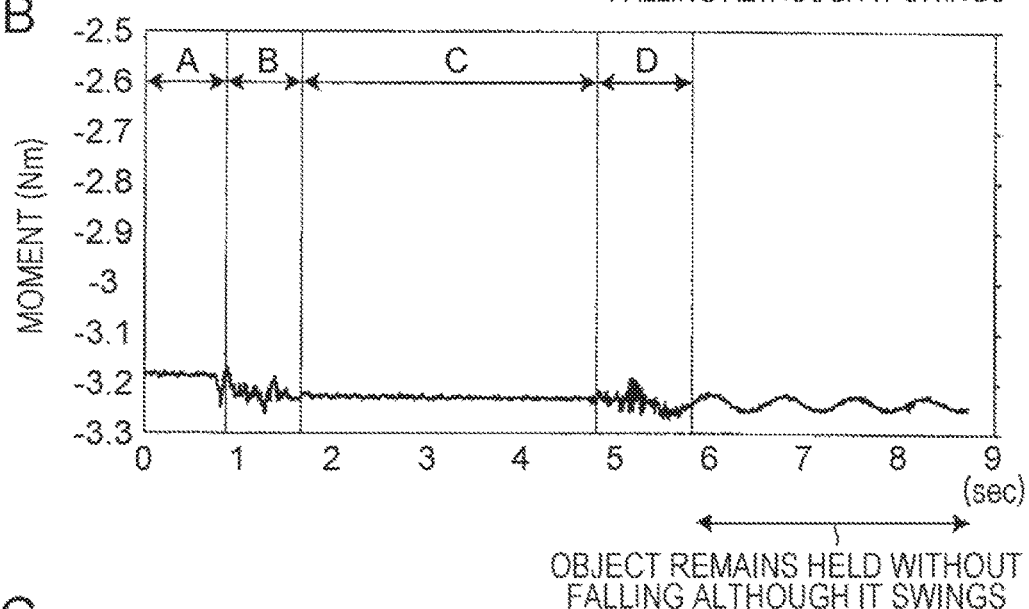
FIG. 6B is a graph illustrating time-series data of a moment applied to a suction position for a period until an object is successfully held for a case where the object is on a shelf board in FIG. 5A with an inclination angle θ of 0°.
Figure 6C:
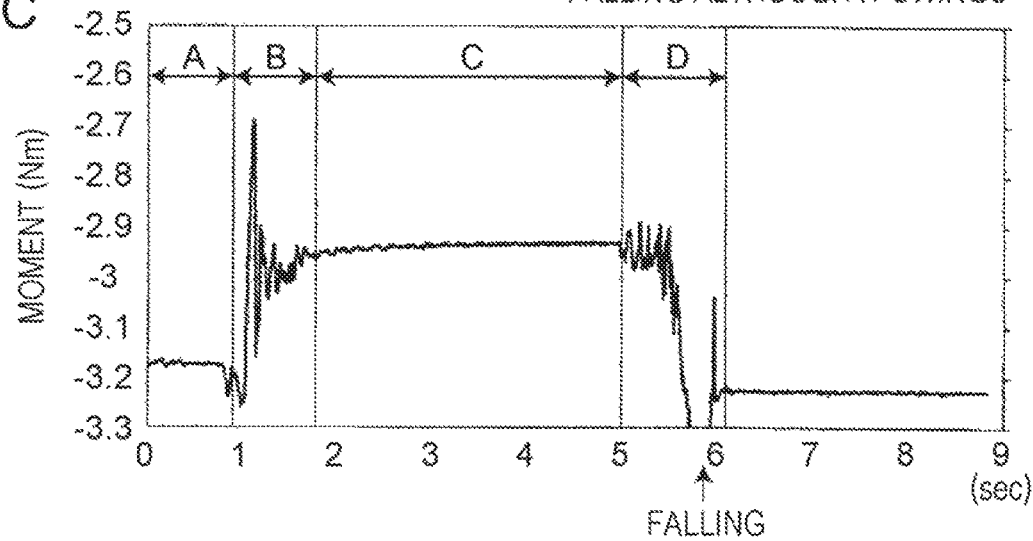
FIG. 6C is a graph illustrating time-series data of a moment applied to a suction position for a period until an object fall down for a case where the object is on a shelf board in FIG. 5A with an inclination angle θ of 0°.

Next, FIG. 6C shows results of experiments obtained when an object 93 was placed on a shelf board 95 inclined by an inclination angle θ of 0°.

The results of these experiments indicate that when the difference in the value of the moment between period A and period C within a proper range of the moment that varies depending on the inclination angle θ as shown in FIG. 7, the object 93 does not fall down when the object 93 is taken out from the packing box 91. For example, when the inclination angle θ=0°, the proper range of the moment is from −0.1 to 0.1 Nm. When the inclination angle θ=20°, the proper range of the moment is from 0.2 to 0.4 Nm.

As described above, the proper range of the moment varies depending on the inclination angle θ of the board on which the object 93 is placed. Therefore, as shown in FIG. 7, information on the relationship between the inclination angle θ and the proper moment is acquired in advance by an experiment, and the acquired information is stored in a storage unit such as an operation result database described later. This makes it possible, based on the stored information and the inclination angle θ, to estimate whether or not the object 93 will fall when the object 93 is taken out, from the moment acquired by the moment measurement unit 105 which will be described later. Note that in a case where values fluctuate in period A and period C, for example, the average value of the moments for a predetermined time is used in the estimation.

FIG. 6B and FIG. 6C show experimental results obtained for the case where the inclination angle θ of the shelf board 95 on which the object 93 was placed was 0° for different suction position s. When the inclination angle θ was 0°, that is, in a case where the object 93 was in a horizontally flat position, when the central position 93b of the object 93 was sucked, it was possible to take out the object 93 from the packing box 91 without the object 93 having swings (see FIG. 6B). In this experiment, there was a difference corresponding to the first threshold value between the value of the moment applied in period A and the value of the moment applied in period C. However, in the case where a position deviated from the center position 93b of the object 93 was sucked, the object 93 fell down when the object 93 was taken out from the packing box 91 (see FIG. 6C). In this case, there was a large difference greater than the first threshold value between the value of the moment applied in period A and the value of the moment applied in period C.

Specific configurations for estimating the falling of the object 93 in advance based on the knowledge obtained via the experiments can be implemented in embodiments as described below.

Embodiment 1

Figure 8B:
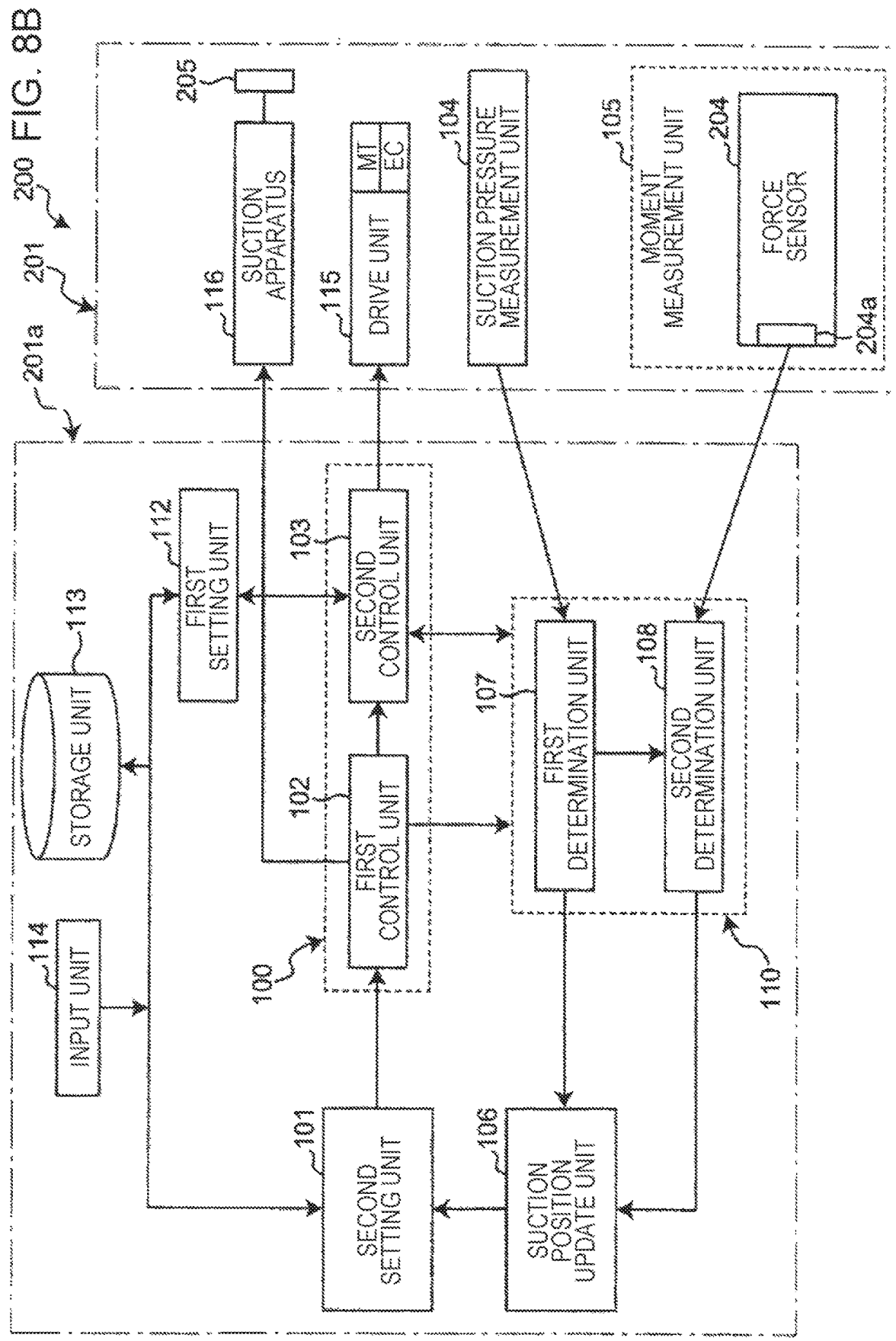
FIG. 8B is a more detailed functional block diagram of a robot arm apparatus as an example of an actuator apparatus.

FIG. 8A shows a functional block diagram of a robot arm apparatus 200 as an example of an actuator apparatus according to an aspect of the present disclosure. FIG. 8B shows a more detailed functional block diagram of the robot arm apparatus shown in FIG. 8A. The robot arm apparatus shown in FIG. 8B is an actuator apparatus configured such that one of the objects 93, arranged in the packing box 91 so as fill the packing box 91 with the object 93, is sucked by suction nozzle 205 and is taken out from the packing box 91 while a side surface of the one of the objects 93 is in contact with another object.

The robot arm apparatus 200 includes a robot arm controller 201a and the robot arm 201 which is an example of the actuator.

The robot arm controller 201a includes at least a first setter 112 functioning as an example of the taking-out movement distance setter and an operation controller 100. The taking-out movement distance setter sets the taking-out movement distance by which the robot arm 201 moves the object 93 to take it out from the packing box 91.

More specifically, the robot arm controller 201a further includes a second setter 101 functioning as a suction position setter and a second determination unit 108 functioning as an example of a determination unit. The robot arm controller 201a includes, as necessary, a storage unit 113 and an input unit 114. The suction position setter sets a first suction position or the first suction position and a second suction position at which the suction nozzle 205 sucks the object 93.

The robot arm 201 includes one suction nozzle 205 that sucks the object 93 and a moment measurement unit 105 that is an example of a first acquirer. The moment measurement unit 105 acquires a moment applied to the suction nozzle 205. More specifically, the moment measurement unit 105 acquires the difference between a first moment applied to the suction nozzle 205 when the object 93 is sucked by the suction nozzle 205 and a second moment applied to the suction nozzle 205 when the object 93 is taken out by a first taking-out movement distance from the packing box 91 by the suction nozzle 205. Here, the first taking-out movement distance is a distance by which the one of the objects is moved until it is taken out from the packing box 91, and The second setter 101 sets the suction position (for example, the first suction position) of the object 93 sucked by the suction nozzle 205.

The first setter 112 sets an intermediately-taking-out distance D1 and a fully-taking-out distance D2. The intermediately-taking-out distance D1 (see FIG. 5A) is a distance, smaller than the height H of the object 93, by which the object 93 is taken out from the packing box 91 in an intermediately-taking-out operation which is performed when the object 93 is sucked by the suction nozzle 205 and then pulled up by the robot arm 201 from the packing box 91 such that the object 93 is not fully taken out but partially taken out from the packing box 91 (see FIG. 5A). The fully-taking-out distance D2 (see FIG. 5A) is a distance, larger than the height H of the object 93, by which the object 93 is fully taken out from the packing box 91 in a fully-taking-out operation.

The operation controller 100 controls the suction and taking-out operations performed by the robot arm 201. Specifically, the operation controller 100 controls whether or not to further continue the taking-out operation based on the difference between the two moments acquired by the moment measurement unit 105. More specifically, the operation controller 100 controls the operation of the robot arm 201 based on the suction position and the intermediately-taking-out distance D1 and the fully-taking-out distance D2 set by the second setter 101 and the first setter 112 such that the object 93 is moved to the suction position by the drive unit 115, and the drive unit 115 performs the intermediately-taking-out operation and the fully-taking-out operation while the suction apparatus 116 sucks the object 93 at the suction position. The operation controller 100 includes, by way of example, a first controller 102 and a second controller 103.

The moment measurement unit 105 acquires the difference ΔM between a moment M1 applied to the suction nozzle 205 when the suction nozzle 205 sucks the object 93 and a moment M2 applied to the suction nozzle 205 when the object 93 is taken out by the suction nozzle 205 by the first taking-out movement distance D1, that is, when the object 93 is taken out halfway.

Based on the difference ΔM between the two moments M1 and M2 acquired by the moment measurement unit 105, the second determination unit 108, predicts a swing that may occur on the object 93 when the robot arm 201 performs the fully-taking-out operation while sucking the object 93 with the suction nozzle 205 under the control of the operation controller 100. The second determination unit 108 then determines based on the prediction whether the fully-taking-out operation is to be performed by the robot arm 201 under the control of the second controller 103.

Note that second determination unit 108 and a first determination unit 107, which will be described later, form an operation determination unit 110.

In addition to the above configuration, the robot arm apparatus 200 may further include a first determination unit 107, a suction pressure measurement unit 104, a suction position update unit 106, a storage unit 113, and an input unit 114. The input unit 114 may input, as necessary, parameters relating to control of the taking-out operation such as coordinates of the suction position, the intermediately-taking-out distance D1, and/or the fully-taking-out distance D2, and may store them in the storage unit 113.

Each component is described below.

Storage Unit 113

The storage unit 113 stores information used by the setters 101 and 112 and the controllers 102 and 103, and may also store information used by the determination units 107 and 108 as necessary.

As shown in FIG. 9, the storage unit 113 stores at least the coordinates of the suction position on the upper surface of the object 93, that is, the x, y, and z coordinates, the rotation angles (α, β, γ) about a roll axis (that is, around the x axis), a pitch axis (that is, the y axis), and a yaw axis (that is, yaw about the z axis), and the height H of the object 93. Furthermore, the storage unit 113 stores, by way of example, the lateral and longitudinal sizes of the upper surface 93a of the object 93 (that is, the width and the depth), the weight, and the suction pressure. By way example, the z coordinate of the suction position may be stored as a fixed value in the storage unit 113 regardless of the object 93. In the case where the storage unit 113 stores the lateral and longitudinal sizes of the upper surface and the height H of each article 92 forming the aggregate, that is the object 93, and the number of articles 92, the lateral and longitudinal sizes of the upper surface 93a of the object 93 may be calculated in advance from the number of articles forming the aggregate, the lateral and longitudinal sizes of the upper surface of each article, and the height H thereof and the calculated values may be stored, or they may be determined by calculation by the second setter 101.

The storage unit 113 may be disposed in the robot arm apparatus 200, or may be disposed in a server or the like outside the robot arm apparatus 200 configured such that information can be transmitted via a communication unit or the like.

Robot Arm 201

The robot arm 201 of the robot arm apparatus 200 is an example of an actuator. The robot arm 201 performs an operation of taking out the object 93 from the packing box 91. The robot arm 201 has by way of example six rotary joints 206 and have six or more ° of freedom. Each rotary joint 206 is provided with a drive unit 115 including a drive apparatus such as a motor MT that independently drives the rotary joint 206 in forward and reverse directions. By way of example, an encoder EC is attached to each motor MT that forms the drive unit 115 so as to make it possible to detect movement amounts in the x, y, z axis directions and the amount of rotation about each axis.

As with the robot arm 201 described above, a suction nozzle 205 with a camera 203 is attached to the hand 202 of the robot arm 201, as shown in FIG. 3A. That is, the camera 203 is attached to the suction nozzle 205 such that the camera 203 detects the suction position of the upper surface 93a of the object 93 in the packing box 91. After the detection, the operation of taking-out the object 93 from the packing box 91 is performed such that the suction nozzle 205 sucks the object 93 at the suction position on the upper surface 93a of the object 93, and the object 93 is taken out from the packing box 91 while holding the object 93 by the suction. The taken-out object 93 may be placed on another tray or the like for sorting.

When the suction nozzle holds the object 93, the force acting on the force sensor 204 via the suction nozzle 205, the moments M1 (Mx, My, Mz), and M2 (Mx, My, Mz) are measured.

FIG. 3G shows examples of a force (Fx, Fy, Fz) acting on each axis, and the moment M1 (Mx, My, Mz) about the x-axis direction, the y-axis direction, and the z-axis direction detected by the force sensor 204 when an object is sucked by the suction nozzle at a suction position specified by one of suction position numbers 1 to 5 shown in FIG. 11B.

FIG. 3H shows examples of a force (Fx, Fy, Fz) acting on each axis, and the moment M2 (Mx, My, Mz) about the x-axis direction, the y-axis direction, and the z-axis direction detected by the force sensor 204 when an object is lifted up by the suction nozzle at a suction position specified by one of the suction position numbers 1 to 5 shown in FIG. 11B.

The difference ΔM between the two moments M1 and M2 acquired by the force sensor 204 of the moment measurement unit 105 is determined by calculating M2−M1 by the calculation unit 204a.

Instead of using the force sensor 204, control may be performed using a pressure sensor that measures a suction pressure.

Second Setter 101

The second setter 101 sets a suction position (for example, a first suction position) on the upper surface 93a of the object 93, where the object 93 is to be held by suction by the suction nozzle 205, and inputs information on the set suction position to the operation controller 100.

The suction position is given by coordinates of x, y, and z in the xyz coordinate system defined on the robot arm 201, and rotation angles (α, β, γ) of a roll axis (that is, about the x axis), a pitch axis (that is, about the y axis), and a yaw axis (that is, about the z axis).

Figure 10:
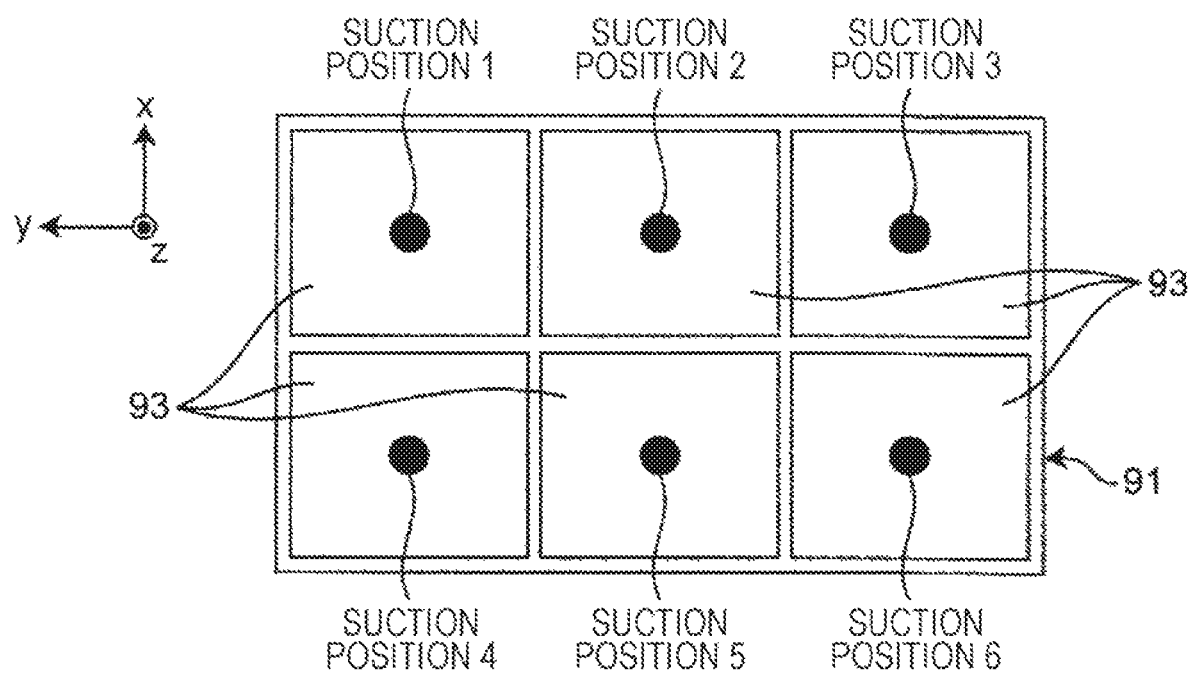
FIG. 10 is a diagram showing by way of example six suction positions 1 to 6 of six objects in a packing box.

FIG. 9 shows examples of suction information data for two types of objects 93 denoted as "A" and "B". In FIG. 9, x, y, and z coordinates, and rotation angles (α, β, γ) about the roll axis (about the x-axis), the pitch axis (about the y-axis), and the yaw axis (about the z-axis) are shown for each of six suction positions 1 to 6. FIG. 10 shows examples of a total of six suction positions 1 to 6 defined on respective six objects 93 of type A arranged, in a packed fashion, in a packing box 91. The set information is stored in the storage unit 113. As will be described later, when a suction position is changed, updated suction position information is input from the suction position update unit 106 to the second setter 101, and the suction position information is updated. The second setter 101 resets the suction position on the upper surface 93a of the object 93 (for example, the second suction position) according to the updated suction position.

First Setter 112

The first setter 112 sets the intermediately-taking-out distance D1 and the fully-taking-out distance D2, respectively, and inputs them to the second controller 103.

The intermediately-taking-out distance D1 is a movement distance, smaller than the height H of the object 93, by which the object 93 moves as measured from the bottom of the packing box 91 when the intermediately-taking-out operation is performed such that the object 93 is sucked by the suction nozzle 205 and is pulled up by the robot arm 201 under the control of the second control unit 103 from packing box 91 into a state in which the object 93 is not fully taken out from the packing box 91. The intermediately-taking-out distance D1 may be set to be equal to, by way of example but not limitation, one-half the height H of the object 93. However, the value is not limited to this example, and an arbitrary value may be used as long as the value defines a distance by which the object 93 moves to a position in which the object 93 is partially taken out from the packing box 91. During the intermediately-taking-out operation, the object 93 subjected to the operation comes into contact with a part of a wall, located lower than the object 93, of the packing box 91 or a side surface of another object 93 thereby being supported loosely, which makes it possible for the object 93 not to fall down by swinging.

The height H of the object 93 is stored, as information, in the storage unit 113.

The fully-taking-out distance D2 is a movement distance by which, after the object 93 is sucked by the suction nozzle 93 and the intermediately-taking-out operation is finished, the object 93 is further pulled up by the robot arm 201 under the control of the second controller 103 thereby being taken out from the packing box 91. Note that the value of the distance D2 is defined as measured from the bottom of the packing box 91. The fully-taking-out distance D2 is a value larger than the height H of the object 93, and is defined as a distance, as measured from the bottom of the packing box 91, reached when the object 93 is fully taken out from the packing box 91 as a result of the fully-taking-out operation. Note that, actually, after the intermediately-taking-out operation is finished, the object 93 is further pulled up from the packing box 91 by a distance equal to the difference (D2−D1) between the fully-taking-out distance D2 and the intermediately-taking-out distance D1. For example, the fully-taking-out distance D2 may be an arbitrary value greater than the height H of the object 93.

First Controller 102

The first controller 102 performs control such that the suction nozzle 205 of the hand 202 of the robot arm 201 is moved toward the suction position set by the second setter 101, the suction nozzle 205 is brought close to or in contact with the suction position on the upper surface 93a of the object 93, and the object 93 is sucked by the suction nozzle 205.

More specifically, the first controller 102 drives the drive unit 115 via the second controller 103 described below such that the suction nozzle 205 is moved toward the suction position, and the suction nozzle 205 is brought close to or in contact with the suction position on the upper surface 93a of the object 93. Next, the first controller 102 controls the suction apparatus 116 to perform the suction operation by the suction nozzle 205. Note that the suction pressure of the suction nozzle 205 of the suction apparatus 116 may be changed, as necessary, to at least two suction pressures. In the first controller 102, information for controlling the suction operation is input to the first determination unit 107.

First Determination Unit 107

The first determination unit 107 determines, based on the suction pressure measured by the suction pressure measurement unit 104, whether or not the suction is successful as a result of the suction control being performed by the first controller 102. More specifically, in a case where the suction pressure input from the suction pressure measurement unit 104 to the first determination unit 107 is a negative pressure stronger a predetermined suction pressure (for example, −25 kPa), the first determination unit 107 determines that the suction is successful. Information indicating that it is determined that the suction is successful is input to the second controller 103. In a case where the suction pressure is not a negative pressure stronger the predetermined suction pressure, the first determination unit 107 determines that the suction is unsuccessful. Information indicating that it is determined that the suction is unsuccessful is input to the second controller 103 and also to the suction position update unit 106.

Second Controller 103

When the information on the suction success determination is input from the first determination unit 107, the second controller 103, to make a determination by the second determination unit 108 as to whether or not the fully-taking-out operation is to be performed, first, controls the drive unit 115 to perform the intermediately-taking-out operation such that the object 93 is pulled up to an intermediate position. In this intermediately-taking-out operation, when the drive unit 115, under the control of the second controller 103, has taken out the object 93 by the intermediately-taking-out distance D1 from the packing box 91, the second controller 103 control the drive unit 115 to stop temporarily. The second controller 103 waits for determination information to be received from the operation determination unit 110, that is, the second determination unit 108. When the success determination notification information from the second determination unit 108 is input to the second controller 103, the second controller 103 controls the drive unit 115 to perform the fully-taking-out operation such that the object 93 is pulled up until the object 93 is fully taken out from the packing box 91. In the fully-taking-out operation, the second controller 103 controls the drive unit 115 to pull up the object 93 so as to finally reach the fully-taking-out distance D2 thereby fully taking out the object 93 from the packing box 91.

If the failure determination notification information from the second determination unit 108 is input to the second controller 103, the second controller 103 controls the drive unit 115 to lower the object 93 by a distance equal to the intermediately-taking-out distance D1 so as to return the object 93 into the packing box 91 and then re-execute the intermediately-taking-out operation. In the re-execution of the intermediately-taking-out operation, for example, the suction pressure is changed and the suction is re-executed, or the z-axis coordinate, the x-axis coordinate, or the y-axis coordinate at the suction position is changed and the suction is re-executed. More specifically, the operation of changing the suction pressure and re-executing the suction pressure is performed as described below under the control of the operation controller 100. In the case where based on the difference ΔM between the two moments M1 and M2, the taking-out operation by the robot arm 201 is controlled not to be continued, the taking-out operation is stopped and the object 93 is returned to the original position in the packing box 91. Thereafter, the suction pressure at the suction position is changed from the first suction pressure to the second suction pressure. After that, the operation of the robot arm 201 is controlled such that the object 93 is sucked at the suction position and the taking-out operation is re-executed. The difference ΔM between the two moments M1 and M2 is acquired again by the moment measurement unit 105, and control is performed as to whether or not the taking-out operation by the robot arm 201 is to be continued.

On the other hand, if the suction failure determination notification is input from the first determination unit 107, then the second controller 103 performs control such that after the drive unit 115 is driven to return the object 93 to the original position in the packing box 91, the drive unit 115 is not further driven, but the second controller waits for suction success determination notification to be input from the first determination unit 107.

Suction Pressure Measurement Unit 104

The suction pressure measurement unit 104 measures the suction pressure on the upper surface 93a of the object 93 provided by the suction nozzle 205 when the suction operation is controlled by the first controller 102, and the suction pressure measurement unit 104 inputs a measured value to the first determination unit 107.

Moment Measurement Unit 105

The moment measurement unit 105 is specifically implemented by the force sensor 204. Under the control of the second controller 103, the force sensor 204 measures the moment My about the y-axis applied to the hand 202 of the robot arm 201 when the object is sucked and when the intermediately-taking-out operation is performed. The difference ΔM between the two measured values is calculated by the calculation unit 204a, and the calculated difference ΔM is input to the second determination unit 108. The difference ΔM between these two measured values is data used by the operation controller 100 in controlling the taking-out operation.

More specifically, the force sensor 204 measures the value of the moment My about the y-axis applied to the hand 202 of the robot arm 201. FIG. 5B is a graph showing an example of time-series data of measured moment My. To obtain more accurate measured values, the force sensor 204 may acquire time-series data of the moment My measured for a predetermined time period (for example, 1 sec) starting from sucking is performed and for a time period starting from the completion of the intermediately-taking-out operation. Alternatively, as for the measured value of the moment My at the intermediately-taking-out distance, the force sensor 204 may acquire the average value of values of the moment My measured for a predetermined time period (for example, 3 sec) from when the intermediately-taking-out operation is completed after sucking is performed and the hand 202 is moved by the intermediately-taking-out distance D1.

Furthermore, in order to complete the measurement quickly, the force sensor 204 may acquire the value of the moment My at the time of completion of the intermediately-taking-out operation as the measured value. The measurement value acquired by the force sensor 204 is input to the second determination unit 108.

Second Determination Unit 108

Based on the difference ΔM between the moment My about the y-axis direction measured by the force sensor 204 when the suction operation is performed under the control of the first controller 102 and that measured when the intermediately-taking-out operation is performed under the control of the second controller 103, the second determination unit 108 estimates the magnitude of swinging that will occur when the object 93 is fully taken out from the packing box 91, and determines whether or not the fully-taking-out operation is to be performed.

More specifically, the difference ΔM between the moment My about the y-axis that is measured when the object 93 is sucked by the suction nozzle 205 under the control of the first controller 102 and that measured when the object 93 is intermediately taken out under the control of the second controller 103 is evaluated by the second determination unit 108 as described below. That is, in a case where the second determination unit 108 determines that the difference ΔM between the moments under evaluation is within the proper range of the moment value shown in FIG. 7, which is an example of the first threshold value, for example, in a case where the difference ΔM is equal to or greater than the first threshold value, the second determination unit 108 determines that the swing that will occur when the object 93 is fully taken out is as small as not to cause the fully-taking-out operation to be failed. Therefore, in this case, the second determination unit 108 determines that it is allowed to execute the fully-taking-out operation. In the other cases, the second determination unit 108 determines that it is not allowed to execute the fully-taking-out operation. For example, when the difference ΔM is smaller than the first threshold value, the second determination unit 108 determines that the taking-out operation is stopped without being continued. Information indicating the result of the determination made by the second determination unit 108 is input to the second controller 103 and the suction position update unit 106.

When the second determination unit 108 determines that it is allowed to execute the fully-taking-out operation, the fully-taking-out operation is executed under the control of the second controller 103. On the other hand, when the second determination unit 108 determines that it is not allowed to execute the fully-taking-out operation, the suction position is changed by the suction position update unit 106.

Suction Position Update Unit 106

When the first determination unit 107 determines that the suction has failed, the suction position update unit 106 changes the suction position for the object 93, and updates the information stored in the storage unit 113. Furthermore, the suction position update unit 106 inputs the information indicating the changed suction position to the second setter 101. The second setter 101 resets the suction position to the changed suction position. In a case where the second determination unit 108 determines that large swinging will occur and it is not allowed to perform the taking-out operation, the suction position update unit 106 changes the changes the suction position for the object 93 and updates the suction position. Also in this case, the information indicating the changed suction position is input to the second setter 101, and the second setter 101 resets the suction position to the changed suction position. In these cases, the values changed are the x coordinate value, and the y coordinate value or the z coordinate value, and the rotation angles about the pitch axis, the roll axis, and the yaw axis are not changed.

Figure 11C:
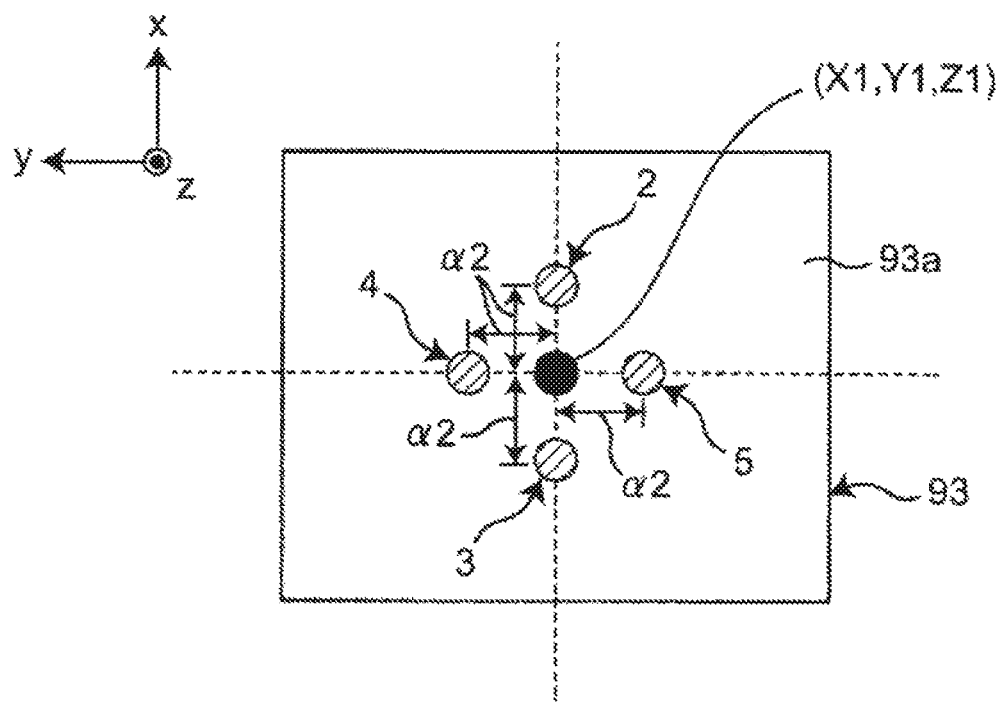
FIG. 11C is a plan view of an upper surface of an object in which changed suction positions 2 to 5 are shown.
Figure 11D:
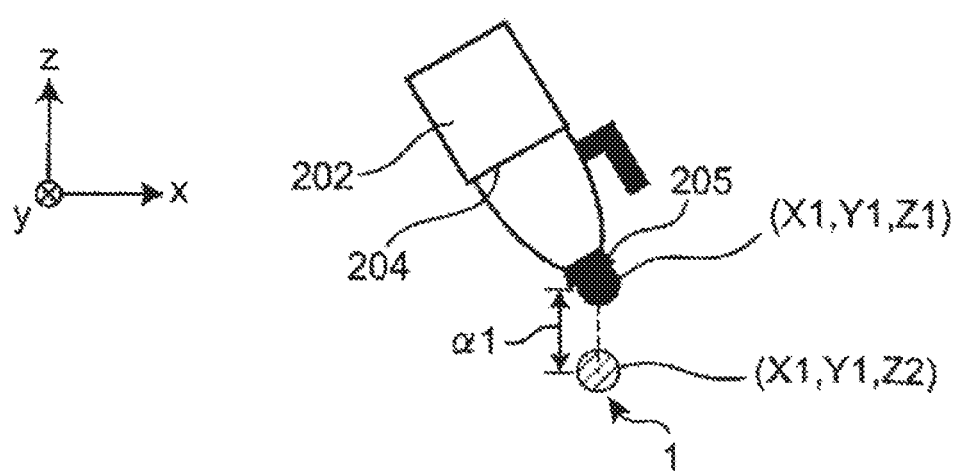
FIG. 11D is a side view showing a Z-coordinate of an original suction position before being changed and a Z-coordinate of a changed suction position 1.

More specifically, in the case where the first determination unit 107 determines that the suction has failed, first, the suction position update unit 106 changes the suction position in the negative z-axis direction, and the suction position update unit 106 inputs the information indicating the changed suction position to the second setter 101. The second setter 101 resets the suction position to the changed suction position. For example, the suction position shown FIG. 11A is changed to the suction position of number 1 shown in FIG. 11B and FIG. 11D. Compared with the suction position shown in FIG. 11A, the suction position of number 1 is different in that the position in the z-axis direction is changed from a coordinate Z1 to a coordinate Z2 which is shifted by a distance α1 in a negative direction. As described above, after the suction position update unit 106 changes the suction position in the z-axis direction and the second setter 101 resets the suction position, the suction operation is performed under the control of the first controller 102, and the suction is again evaluated by the first determination unit 107. If the suction is still unsuccessful, the suction position update unit 106 changes the suction position in the x-axis direction or the y-axis direction. For example, the suction position of number 1 shown FIG. 11B is changed to the suction position of number 3 shown in FIG. 11B and FIG. 11C. Compared with the suction position of number 1 shown in FIG. 11B, the suction position of number 3 is different in that the position in the z-axis direction is changed from a coordinate X1 to a coordinate X3 which is shifted by a distance α2 in a negative direction. After the suction position update unit 106 changes the suction position in the x-axis direction in the above-described manner, the suction operation is performed under the control of the first controller 102, and the suction is evaluated again by the first determination unit 107. The above-described method of changing the suction position is merely an example. Depending on the object 93, the suction position update unit 106 may predetermine the order of changing the suction position in the x-axis direction, the y-axis direction, or the z-axis direction.

Figures 12A, 12B, 12C:
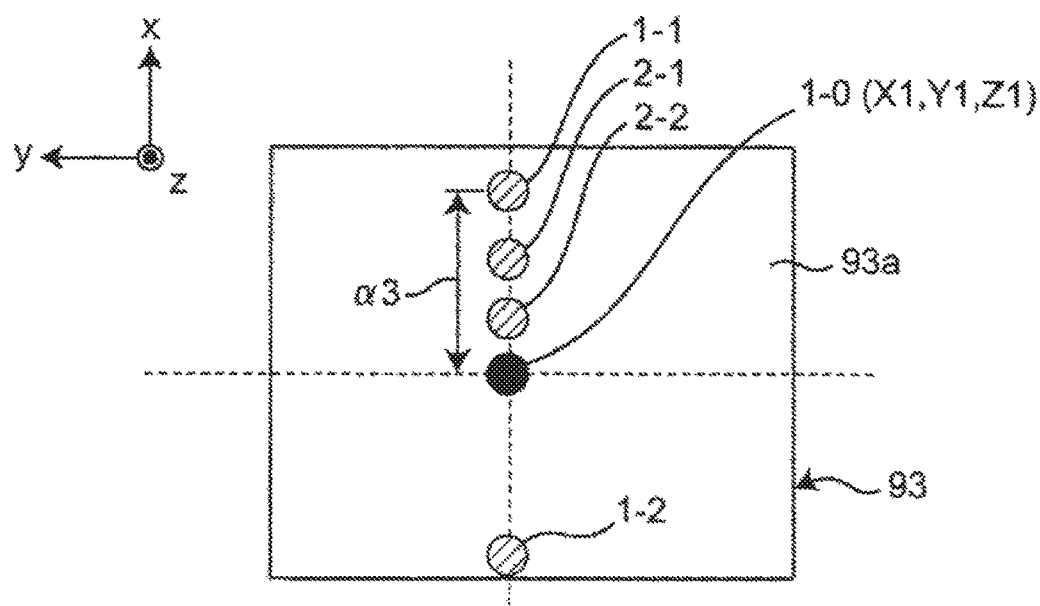
FIG. 12A is a diagram showing XYZ coordinates of an original suction position 1-0 before being changed.
FIG. 12B is a diagram showing, in a table, XYZ-coordinate sets of changed suction positions 1-1, 1-2, 2-1, and 2-2.
FIG. 12C is a plan view of an upper surface of an object in which changed suction positions in FIG. 12B are shown.

In the case where the second determination unit 108 determines that the object 93 will have a large swing and thus it is not allowed to execute the fully-taking-out operation and furthermore the value is out of the range defined by the first threshold value, the suction position is greatly changed in the positive x-axis direction from suction position at the coordinate X1 to the suction position 1-1 at the coordinate X4 as shown in FIG. 12A. As described above, after the suction position update unit 106 changes the suction position in the position x-axis direction and the intermediately-taking-out operation is performed under the control of the second controller 103. The moment My is measured by the force sensor 204, and the second determination unit 108 determines again whether or not object 93 will have a large swing. In a case where the second determination unit 108 still determines that the object 93 will have a large swing and thus it not allowed to execute the fully-taking-out operation, if the deviation from the range defined by the first threshold value is smaller after the change than before, the suction position is changed to a position 2-1 close to the previously changed suction position, but otherwise the suction position is changed to a position 2-2 close to the original suction position 1-0. The determination as to whether the deviation from the range defined by the first threshold value is smaller or not made by the second determination unit 108 may be stored in the storage unit 113 such that when the determination is made for the next time by the second determination unit, the result stored in the storage unit 113 may be referred to.

Object Taking-Out Operation

Figure 13A:
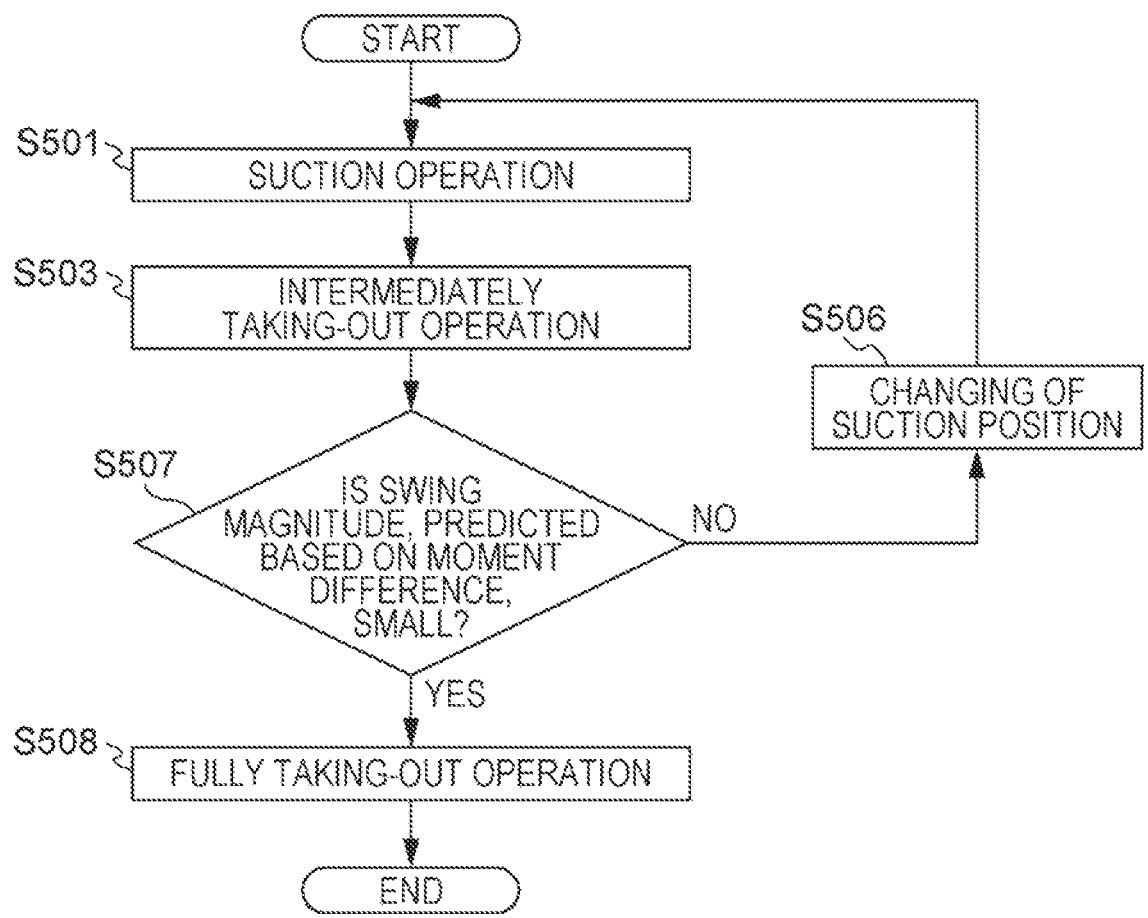
FIG. 13A is a flowchart illustrating an object taking-out operation performed by an actuator apparatus.

As shown in FIG. 13A, the object taking-out operation includes at least a suction operation in step S501, an intermediately-taking-out operation in step S503, a second determination operation in step S507, and a fully-taking-out operation in step S508. The object taking-out operation may further include a suction position change operation in step S506.

In this object taking-out method, using the robot arm apparatus 200, one of the objects 93 placed in a fully packed state in a packing box 91 is sucked a suction nozzle 205 is taken out from the packing box 91 while a side surface of the object 93 is contact with another object.

First, in the suction operation of step S501, the object 93 is sucked by the suction nozzle 205 of the robot arm 201 such that the suction position set by the second setter 101 is sucked.

Next, in step S503, the intermediately-taking-out operation, in which the object 93 is not fully taken out from the packing box 91, is performed such that while sucking the object 93, the robot arm 201 takes out the object 93 from the packing box 91 by a distance equal to the intermediately-taking-out distance D1 being a value smaller than the height H of the object 93.

Next, in the first determination operation in step S507, based on the difference ΔM between the moment M1 applied to the suction nozzle 205 when the suction nozzle 205 sucks the object 93 and the moment M2 applied to the suction nozzle 205 when the object 93 is taken out to the intermediately-taken position by the suction nozzle 205, the first determination unit 107 estimates the swing the object 93 will have when the fully-taking-out operation is performed such that the object 93 is held by suction by the suction nozzle 205 and is taken out by the robot arm 201 by a distance greater than the height H of the object 93 into a state in which the object 93 is fully taken out from the packing box 91, and the second determination unit 108 determines whether or not the fully-taking-out operation is to be performed by the robot arm 201 under the control of the second controller 103.

If the second determination unit 108 determines that the fully-taking-out operation is to be performed, then in step S508, the fully-taking-out operation is performed by controlling the robot arm 201 such that the object 93 is sucked at the suction position and is taken out according to the fully-taking-out distance D2.

If the second determination unit 108 determines that the fully-taking-out operation is not to be performed, then in the suction position change operation in step S506, the intermediately-taking-out operation is stopped and the object 93 is returned to the original position in the packing box 91. Thereafter, the suction position is changed.

The basic operation of the object taking-out method has been described above.

Figure 13B:
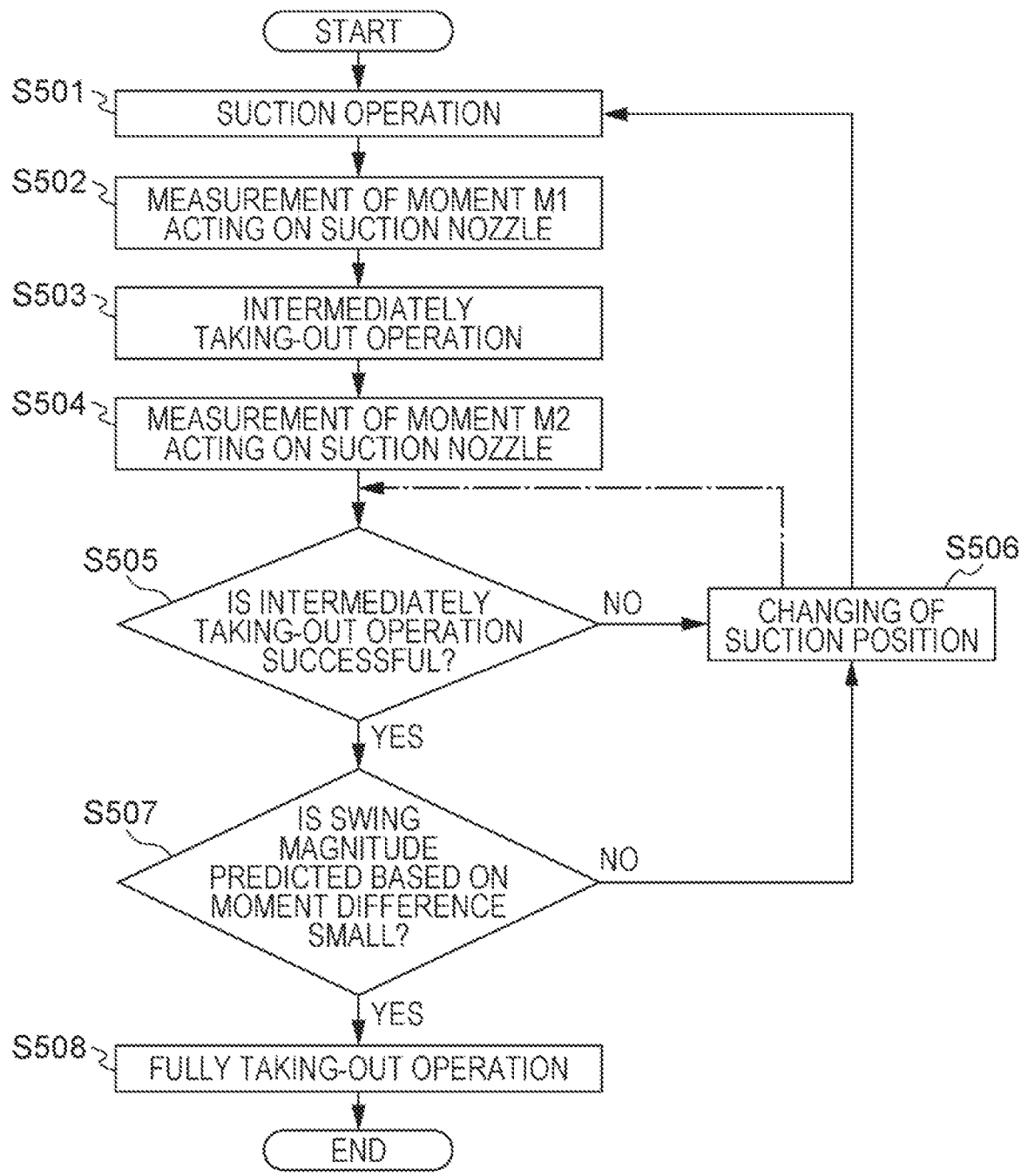
FIG. 13B is a flowchart illustrating a specific example of an object taking-out operation performed by an actuator apparatus.

FIG. 13B shows a flowchart showing a more specific example of the object taking-out operation by the robot arm apparatus 200. This object taking-out operation includes a suction operation in step S501, an operation of measuring a first moment M1 in step S502, an intermediately-taking-out operation in step S503, an operation of measuring a second moment M2 in step S504, a first determination operation in step S505, a suction position change operation in step S506, a second determination operation in step S507, and a fully-taking-out operation in step S508.

Step S501

In step S501, first, the second setter 101 sets the suction position on the upper surface 93a of the object 93 where the object 93 is to be held by suction. The suction position is given by x, y, and z coordinates and rotation angles about a pitch axis, a roll axis, and a yaw axis.

An allowed area in the upper surface 93a of the object 93 within which the suction position is allowed to be set is defined in advance, and values are set such that the suction position falls within the allowed area. The operation up to this point is a preparatory operation for the suction operation.

After the suction position is set, the first controller 102 drives the drive unit 115 to move the suction nozzle 205 of the hand 202 of the robot arm 201 to the set suction position set by the second setter 101 for preparation for the suction operation.

After the suction nozzle 205 is moved to the suction position, the hand 202 of the robot arm 201 is moved and the first controller 102 controls the suction apparatus 116 to hold the object 93 by suction by the suction nozzle 205.

Figure 14:
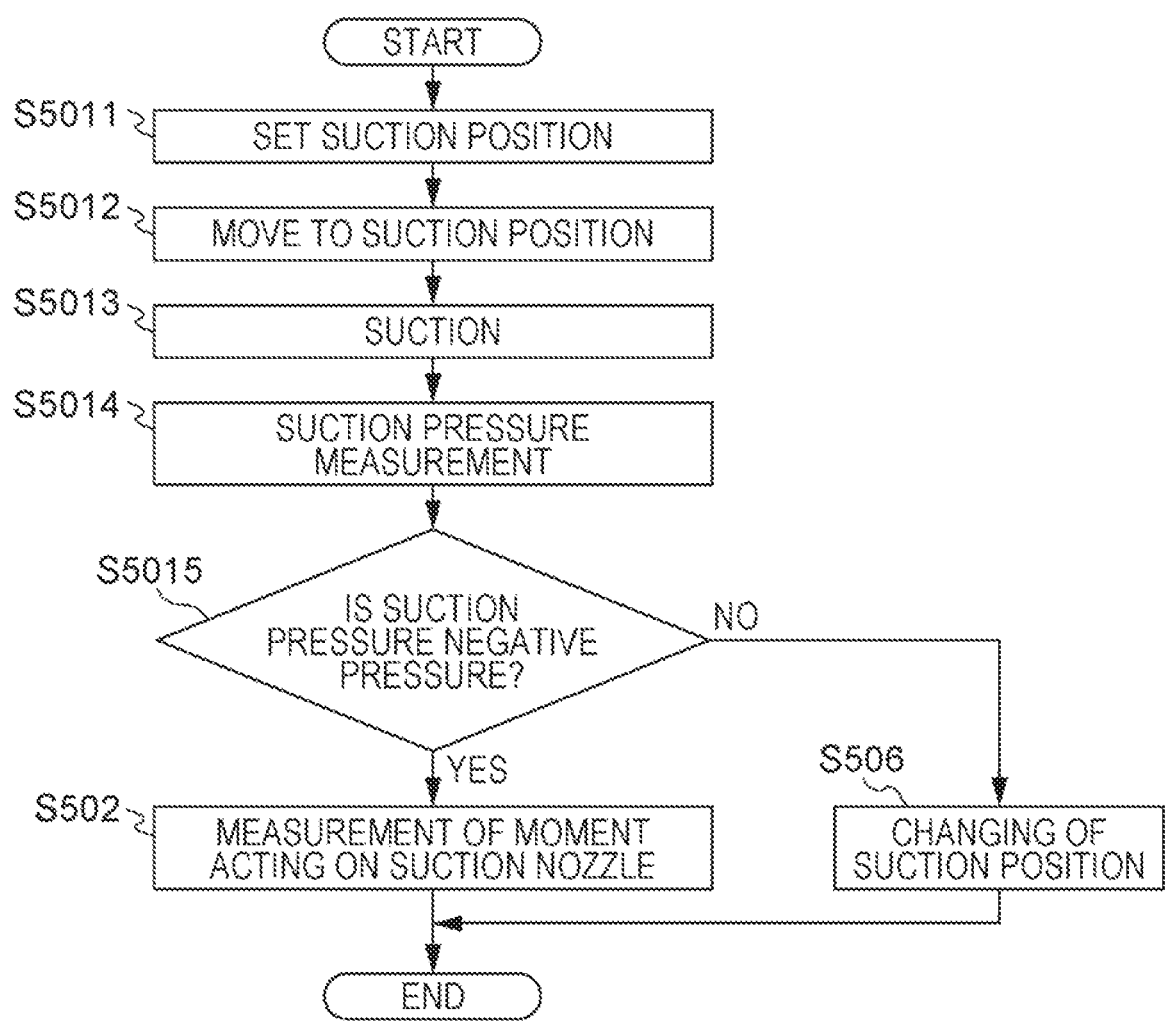
FIG. 14 is a flowchart illustrating a detailed operation in step S501 in FIG. 13B.

More specifically, the operation in step S501 is performed as described below with reference to FIG. 14.

First, in step S5011, the second setter 101 sets the suction position.

Next, in step S5012, the first controller 102 drives the drive unit 115 via the second controller 103 to move the suction nozzle 205 to the suction position set in step S5011.

Next, in step S5013, the first controller 102 controls the suction apparatus 116 to perform the suction operation on the object 93 by using the suction nozzle 205 at the suction position.

Next, in step S5014, the suction pressure during the suction operation is measured by the suction pressure measurement unit 104, and a measured value is input to the first determination unit 107.

Next, in step S5015, the first determination unit 107 determines whether or not the suction pressure is a negative pressure that provides a stronger suction pressure than a predetermined value. In a case where the first determination unit 107 determines that a stronger suction pressure than the predetermined value is provided by the negative pressure, the process proceeds to step S502 in which the moment measurement unit 105 measures the moment M1 that occurs when the holding by suction is performed In a case where the first determination unit 107 determines in step S5015 that the suction pressure provided by the negative pressure is not stronger than the predetermined value, the process proceeds to step S506, in which the intermediately-taking-out operation is stopped and the object 93 is returned to the original place in the packing box 91. Thereafter, the suction position is changed.

The detailed description of the operation in step S501 has been given above.

Step S502

Next, the moment measurement unit 105 measures, using the force sensor 204, the moment My acting on the suction nozzle 205 of the robot arm 201 about the y-axis when the object 93 is held by suction in step S501. The measured value is acquired as the first moment M1, and is stored in the storage unit 113 together with time information provided from a built-in timer.

Whether or not the object 93 is held by suction in step S501 can be detected from a change in the pressure applied to the suction nozzle 205 measured by the suction pressure measurement unit 104. For example, in a case where the pressure measured by the suction pressure measurement unit 104 is a negative pressure, it is assumed that the object 93 is held by suction, and the time of this occurrence and the magnitude of the moment measured by the force sensor 204 as the first moment M1 are acquired. Alternatively, the time when the object 93 is held by suction in step S501 may be given by a time when the suction operation control is performed by the first controller 102.

Step S503

Next, under the control of the second controller 103, the drive unit 115 performs driving to perform the intermediately-taking-out operation such that the object 93 sucked by the suction nozzle 205 in step S501 is pulled up from the packing box 91 by the intermediately-taking-out distance D1 which is about half the height H of the object 93. The second controller 103 controls the driving of the drive unit 115 such that the hand 202 having the suction nozzle 205 moves in the z direction by a distance equal to the intermediately-taking-out distance D1 from the position where the object 93 is sucked. In this state, the driving of the drive unit 115 is temporarily stopped.

Step S504

Next, the moment measurement unit 105 measures, using the force sensor 204, the moment My acting on the suction nozzle 205 of the robot arm 201 about the y-axis when the object 93 is in the state in which the object 93 is pulled up, under the control of the second controller 103, by the intermediately-taking-out distance D1 which is one-half the height H of the object 93. Thus, the moment measurement unit 105 acquires the measurement value as the second moment M2 and stores it in the storage unit 113 together with time information supplied from the built-in timer.

Whether or not the object 93 has been pulled up to a height one-half the height H of the object 93 is detected based on whether under the control of the second controller 103, the drive unit 115 has moved the hand 202 by the intermediately-taking-out distance D1.

Step S505

Thereafter, the first determination unit 107 performs a first determination operation. That is, the first determination unit 107 determines whether or not the suction is successful, based on the pressure applied to the suction nozzle 205 measured by the suction pressure measurement unit 104. In other words, the first determination unit 107 determines whether or not the object 93 has been intermediately taken out successfully by the suction nozzle 205 without having been fully taken out from the packing box 91. In a case where the pressure measured by the suction pressure measurement unit 104 is a negative pressure, the first determination unit 107 determines that the intermediately-taking-out operation is successful.

In a case where the first determination unit 107 determines that the intermediately-taking-out operation is successful, the process proceeds to step S507. In a case where the first determination unit 107 determines that the intermediately-taking-out operation is not successful, the process proceeds to step S506.

Figure 15:
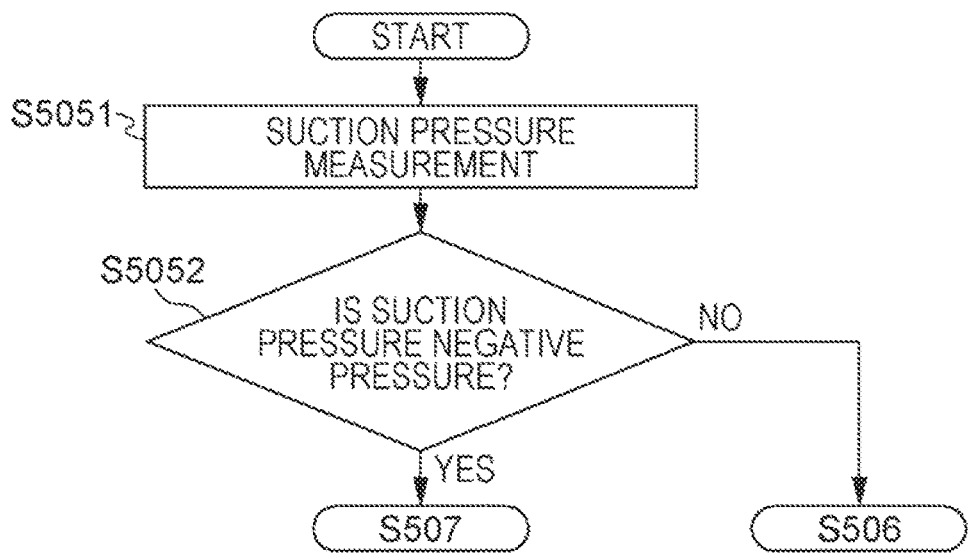
FIG. 15 is a flowchart illustrating a detailed operation in step S505 in FIG. 13B.

FIG. 15 illustrates a detailed operation in step S505.

First, in step S5051, the suction pressure measurement unit 104 measures the suction pressure in the suction nozzle 205.

Next, in step S5052, the first determination unit 107 determines whether the pressure measured by the suction pressure measurement unit 104 is a negative pressure.

In a case where the first determination unit 107 determines that the pressure measured by the suction pressure measurement unit 104 is a negative pressure, the process proceeds to step S507.

In a case where the first determination unit 107 determines that the intermediately-taking-out operation is not successful, the process proceeds to step S506.

Step S507

Figure 16:
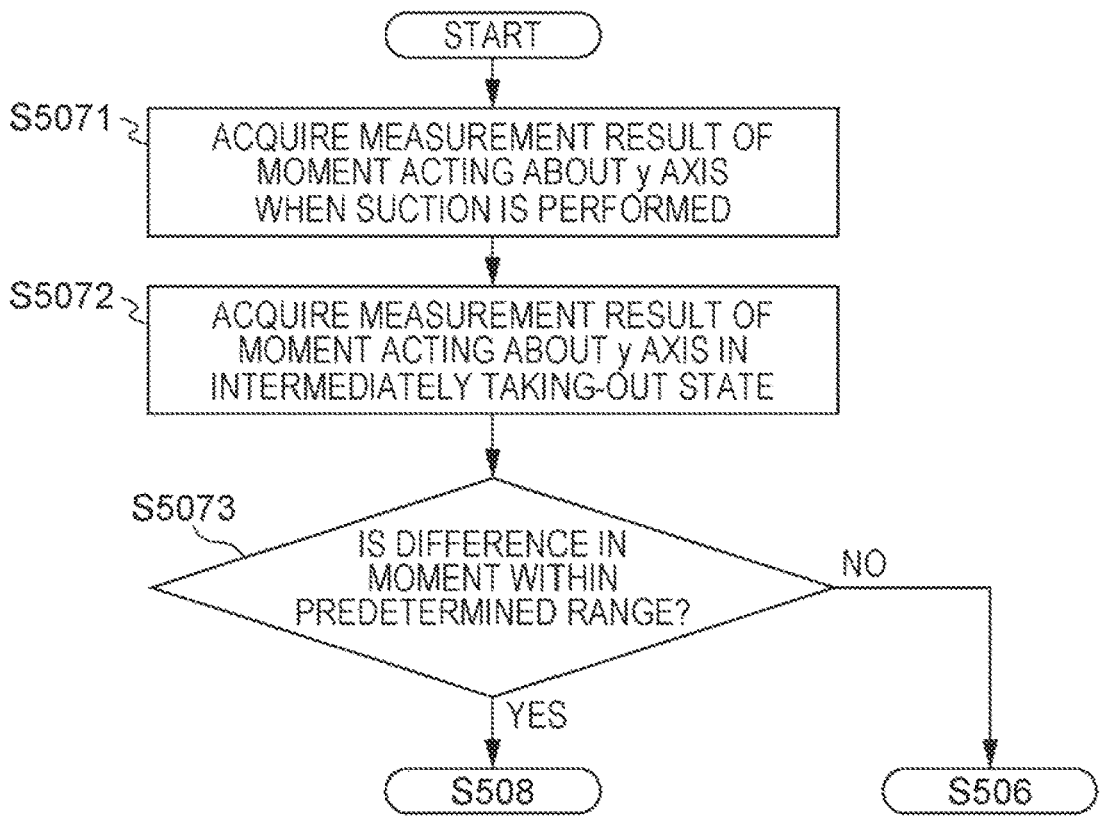
FIG. 16 is a flowchart illustrating a detailed operation in step S507 in FIG. 13B.

Next, after it is determined that the intermediately-taking-out operation has been performed successfully, the second determination unit 108 performs a second determination operation. FIG. 16 illustrates a detailed operation in step S507 of the second determination operation.

That is, first, in step S5071 in FIG. 16, the second determination unit 108 acquires the moment M1 about the y-axis appearing in the sucked and held state measured in step S502.

Next, in step S5072, the second determination unit 108 acquires the moment M2 about the y-axis measured in step S504 in the intermediately-taking-out operation.

Next, in step S5073, based on the difference ΔM (=M2−M1) between the moment M1 about the y-axis measured when the sucking and holding operation is performed and the moment M2 about the y-axis measured when the intermediately-taking-out operation is performed, the second determination unit 108 estimates swinging of the object 93 about the suction nozzle 205 that will occur when the object 93 is fully taken out. As the moment M1 about the y-axis occurring in the sucked and held state, a value measured when a predetermined time (for example, 1 second) elapses since the sucking and holding is started may be adopted. Alternatively, the moment M1 about the y-axis in the sucked and held state may be given by an average value, a maximum value or a minimum value of values measured in a predetermined time period (for example, 3 seconds) after the sucking and holding is started. In the present embodiment, as for the moment M1 about the y-axis in the sucked and held state, the average value in the predetermined time period (for example, 3 seconds) after the sucking and holding is started is employed. As for the moment M2 about the y-axis in the intermediately-taken-out state, a value measured after an elapse of predetermined time (for example, 1 second) since the intermediately-taking-out operation is started may be used. Alternatively, the moment M2 about the y-axis in the intermediately-taken-out state may be given by an average value, a maximum value or a minimum value of values measured in a predetermined time period (for example, 3 seconds) after the intermediately-taking-out operation is started. In the present embodiment, as for the moment M2 about the y-axis in the intermediately-taken-out state, the average value in the predetermined time period (for example, 3 seconds) after the intermediately-taking-out operation is started is employed. The difference ΔM between the moment M1 about the y-axis measured in step S502 and the moment M2 about the y-axis measured in step S504 may be determined by the moment measurement unit 105, or the second determination unit 108 by a calculation.

The estimation of swinging by the second determination unit 108 is performed by determining whether the difference ΔM is within a predetermined value range.

In a case where the second determination unit 108 determines that the moment difference ΔM is within a proper range of the moment value shown in FIG. 7, which is an example of a first threshold value, the second determination unit 108 determines that the swing that will occur when the object 93 is fully taken out is small enough not to fail to fully taking-out the object 93. Therefore, in this case, the second determination unit 108 determines that it is allowed to execute the fully-taking-out operation. In the other cases, the second determination unit 108 determines that the estimated swing is large and it is not allowed to execute the fully-taking-out operation, and the process proceeds to step S506.

In the case where the second determination unit 108 determines that it is allowed to execute the fully-taking-out operation, the process proceeds to step S508.

Step S506

In step S506, under the control of the first controller 102, the intermediately-taking-out operation is stopped, and the object 93 is returned to the original position in the packing box 91, and then the suction position update unit 106 changes the suction position of the suction nozzle 205 on the object 93 set by the second setter 101. In the present embodiment, by way of example but not limitation, the process returns to step S501 after the suction position is changed. However, alternatively, as shown by a dash line in FIG. 13B, the process may return between step S504 and step S505.

The suction position change operation in step S506 has two modes. A first mode is performed when the first determination unit 107 determines that the suction operation is unsuccessful, while a second mode is performed when the second determination unit 108 determines that it is not allowed to execute the fully-taking-out operation.

Figure 17:
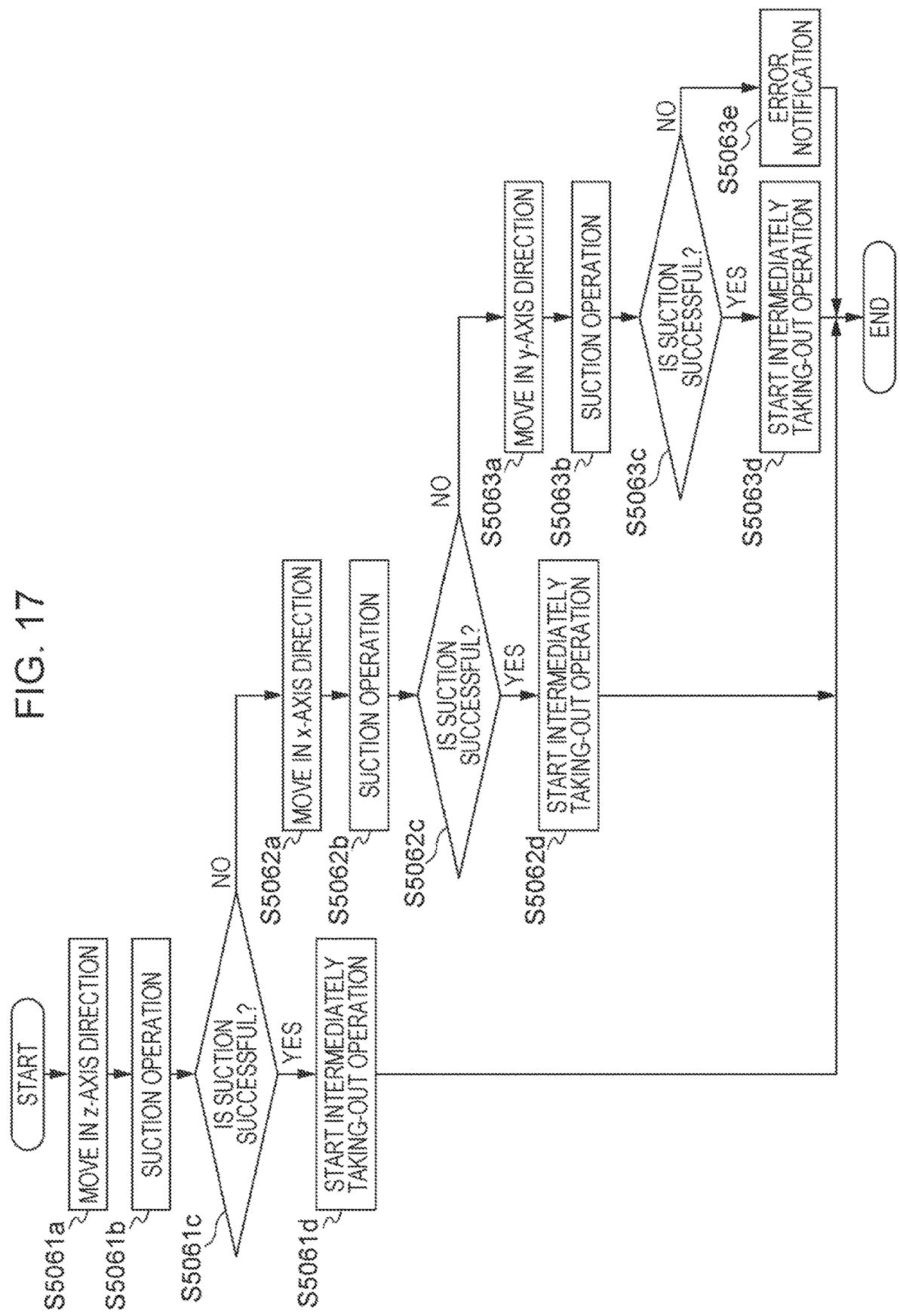
FIG. 17 is a flowchart illustrating a detailed operation in step S506 in FIG. 13B.

More specifically, in the case where the first determination unit 107 determines that the suction operation has failed, the suction position change operation is performed as shown in FIG. 17. That is, if the case where the first determination unit 107 determines that the suction operation is unsuccessful, then, under the control of the first controller 102, first, the intermediately-taking-out operation is stopped, and the object 93 is returned to its original position in the packing box 91, and thereafter, in step S5061a, the suction position is changed in a negative z-axis direction. For example, the suction position shown in FIG. 11A is changed to a suction position denoted by suction position number 1 in FIG. 11B and FIG. 11D.

Next, in step S5061b, the suction operation is performed under the control of the first controller 102.

Next, in step S5061c, the first determination unit 107 determines whether the suction operation is successful or not, based on the suction pressure applied to the suction nozzle 205 measured by the suction pressure measurement unit 104. That is, in a case where the suction pressure is a negative pressure stronger than a predetermined suction pressure (for example, −25 kPa), the first determination unit 107 determines that the suction operation is successful, and the process proceeds to step S5061d to start the intermediately-taking-out operation. After that, step S502 and step S503 may be sequentially performed, or the process may return to step S505.

On the other hand, in a case where the suction pressure is not a negative pressure stronger than the predetermined suction pressure (for example, −25 kPa), the first determination unit 107 determines that the suction operation is unsuccessful and the process proceeds to step S5062a.

In these steps S5061a to S5061c, the suction operation fails although the suction position is changed in the negative direction along the z-axis, and thus in step S5062a and following steps, the suction position is changed, for example, in the x-axis direction.

More specifically, in step S5062a, the suction position is changed in the negative x-axis direction. For example, the suction position is changed from that with a suction position number of 1 shown in FIG. 11B to that with a suction position number of 3 shown in FIG. 11B and FIG. 11C.

Next, in step S5062b, the suction operation is performed under the control of the first controller 102.

Next, in step S5062c, the first determination unit 107 determines whether the suction operation is successful or not, based on the suction pressure applied to the suction nozzle 205 measured by the suction pressure measurement unit 104. That is, in a case where the suction pressure is a negative pressure stronger than the predetermined suction pressure (for example, −25 kPa), the first determination unit 107 determines that the suction operation is successful, and the process proceeds to step S5062d to start the intermediately-taking-out operation. After that, step S502 and step S503 may be sequentially performed, or the process may return to step S505.

On the other hand, in a case where the suction pressure is not a negative pressure stronger than the predetermined suction pressure (for example, −25 kPa), the first determination unit 107 determines that the suction operation is unsuccessful and the process proceeds to step S5063a.

In these steps S5062a to S5062c, the suction operation fails although the suction position is changed in the negative direction along the x-axis, and thus in step S5063a and following steps, the suction position is changed, for example, in the y-axis direction.

More specifically, in step S5063a, the suction position is changed in the negative y-axis direction.

Next, in step S5063b, the suction operation is performed under the control of the first controller 102.

Next, in step S5063c, the first determination unit 107 determines whether the suction operation is successful or not, based on the suction pressure applied to the suction nozzle 205 measured by the suction pressure measurement unit 104. That is, in a case where the suction pressure is a negative pressure stronger than the predetermined suction pressure (for example, −25 kPa), the first determination unit 107 determines that the suction operation is successful, and the process proceeds to step S5063d to start the intermediately-taking-out operation. After that, step S502 and step S503 may be sequentially performed, or the process may return to step S505.

On the other hand, in a case where the suction pressure is not a negative pressure stronger than the predetermined suction pressure (for example, −25 kPa), the first determination unit 107 determines that the suction operation is unsuccessful and the process proceeds to step S5063e.

In these steps S5063a to S5063c, the suction operation fails although the suction position is changed in the positive direction along the y-axis, and thus in step S5063e, a failure notification is issued to a user. Although not specifically shown in the figures, the failure notification may be issued, for example, by lighting or blinking a warning light, generating an alarm sound, or displaying a warning on a display apparatus.

In the case where the second determination unit 108 determines that it is not allowed to execute the fully-taking-out operation, the suction position change operation may be performed, for example, as follows.

When the second determination unit 108 determines that it is not allowed to execute the fully-taking-out operation, if the value is out of the range specified by the first threshold value, the original suction position (X1, Y1, Z1) shown in FIG. 12A is largely shifted in the positive direction along the x-axis, for example, by a distance α, to a position 1-1 as shown in FIGS. 12B and 12C.

The position 1-1 is a position having a maximum value in the positive direction along the x-axis that allows the suction nozzle 205 to perform sucking.

When the suction position is changed to the position 1-1, if the second determination unit 108 still determines that it is not allowed to execute the fully-taking-out operation, the suction position is further changed. For example, in a case where the changing of the suction position to the position 1-1 results in a reduction in deviation from the range specified by the first threshold value, the suction position is changed to a position 2-1 close to the suction previously changed position 1-1.

Even when the suction position is changed to the position 2-1, if the second determination unit 108 still determines that it is not allowed to execute the fully-taking-out operation, the position is changed to a position 2-2 is closer to the original suction position (X1, Y1, Z1).

When the suction position is changed to the position 2-2, if the second determination unit 108 still determines that it is not allowed to execute the fully-taking-out operation, the suction position is changed to a position 1-2 having a maximum value in the negative direction along the x-axis that allows the suction nozzle 205 to perform sucking.

An example of a method of changing the suction position in the x-axis direction has been described above. The suction position may be changed in a similar manner also in the z-axis direction or the y-axis direction. Note that the method of changing the suction position in a direction along arbitrary one of axes is not limited to the example described above.

Step S508

In step S508, under the control of the second controller 103, the drive unit 115 is driven such that the object 93 sucked by the suction nozzle 205 in step S501 is pulled up from the packing box 91 by the fully-taking-out distance D2 greater than the height H of the object 93 thereby performing the fully-taking-out operation. Thereafter, it is possible to convey the object 93 sucked by suction nozzle 205 to another tray or the like for sorting.

As described above, according to the present embodiment, in the intermediately-taking-out operation, the object 93 is temporarily stopped without being fully taken out from the packing box 91, and the moments M1 and M2 are measured by the moment measurement unit 105. Based on the difference ΔM between the measured moments difference, the second determination unit 108 estimates the magnitude of a swing that will occur when the fully-taking-out operation is performed. When it is estimated that the swing is small enough, the fully-taking-out operation is performed. Thus, it is possible to prevent the object 93 from dropping caused by too large a swing when the fully-taking-out operation is performed.

Modification 1

Note that the present disclosure is not limited to the embodiments described above, but the present disclosure may be implemented in various other modes.

Figure 18:
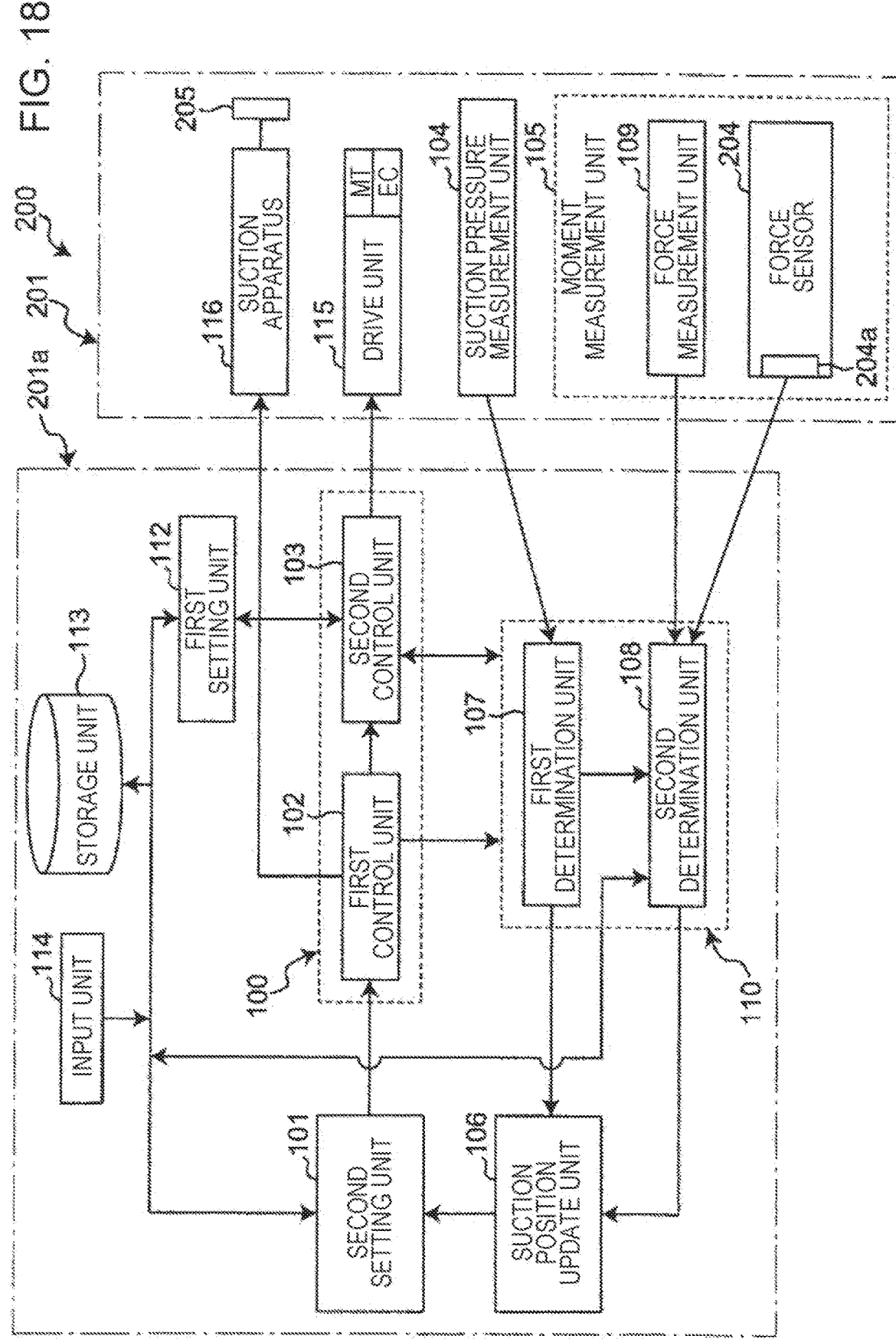
FIG. 18 is a functional block diagram of a robot arm apparatus as an example of an actuator apparatus according to Modification 1.

Determining the taking-out operation based on a value of a force applied to the hand of the robot arm 201 in the z-axis direction In this Modification 1, unlike the embodiments described above, the determination of whether the object 93 is taken out successfully by sucking in the intermediately-taking-out operation is made the second determination unit 108 based on a value of a force in the z-axis direction applied to the hand 202 the robot arm 201. FIG. 18 is a functional block diagram illustrating a robot arm apparatus as an example of an actuator apparatus according to Modification 1.

Figure 19:
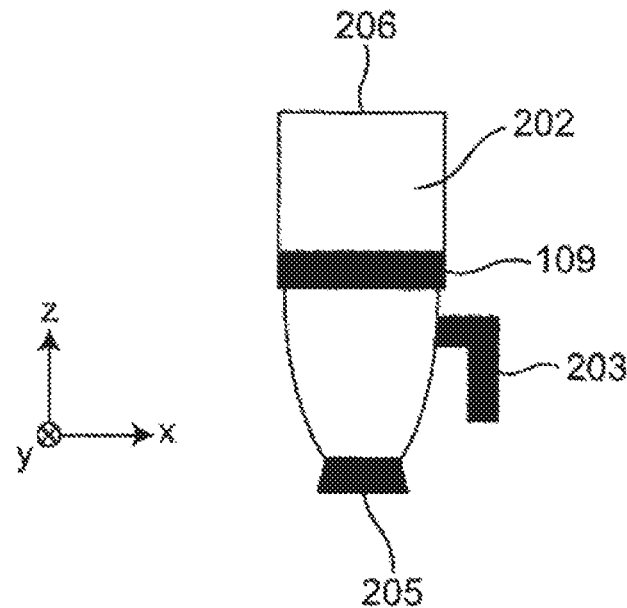
FIG. 19 is a diagram illustrating a hand of an actuator according to Modification 1 in FIG. 18.

A difference from the configuration shown in FIG. 8B according to the previous embodiment is that, as shown in FIG. 19, a force measurement unit 109 for measuring the force applied to the hand 202 is additionally provided at the position of the force sensor 204. As for the force measurement unit 109, for example, a force sensor configured to measure a force and a moment may be used. Examples of measured values by the force sensor are shown in FIG. 3G.

The taking-out operation according to Modification 1 differs from that according to the above-described embodiments in the operation of determining in step S505 whether the fully-taking-out operation is successful or not.

Figure 20:
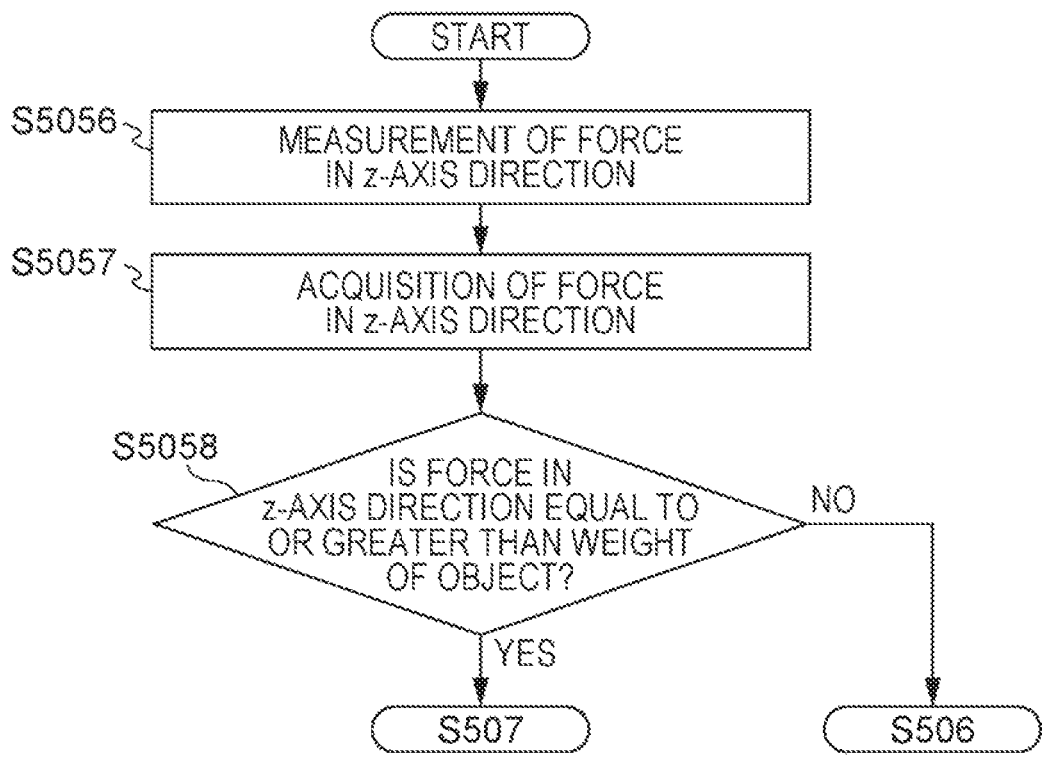
FIG. 20 is a flowchart illustrating a detailed operation in step S505 in FIG. 13B according to Modification 1 in FIG. 18.

The process in step S505 according to Modification 1 is described in detail in FIG. 20. Here, step S505 includes step S5056, step S5057, and step S5058.

First, in step S5056 in FIG. 20, the force measurement unit 109 measures the force applied to the hand 202 in the z-axis direction.

Next, in step S5057, the second determination unit 108 acquires the force in the z-axis direction from the force measurement unit 109.

Next, in step S5058, based on the force measurement value acquired from the measured value of the force acquired from the force measurement unit 109 in step S5057, the second determination unit 108 determines whether or not the intermediately-taking-out operation is successful. More specifically, in a case where the value of the force measured by the force measurement unit 109 is equal to or larger than one-half the weight of the object 93 stored in the storage unit 113, the second determination unit 108 determines that the intermediately-taking-out operation is successful. If Yes in step S5058, the moment difference ΔM is used in step S507. If No in step S5058, the process proceeds to step S506.

In the case where the value of the force measured by the force measurement unit 109 is equal to or larger than one-half the weight of the object 93 stored in the storage unit 113, and the second determination unit 108 determines that the intermediately-taking-out operation is successful, the process proceeds to step S507. In the other cases, that is, when the second determination unit 108 determines that the value of the force measured by the force measurement unit 109 is not equal to or larger than one-half the weight of the object 93 stored in the storage unit 113, the process proceeds to step S506.

According to this aspect, it is determined whether the object 93 is held by suction based on the force information supplied from the force sensor 204. This makes it possible to determine, in the intermediately-taking-out operation, whether or not the object 93 is held by suction, and if it is determined that the object 93 is not held, the process is allowed to proceed to change the suction position without making a determination based on the moment.

Modification 2

In a robot arm apparatus 200 according to this aspect, a robot arm 201 is installed in a warehouse environment. In the warehouse environment, an object 93 is sucked at a particular suction position and taken out by a particular distance by the robot arm 201 from a packing box 91. In this state, a moment is measured, and a swing of the object 93 is predicted.

An object taking-out system 300 may be provided such that a robot arm apparatus 200 is installed in each of warehouse environments 304A to 304C in warehouses A to C, respectively, and object taking-out operation is performed on objects which are the same in type, shape, and size. This object taking-out system 300 is further described below with reference to FIG. 21.

In this object taking-out system 300, each robot arm apparatus 200 includes a robot arm controller 201a and a robot arm 201, as in the previous embodiments.

The robot arm controller 201a further includes an input/output unit 302. The input/output unit 302 is connected to a storage unit 113, a second setter 101, and a first setter 112 such that it is allowed to input/output data from/to them. The input/output unit 302 of each robot arm controller 201a is connected to a network 303. An operation target object database 306 and an operation result database 307 are connected to the network 303 via a shared data server 305. The network 303 is also connected to the input/output unit 302 of the robot arm controller 201a of the robot arm apparatus 200 installed in a warehouse experiment environment 301 such that data acquired by the robot arm controller 201a in the warehouse experiment environment 301 can be stored in the operation target object database 306 via the input/output unit 302, the network 303, and the shared data server 305.

The operation target object database 306 stores, for example, at least the coordinates of the suction position on the upper surface of the object 93, that is, the x, y, and z coordinates, the rotation angles (α, β, γ) about a roll axis (that is, around the x axis), a pitch axis (that is, the y axis), and a yaw axis (that is, yaw about the z axis), and the height H of the object 93. Furthermore, the storage unit 113 stores, by way of example, the lateral and longitudinal sizes of the upper surface 93a of the object 93 (that is, the width and the depth), the weight, and the suction pressure. Furthermore, in the operation target object database 306, as shown in FIG. 23, the height H of the object 93, the taking-out movement distances D1 and D2, the angle θ of the installed shelf board 95, and the proper moments that result in suppression of the swing of the object 93.

In the operation result database 307, for example, the suction position in the taking-out operation (when the taking-out is successful and when the taking-out is failed), the measured moment, and the like are stored together with information indicating whether or not the taking-out is successful. Therefore, by using the information indicating the successful taking-out operation, it becomes possible to prevent the failure of the taking-out operation.

The shared data server 305 is for allowing data to be shared by the robot arm apparatuses 200, which allows it to build the object taking-out system 300 with high efficiency. More specifically, in the warehouse environments 304A to 304C, when the height H of the object 93 to be taken out, the taking-out movement distances D1 and D2, the angle θ of the installed shelf board 95, and/or the like are stored in the storage unit 113 of the robot arm controller 201a, the data are input to the shared data server 305 via the input/output unit 302 and the network 303 and stored in the operation target object database 306, and thus the data becomes sharable.

Furthermore, the suction position that allows it to suppress the swing of the object 93 may be stored in the operation target object database 306 based on the moment measured in the particular warehouse experiment environment 301. This also makes it possible to control the taking-out operation in other warehouses by using the data already stored in the operation target object database 306. In particular, when it is difficult to perform an experiment in a currently operating warehouse environment, the pseudo warehouse experiment environment 301 can be used to experimentally determine a proper suction position and store data obtained in the experiment in the operation target object database 306.

An example of an operation of the object taking-out system 300 configured in the above-described manner is described below.

Figure 22:
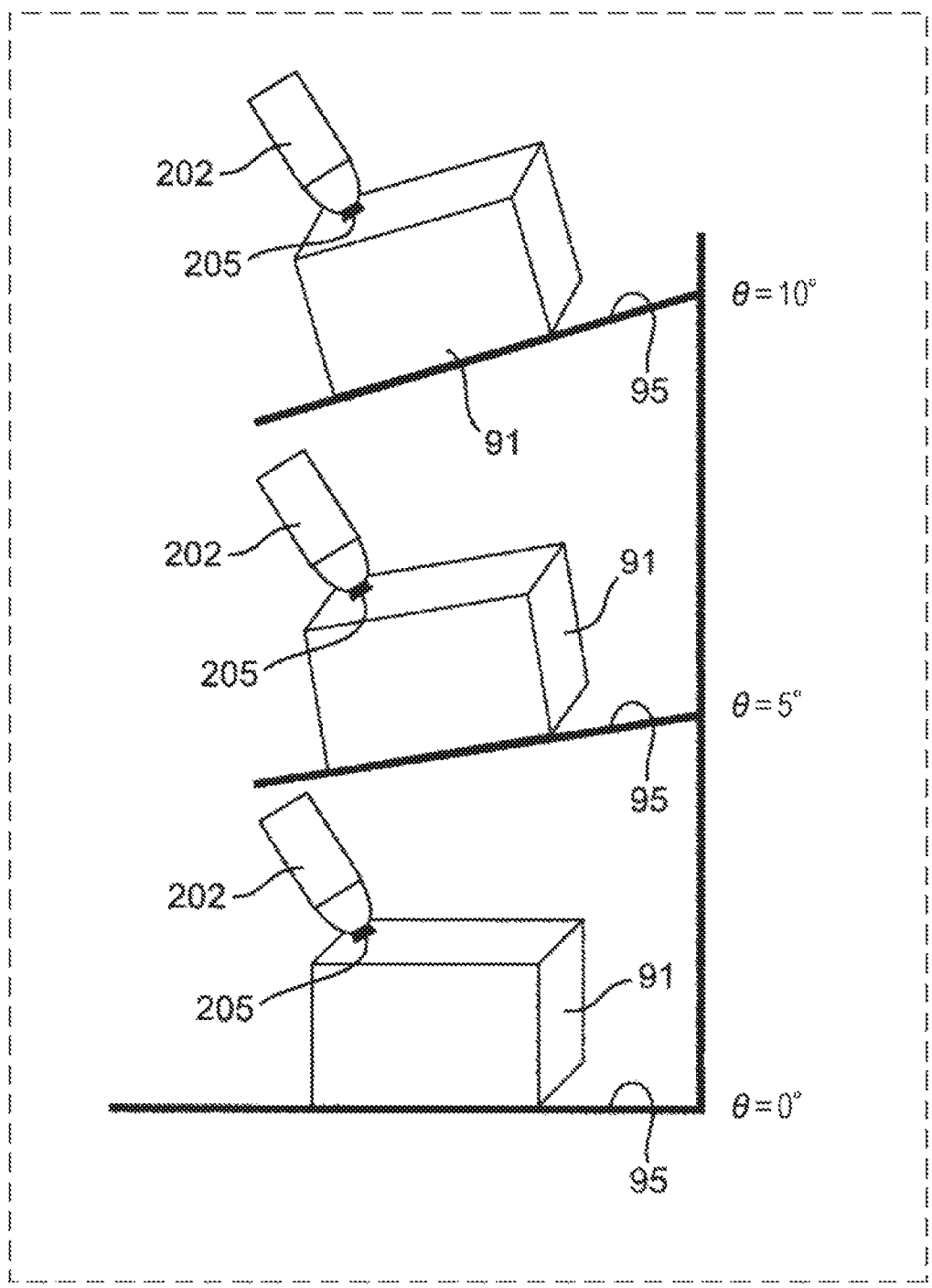
FIG. 22 is a diagram illustrating three shelf boards having different installation angles from each other according to Modification 2.

For example, in the warehouse experiment environment 301, objects 93 handled in the operating warehouse environments 304A to 304C are placed on the shelf boards 95 in a similar manner as in the warehouse environments 304A to 304C, as shown in FIG. 22, such that it is possible to carry out an experiment of an taking-out operation in this warehouse experiment environment 301. In FIG. 22, the installation angle θ of the shelf board 95 is smaller for the target object 93 installed below in order to create an environment in which the worker can easily take it out on a daily basis.

Figure 21:
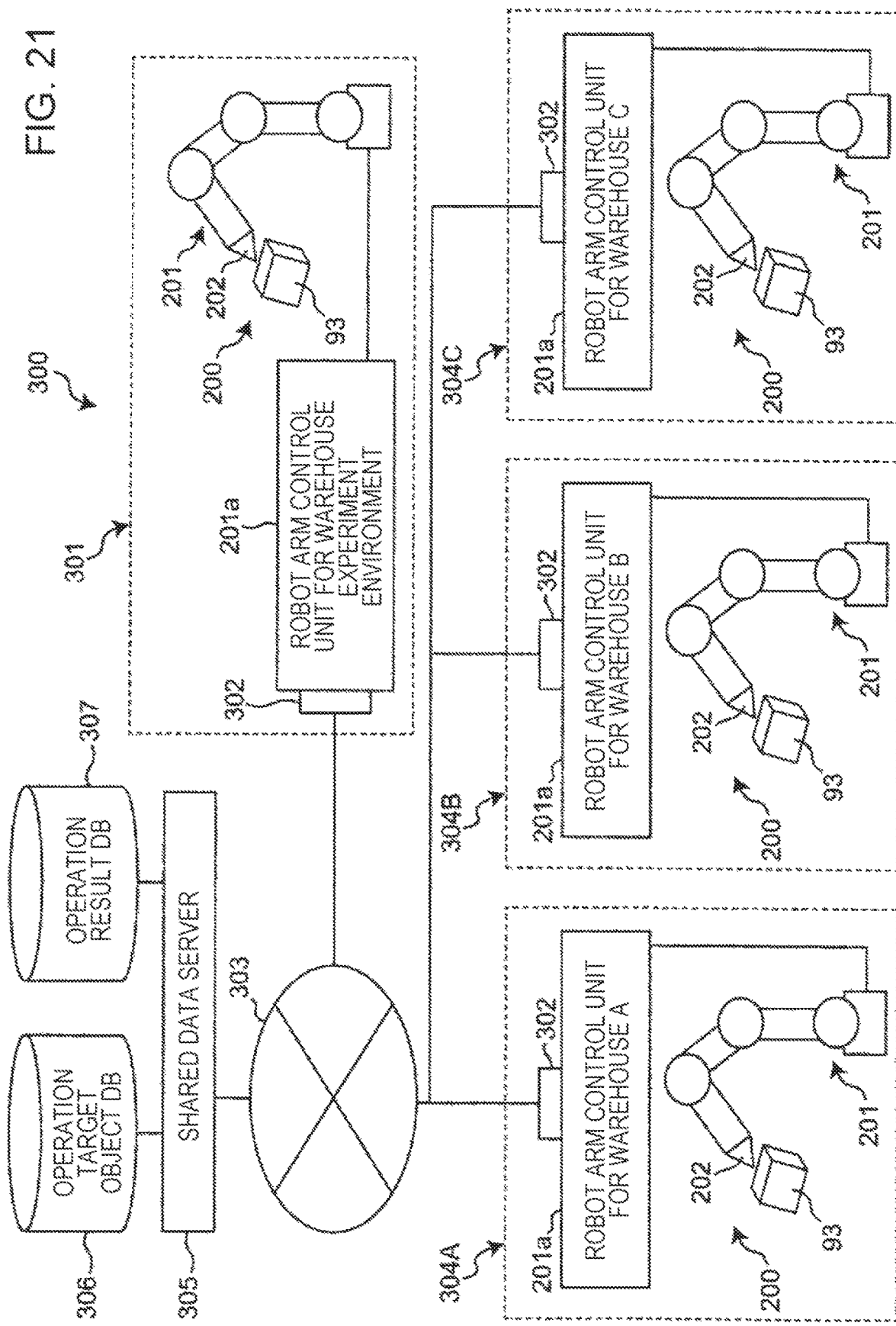
FIG. 21 is a diagram illustrating an object taking-out system in which control in another warehouse is realized by using data measured and stored in a predetermined experimental environment in Modification 2.

As an example of the operation target object database 306 shown in FIG. 21 about objects 93, data is stored as shown in FIG. 23 in terms of the ID of the object 93, the height H of the object 93, the intermediately-taking-out distance amount D1, the fully-taking-out distance D2, the installation angle θ of the shelf board on which objects are placed, the proper moment for suppressing the swing down to a predetermined level depending on the angle θ of the object 93 and the installed shelf board 95.

Figure 24:
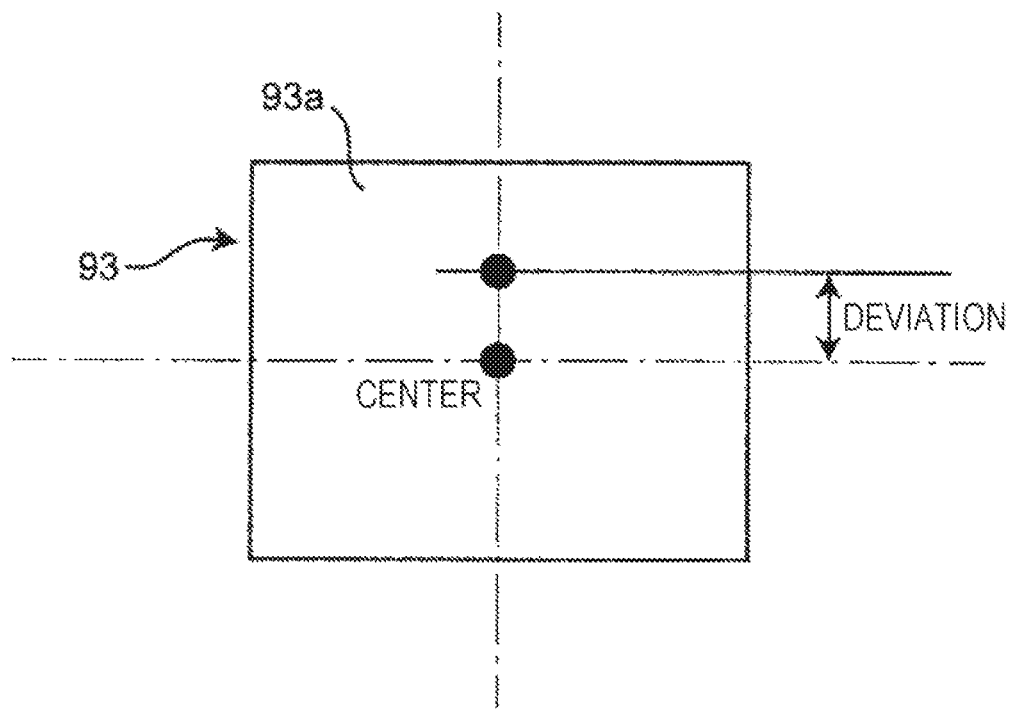
FIG. 24 is a diagram illustrating an amount of deviation of a suction position from the center of an object in Modification 2.

In this object taking-out system 300, before actually controlling the robot arms 201 to operate in the operating warehouse environments 304A to 304C, the robot arm 201 is operated in the warehouse experiment environment 301, and a moment which occurs when the object 93 is lifted up by a particular distance is measured by the force sensor 204 for various values of deviation (see FIG. 24) of the suction position from the center of the object 93. Data of measurement results are shown in FIG. 25. This measurement result data is stored in the operation result database 307 via the input/output unit 302 of the robot arm controller 201a in the warehouse experiment environment 301 and the shared data server 305.

The data in FIG. 25 indicates that the moment difference (ΔM) was 0.08 when the object 93 with an object ID 001 was taken out from the shelf board 95 having an installation angle θ=0°. The history of taking-out operations performed in the past is stored, as shown in FIG. 25, in the operation result database 307 connected to the shared data server 305. When similar articles are placed on shelf board 95 with the same inclination angle in another warehouse, it is possible to search the operation result database 307 for a suction position that allows a less swing without performing an experiment.

In Modification 2 described above, a mechanism for sharing the data acquired in experiments performed in the warehouse experiment environment 301 has been disclosed. Alternatively, for example, data obtained in operating warehouse environments 304A to 304C may be shared via the shared data server 305.

In this case, even when an article is placed for the first time in the warehouse environment 304C, if data of a taking-out result of this article in another warehouse environment 304A can be found and retrieved via the above-described searching, it is possible to set the suction point that provides a small swing based on the retrieved data.

Instead of providing the second setter 101 and the first setter 112 in the robot arm controller 201a of each robot arm apparatus 200, one second setter and one first setter may be provided in the server and may be shared by the robot arm apparatuses 200. An example of an object taking-out system 300A configured in such a manner is illustrated in FIG. 26.

Figure 26:
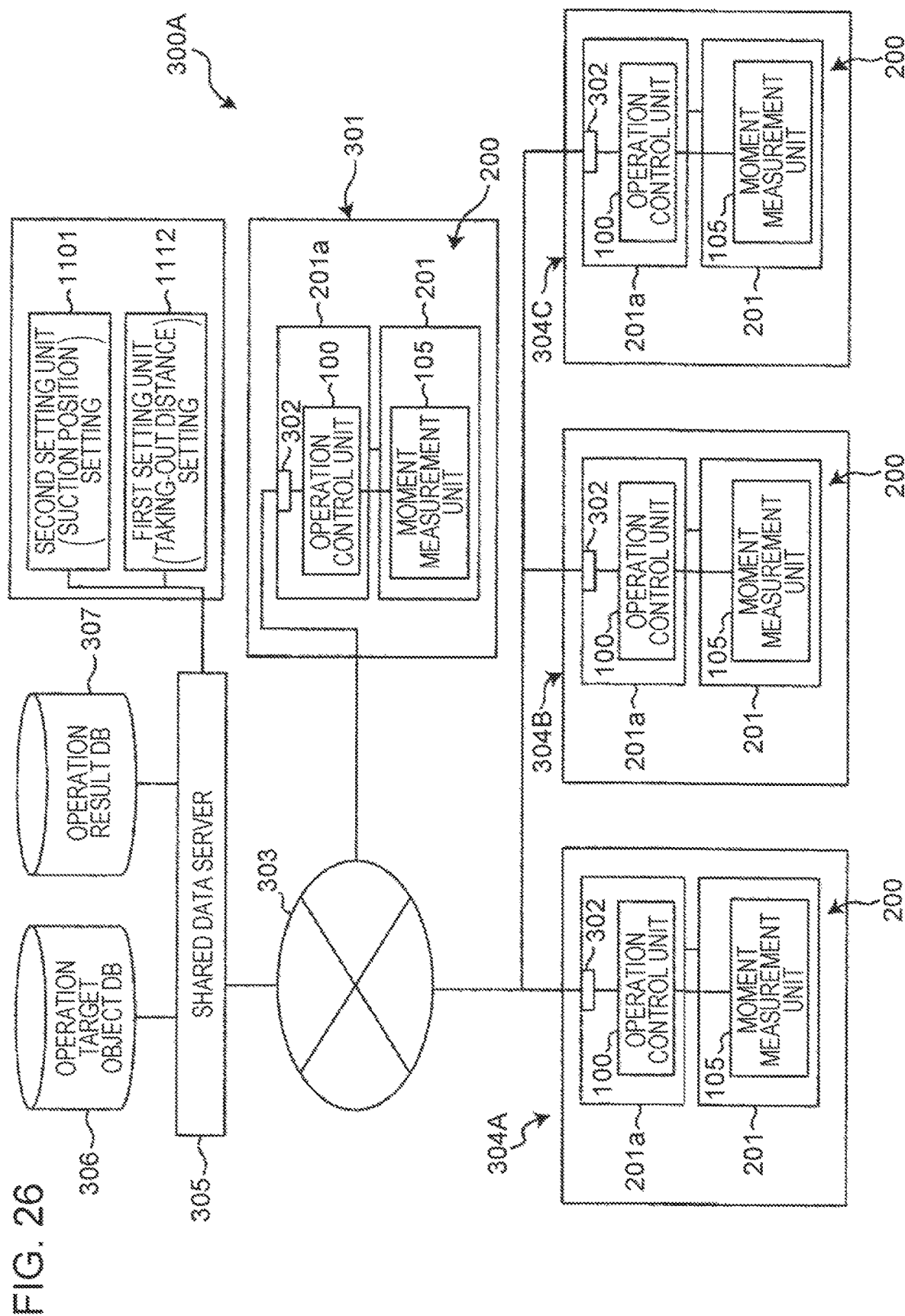
FIG. 26 is a diagram showing a system in which control in another warehouse environment is achieved using data measured and stored in a particular experiment environment according to Modification 2.

In FIG. 26, a second setter 1101 corresponding to the second setter 101 and a first setter 1112 corresponding to the first setter 112 are connected to the shared data server 305, and data set by the second setter 1101 and data set by the first setter 1112 are stored in the operation target object database 306 and/or the operation result database 307 via the shared data server 305.

Each robot arm controller 201a does not need to include the second setter 101 and the first setter 112. The configuration, except for this, is the same as in the previous embodiments.

That is, the object taking-out system 300A includes a robot arm controller 201a having the operation controller 100 and the like, and a robot arm 201 having the moment measurement unit 105 and the like.

In the object taking-out system 300A configured in the manner described above, the operation controller 100 and the moment measurement unit 105, which deal with information controlled or measured individually in each warehouse environment, are provided in each robot arm apparatus 200, but sharable information such as information about objects 93 and information about values of sensors acquired in each control device or the like are stored in the server and shared.

Modification 3

In the embodiments and modifications described above, it assumed by way of example that the packing box 91 is used as the placement table 90. However, the present disclosure is not limited to this example.

Figure 27A:
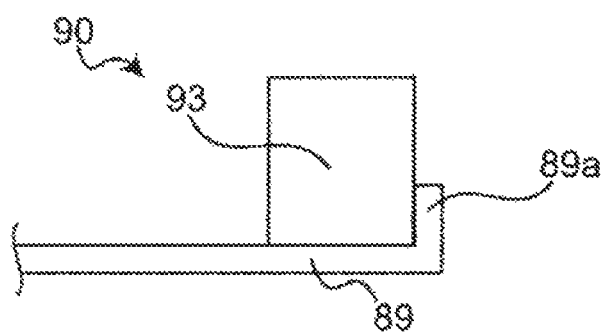
FIG. 27A is a side view for explaining an operation of taking out a rectangular parallelepiped object placed on a rectangular placement board with a fence in Modification 3.

In the present disclosure, as another example of the placement table 90, a placement board 89 formed by a flat plate or the like may be used instead of a box. The placement board 89 has a fence 89a fixed to one end of the placement board 89 having a rectangular shape such that a lower part of at least one side surface of the object 93 can be in contact with the fence 89a as shown in FIG. 27A. When the object 93 is lifted by suction, the fence 89a comes into contact with the lower part of the side surface of the object 93, which causes the swing of the object 93 to be suppressed. In this situation the fence 89a functions as a support by another adjacent object. When the bottom surface of the object 93 floats above the placement board 89 even a little, the above-described swing determination is possible.

Figure 27B:
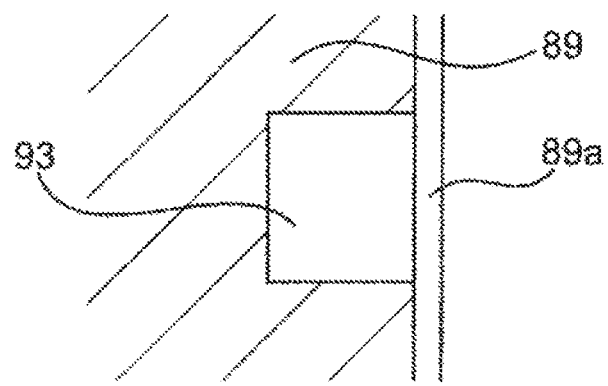
FIG. 27B is a plan view for explaining the operation of taking out the rectangular parallelepiped object placed on the rectangular placement board with the fence shown in FIG. 27A in Modification 3.
Figure 27C:
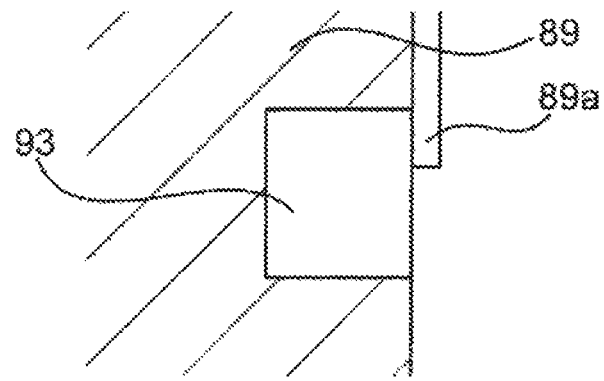
FIG. 27C is a plan view for explaining an operation of taking out a rectangular parallelepiped object placed on a rectangular placement board with a fence provided at a different position from that shown in FIG. 27B in Modification 3.

When seen in a plan view from above, the fence 89a does not necessarily need to cover the entire side surface of the object 93 to be taken out as shown in FIG. 27B, but the fence 89a may cover only a part of the side surface of the object to be taken out as shown in FIG. 27C.

Figure 27D:
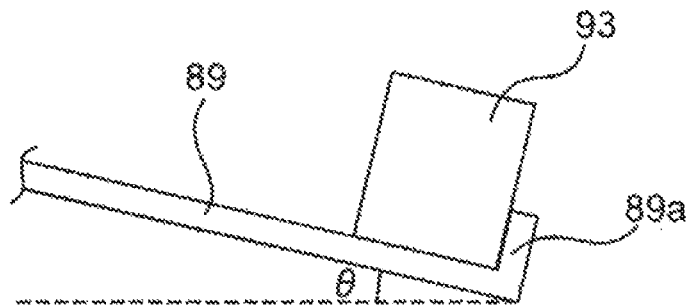
FIG. 27D is a side view for explaining an operation of taking out a rectangular parallelepiped object placed on the rectangular placement board with the fence, shown in FIG. 27A, inclined by an angle of θ in Modification 3.
Figure 27E:
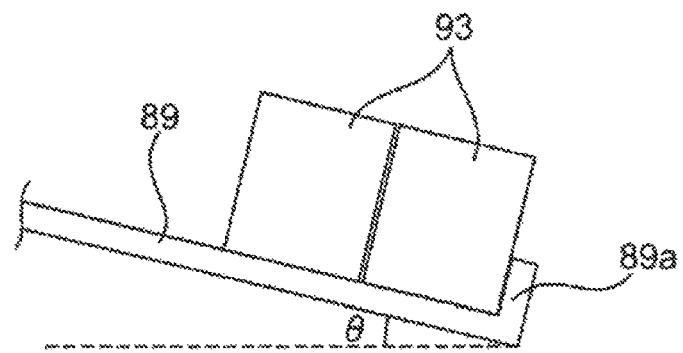
FIG. 27E is a side view for explaining an operation of taking out a rectangular parallelepiped object placed on the rectangular placement board with the fence, shown in FIG. 27A, inclined by the angle of θ in Modification 3.
Figure 27F:
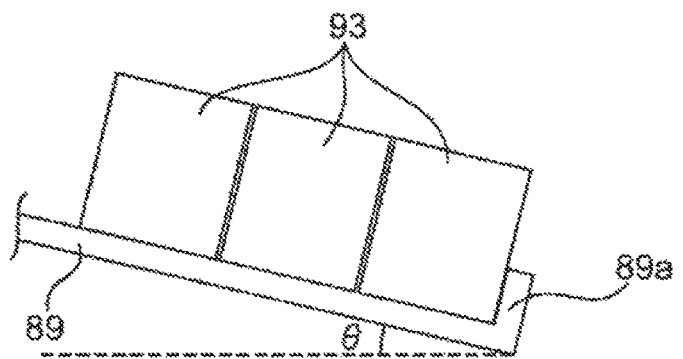
FIG. 27F is a side view for explaining an operation of taking out a rectangular parallelepiped object placed on the rectangular placement board with the fence, shown in FIG. 27A, inclined by the angle of θ in Modification 3.

The placement board 89 with the fence 89a may be inclined by an inclination angle θ as with the shelf board 95 as shown in FIG. 27D. As shown in FIGS. 27E and 27F, when objects 93 are placed on the placement board 89, the objects 93 may be taken out sequentially in the order of their locations starting with one closest to the fence 89a. After one object 93 is taken out, the inclination, depending on the inclination angle, causes an object, originally located next to the taken-out object 93, to slides until the next object comes into contact with the fence 89a, which makes it easier to perform the taking-out operation.

Figure 27G:
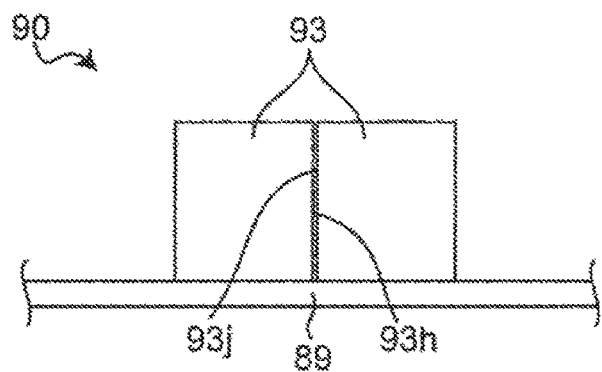
FIG. 27G is a side view for explaining an operation of taking out a rectangular parallelepiped object in contact with another rectangular parallelepiped object placed on a rectangular placement board in Modification 3.
Figure 27H:
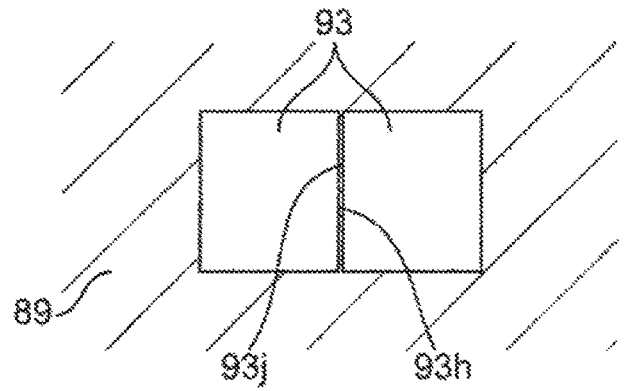
FIG. 27H is a plan view for explaining the operation of taking out the rectangular parallelepiped object in contact with another rectangular parallelepiped object placed on the rectangular placement board shown in FIG. 27G in Modification 3.
Figure 27I:
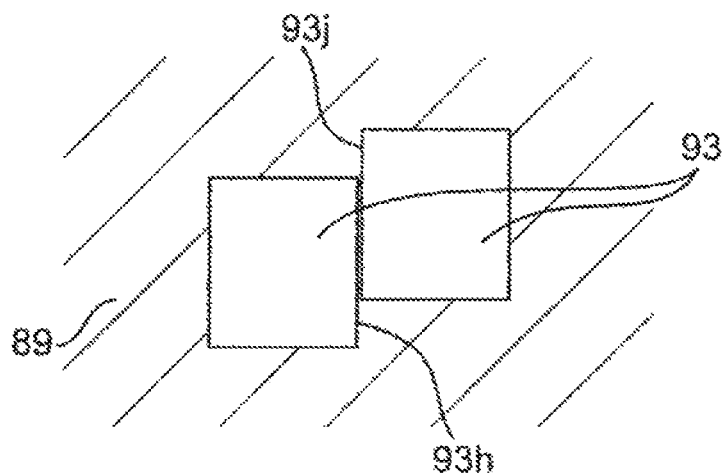
FIG. 27I is a plan view for explaining an operation of taking out a rectangular parallelepiped object from the placement board on which another rectangular parallelepiped object is placed at a different position from that shown in FIG. 27H in Modification 3.

FIG. 27G illustrates another example of a placement table 90 having no fence 89a. Instead, at least one side surface 93j of the object 93 to be lifted is allowed to be in contact with a side surface 93h of another object 93 such that when the object 93 is lifted by suction, the side surface 93h of the other object 93 comes into contact with a lower part of the side surface 93j of the object 93, and thus the swing of the object 93 is suppressed. In this situation, the side surface 93h of the other object 93 can function as a support for another adjacent object. When seen in a plan view from above, the side surface 93h of another object 93 does not necessarily need to cover the entire side surface of the object 93j to be taken out as shown in FIG. 27h. As shown in FIG. 27I, the position of the other object 93 may be displaced along a facing surface from the position of the object 93 to be taken out, and the other object 93 is brought into contact with a part of the side surface 93j of the object 93 to be taken thereby supporting it.

Figure 27J:
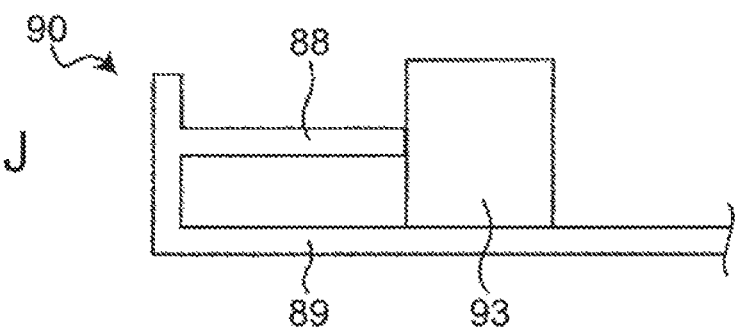
FIG. 27J is a side view for explaining an operation of taking out a rectangular parallelepiped object in contact with a support element fixed to a rectangular placement board in Modification 3.
Figure 27K:
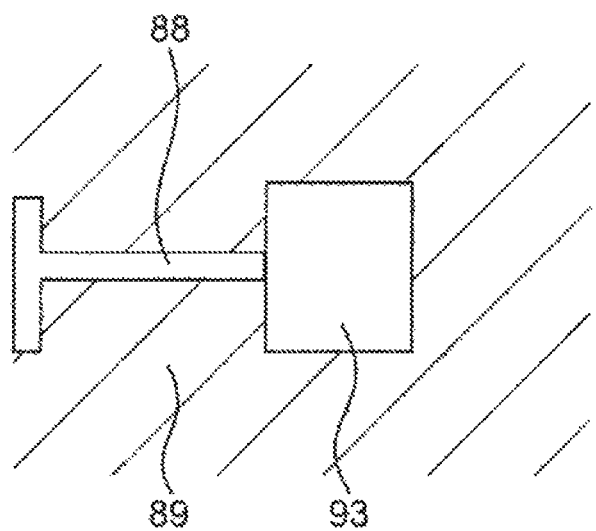
FIG. 27K is a plan view for explaining the operation of taking out the rectangular parallelepiped object in contact with the support element fixed to the rectangular placement board shown in FIG. 27J in Modification 3.
Figure 28A:
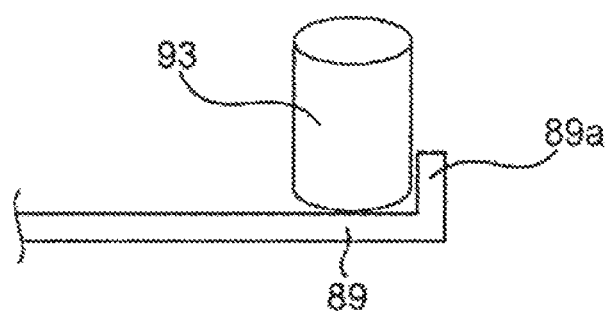
FIG. 28A is a perspective view for explaining an operation of taking out a cylindrical object placed on a rectangular placement board with a fence in Modification 3.
Figure 28B:
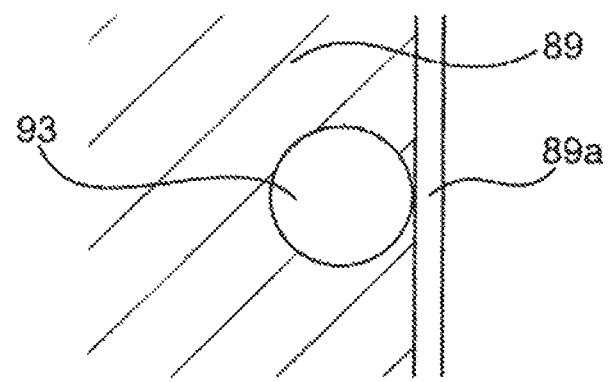
FIG. 28B is a plan view for explaining the operation of taking out the cylindrical object placed on the rectangular placement board with the fence shown in FIG. 28A in Modification 3.
Figure 28C:
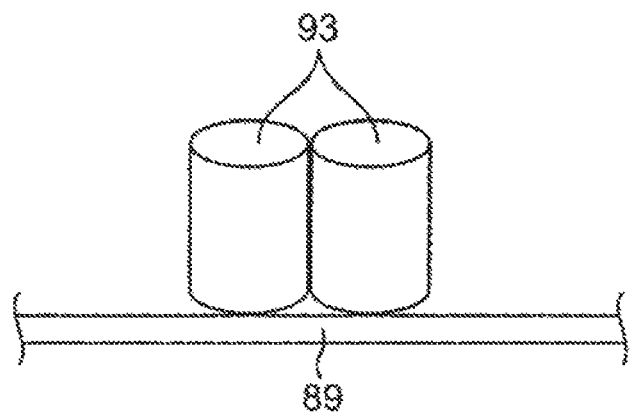
FIG. 28C is a perspective view for explaining an operation of taking out a cylindrical object in contact with another cylindrical object placed on a rectangular placement board in Modification 3.
Figure 28D:
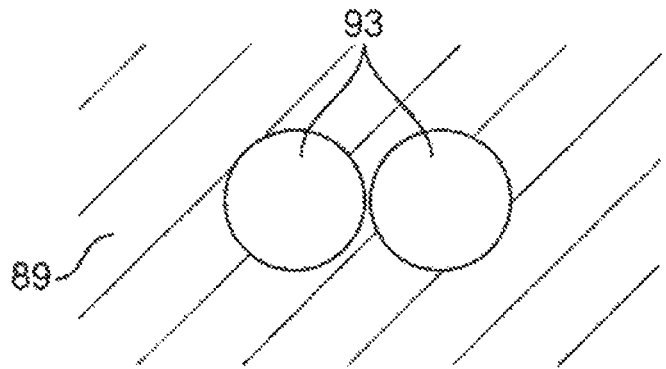
FIG. 28D is a plan view for explaining the operation of taking out the cylindrical object in contact with another cylindrical object placed on the rectangular placement board shown in FIG. 28C in Modification 3.
Figure 28E:
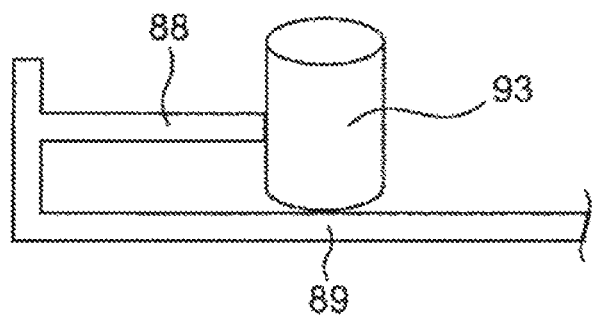
FIG. 28E is a side view for explaining an operation of taking out a rectangular parallelepiped object in contact with a support element fixed to a rectangular placement board in Modification 3.
Figure 28F:
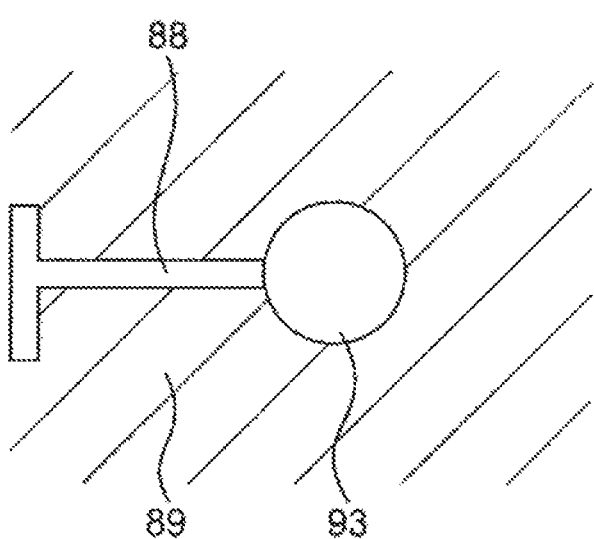
FIG. 28F is a plan view for explaining the operation of taking out the rectangular parallelepiped object in contact with the support element fixed to the rectangular placement board shown in FIG. 28E in Modification 3.

In still another example of the placement table 90, as shown in FIG. 27J and FIG. 27K, no fence 89a is provided, and instead, at least one of side surfaces of the object 93 is allowed to be in contact with a rod-shaped support element 88. When the object 93 is sucked and lifted up, the rod-shaped support element 88 comes into contact with a side surface of the object 93 to be taken out thereby suppressing the fluctuation of the object 93. In this situation, the rod-shaped support element 88 can function as a support for another adjacent object. Note that the rod-shaped support element 88 is in contact with at least one side surface of the object 93 in a direction orthogonal to the side surface of the object 93 thereby supporting this side surface. For example, the rod-shaped support element 88 is fixed to the placement board 89 such that the side surface is supported, at a height similar to the height of the fence 89a as measured from the placement board 89, by the rod-shaped support element 88.

Thus, not only in the case where the packing box is filled with the objects 93, but also in other cases where the object 93 leans against the fence 89a, is in contact with another object 93, or is pushed by the rod-shaped support element 88, a similar shake prevention function can be achieved, as will be described later.

The shape of the object 93 is not limited to a rectangular parallelepiped shape. For example, the object 93 may have a cylindrical shape as shown in FIGS. 28A to 28F.

Figure 29A:
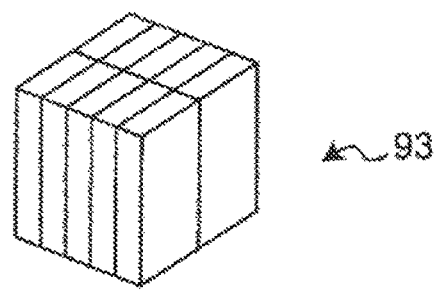
FIG. 29A is a diagram showing still another example of an object in which a large number of flat rectangular parallelepiped articles are packed together into a single aggregate in Modification 3.

In still another example of the object 93, as shown in FIG. 29A, a large number of flat rectangular parallelepiped articles may be packed together into one aggregate having a shape similar to a cube as a whole.

Figure 29B:
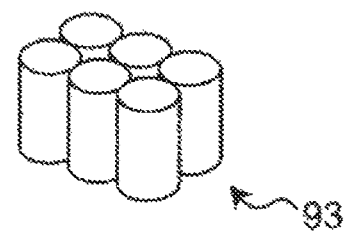
FIG. 29B is a diagram showing still another example of an object in which a large number of articles each having a cylindrical shape are packed together into a single aggregate in Modification 3.
Figure 29C:
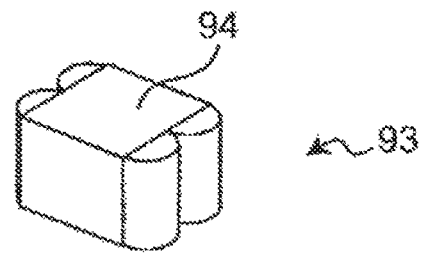
FIG. 29C is a diagram showing still another example of an object including many cylindrical articles such as canned beer or canned juice which are packed such that the cylindrical articles are partially exposed from a package of a flexible material in Modification 3.

In still another example of the object 93, as shown in FIG. 29B, a large number of cylindrical articles may be packed together into one aggregate. FIG. 29C shows an example of a pack of many cylindrical articles. In this example, many pieces of canned beer or canned juice, which are examples of articles, are packed such that part of them is not covered with a package of the flexible material 94.

Figure 29D:
FIG. 29D is a diagram showing still another example of a sphere-shaped object in Modification 3.

FIG. 29D shows another example of an object 93 having a spherical shape.

Figure 29E:
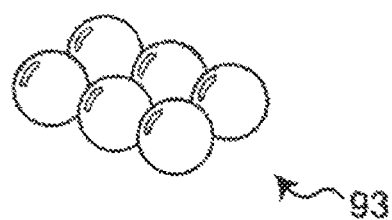
FIG. 29E is a diagram showing still another example of an object in the form of an aggregate of two or more sphere-shaped objects in Modification 3.

In still another example of the object 93, as shown in FIG. 29E, spherical articles may be packed together into one aggregate.

In the examples shown in FIGS. 29A to 29E except for FIG. 29C, the flexible material 94 is transparent and entirely surrounds the object 93, and therefore the flexible material 94 is not shown.

Figure 30A:
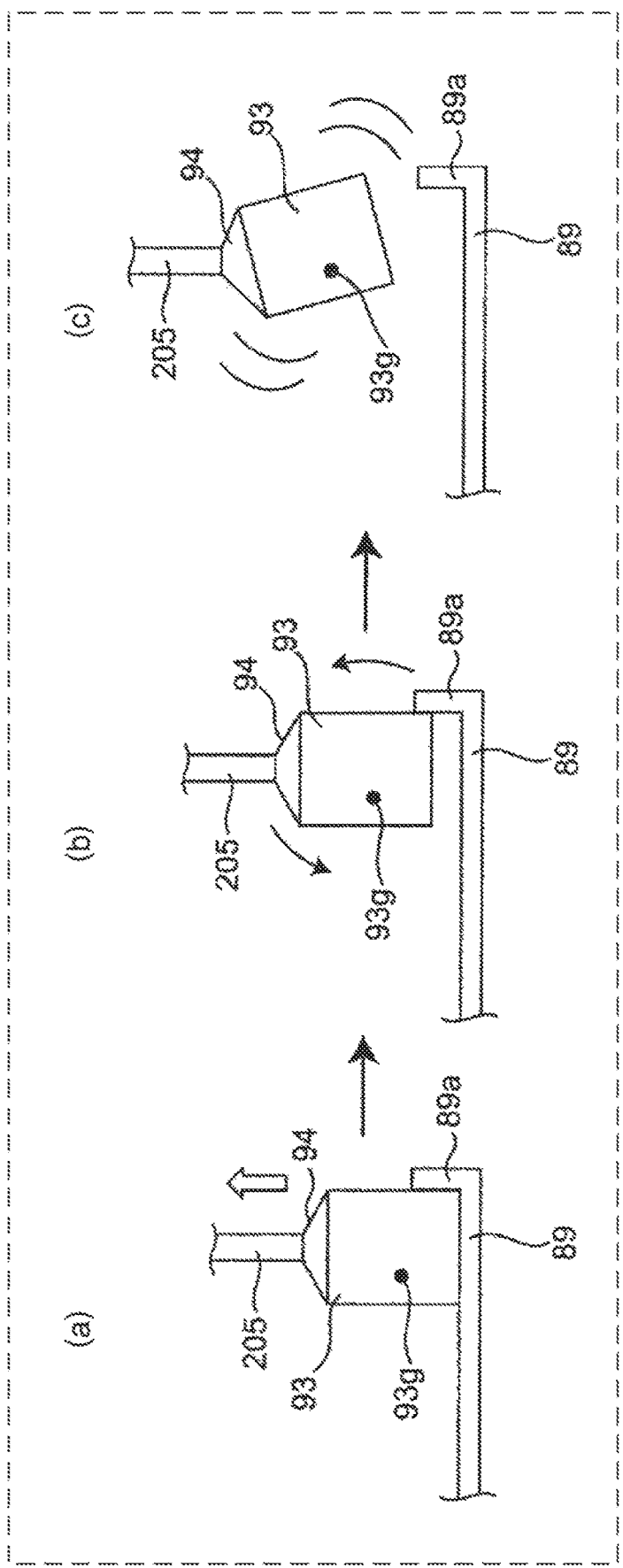
FIG. 30A is a diagram for explaining an example of swinging that occurs when the object placed on the placement board with the fence shown in FIG. 27A is taken out.
Figure 30C:
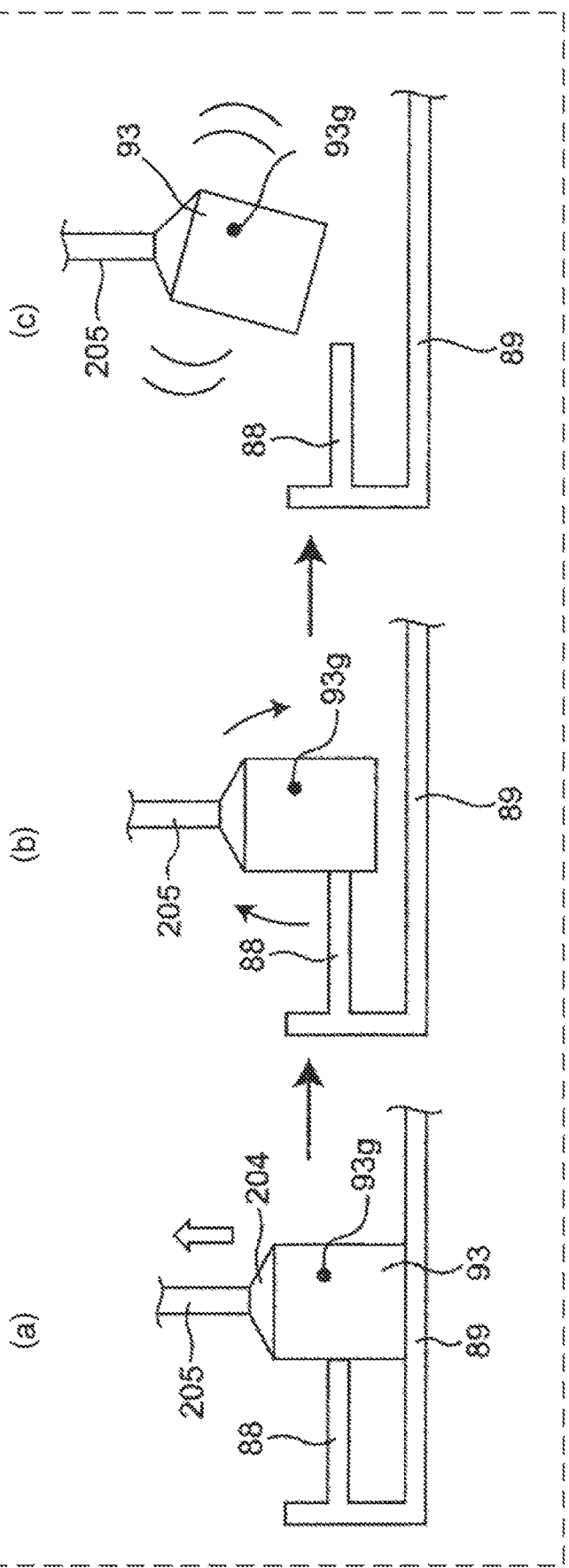
FIG. 30C is a diagram for explaining an example of swinging that occurs when an object placed on the placement board shown in FIG. 27J and supported by a support element is taken out.

FIGS. 30A to 30C respectively show examples of situations in which objects are placed. In the example shown in FIG. 30A, an object 93 is placed on a placement board 89 with a fence such as that shown in FIG. 27A. In the example shown in FIG. 30B, an object 93 is placed on a placement board 89 such as that shown in FIG. 27G. In the example shown in FIG. 30C, an object 93 is placed on a placement board 89 with a support element 88 such as that shown in FIG. 27J. These figures illustrate examples of manners in which the objects 89 swings when the objects 89 are sucked by the suction nozzle 205 and lifted.

First, as shown in (a) in each of FIGS. 30A to 30C, the suction nozzle 205 sucks the object 93 at a suction position which is different from a position (a position corresponding to the center of gravity) in the upper surface at which a vertical direction passing through the center of gravity 93g of the object 93 intersects with the upper surface of the object 93 (in the examples shown in these figures, a position shifted to the left from the position corresponding to the center of gravity is sucked). Thereafter, the object 93 is lifted by the robot arm 201 in a direction perpendicular to a placement surface of the placement board 89 while the object is in contact with the fence 89a, another object 93, or the support element 88.

Next, as shown in (b) in each of FIGS. 30A to 30C, when the lifting height of the object 93 is lower than the height of the fence 89a or other object 93 or the support element 88, the lifted object 93 tries to rotate counterclockwise in FIGS. 30A and 30B or clockwise in FIG. 30C. However, the object 93 is supported by a surrounding environment, that is, the fence 89a, another object 93, or the support element 88, each of which is an example of an adjacent other object, and thus a change in attitude of the object 93 does not occur.

Next, as shown in (c) in each of FIGS. 30A to 30C, when the object 93 is lifted higher than the fence 89a or other object 93 or the support element 88, the support by the fence 89a or other object 93 or the support element 88 is lost, the posture of the object 93 changes such that the center of gravity 93g of the object 93 comes to a position vertically below the suction position, which causes the object 93 to swing.

Thus, also in these modifications, the suction nozzle 205 needs to suck the object 93 at an appropriate suction position. To prevent the object 93 from falling off the suction nozzle 205, as in the embodiments described above, if it is possible to estimate, before the object 93 is fully taken out from the placement table 90, whether or not the object 93 will swing about the suction nozzle 205, then as in the embodiments described above, it is allowed to correct the suction position.

In view of the above, as in the embodiments described above, experiments were performed for estimating swings.

FIG. 31 is a diagram illustrating an example of a situation in which objects 93 are placed on a placement board 89 with a fence inclined by an angle of 20°, and illustrating an example of an operation of taking out one of these objects 93 from the placement board 89 with the fence. Here, among the three situations in which the object 93 is placed described above with reference to FIG. 30A, FIG. 30B, and FIG. 30C, the example shown in FIG. 30A is representatively illustrated. A graph shown in the upper part of FIG. 31 illustrates time-series data of a moment applied to a suction position for a period from period A to a period D after which the object 93 falls down. Note that similar graphs are obtained also for the examples shown in FIG. 30B and FIG. 30C. The lower part of FIG. 31 is an explanatory diagram of the operation performed from period A to period D.

In period A to period C shown in FIG. 31, an object 93 placed on a placement board 89 installed so as to be inclined by an inclination angle θ is pulled up in a direction P perpendicular to the surface of the inclined placement board 89 to a height lower than the height of a fence 89a or a side surface 93h of an adjacent object 93 or a support element 88 (these are generically referred to as a "fence or the like" in the present description with reference to FIG. 31), and the object 93 is temporarily stopped at this height. Thereafter, the object 93 is again pulled up to a height greater than the height of the fence or the like such that the object 93 is fully taken out. A moment acting on a suction position during this operation is measured time serially by the force sensor 204 (see a graph shown at the upper part of FIG. 31). It is experimentally verified that it is possible to estimate, before the object 93 is fully taken out from the placement board 89, based on the measured moment, whether or not the object 93 will have a large swing when the object 93 is fully taken out from the placement board 89.

First, details of the operation are described below. For example, when an object 93 to be sucked and held was given on a placement board 89 inclined by an inclination angle of θ=20°, the robot arm 201 was operated such that the suction position of the suction nozzle 205 comes to the center position 93b (see FIG. 4I) of the object 93. This experiment is denoted as Experiment 3. That is, in period A in FIG. 31, the robot arm 201 is driven such that the suction nozzle 205 came into contact, at the suction position, with the object 93 placed on the placement board 89, and the object 93 is sucked by the suction nozzle 205.

In the following period B, the robot arm 201 is driven such that the object 93 sucked by the suction nozzle 205 is pulled up in a direction denoted by an arrow P by a distance (for example, 7.5 cm) approximately equal to the height of the fence or the like to partially take out the object 93.

In the following period C, the robot arm 201 is driven such that the object 93 sucked by the suction nozzle 205 by a distance (for example, 7.5 cm) approximately equal to the height of the fence or the like such that the object 93 is partially taken out, and the object 93 is temporarily stopped at this height. In this state, the object 93 is not fully taken out from the placement board 89, and a lower half part of the object 93 is in contact with the fence or the like thereby being supported so as not to fluctuate.

After that, in the period D following the period C, the robot arm 201 is driven such that the object 93 is further pulled up from the state in which the object 93 has been partially taken out by being pulled up by the distance (for example, 7.5 cm) approximately equal to the height of the fence or the like up to a height greater than the height of the fence of the like such that the object 93 is fully taken out from the placement board 89. In this period D, when the object 93 is fully taken out from the placement board plate 89 such that the object 93 is separated from the fence or the like, then immediately and suddenly a large moment is applied to the object 93. As a result, the object 93 swung greatly about the suction nozzle 205, which caused the object 93 to come off the suction nozzle 205 and fall down, and thus taking-out of the object 93 was failed.

In the upper part of FIG. 31, time-series data of the moment (in units of Nm) applied to the suction position is shown in the form of a graph from period A to period D, after which the object 93 fell down. In this case, it can be seen that no significant difference in moment occurs between period A and period C, and the difference is smaller than a particular value corresponding to the first threshold value.

Figure 32A:
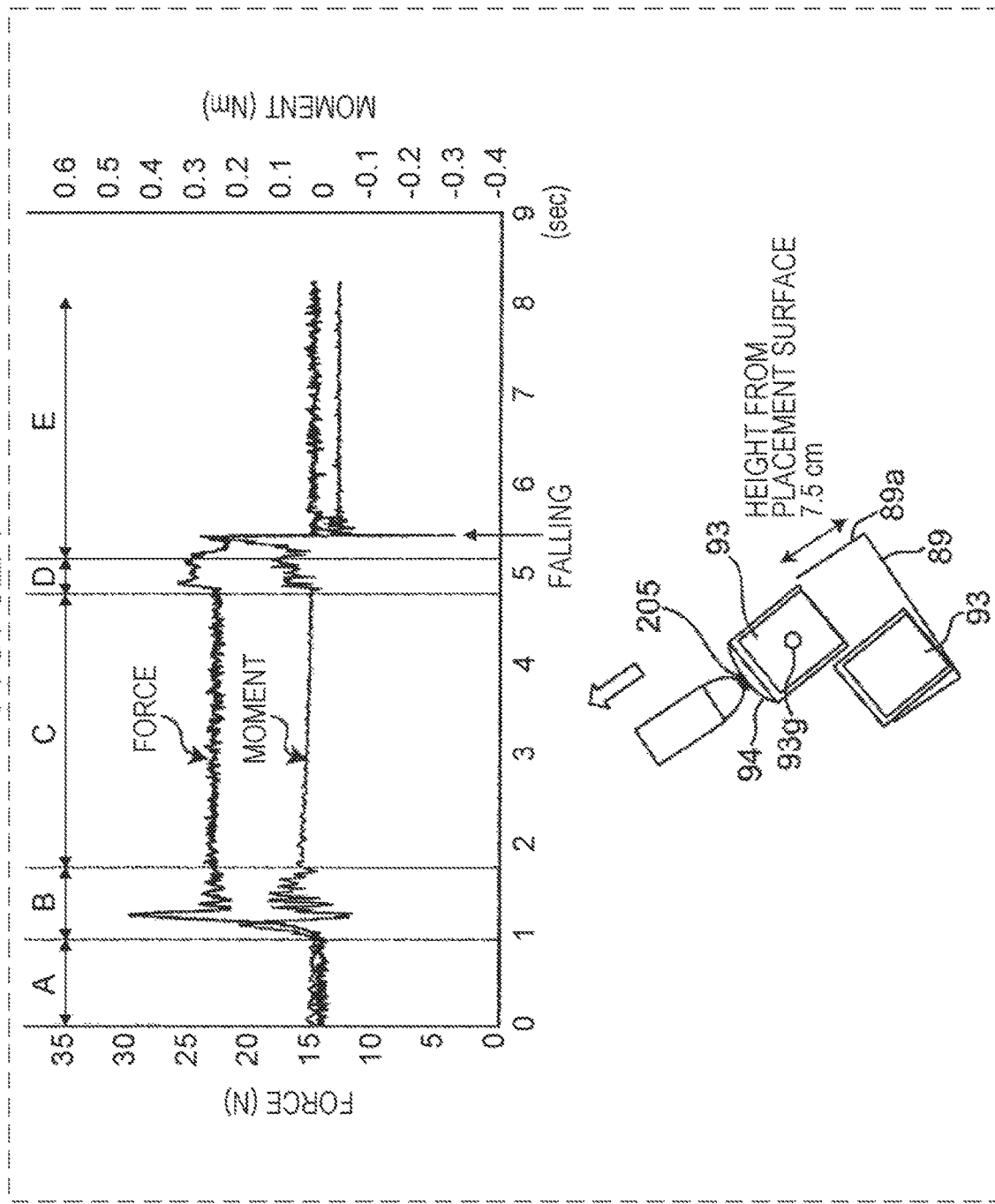
FIG. 32A illustrates, in a graph, time-series data of a moment applied to a suction position for periods A to D and a following period in FIG. 31 in which an object is taken out from a placement board with a fence having a height of 7.5 cm, and the object finally falls down, and also illustrates a situation when the taking-out operation is stopped.

In this Experiment 3, instead of pulling up the object 93 by a distance (for example, 7.5 cm) approximately equal to the height of the fence or the like into the state in which the object 93 is partially taken out as shown in FIG. 31 or FIG. 32A, the object 93 was pulled up by a smaller distance (for example, 0.5 cm) approximately equal to the height of the fence or the like into the state in which the object 93 is partially taken out as shown in FIG. 32B. Even in this case, as in the case shown in FIG. 31 or FIG. 32A, the object 93 fell down from the suction nozzle 205 in period D, and thus taking-out of the object 93 was failed.

Thus, it turned out that even if the height of the fence or the like was changed, and the object 93 was pulled up by the changed distance to partially take out, the object 93 also fell down.

Figure 33B:
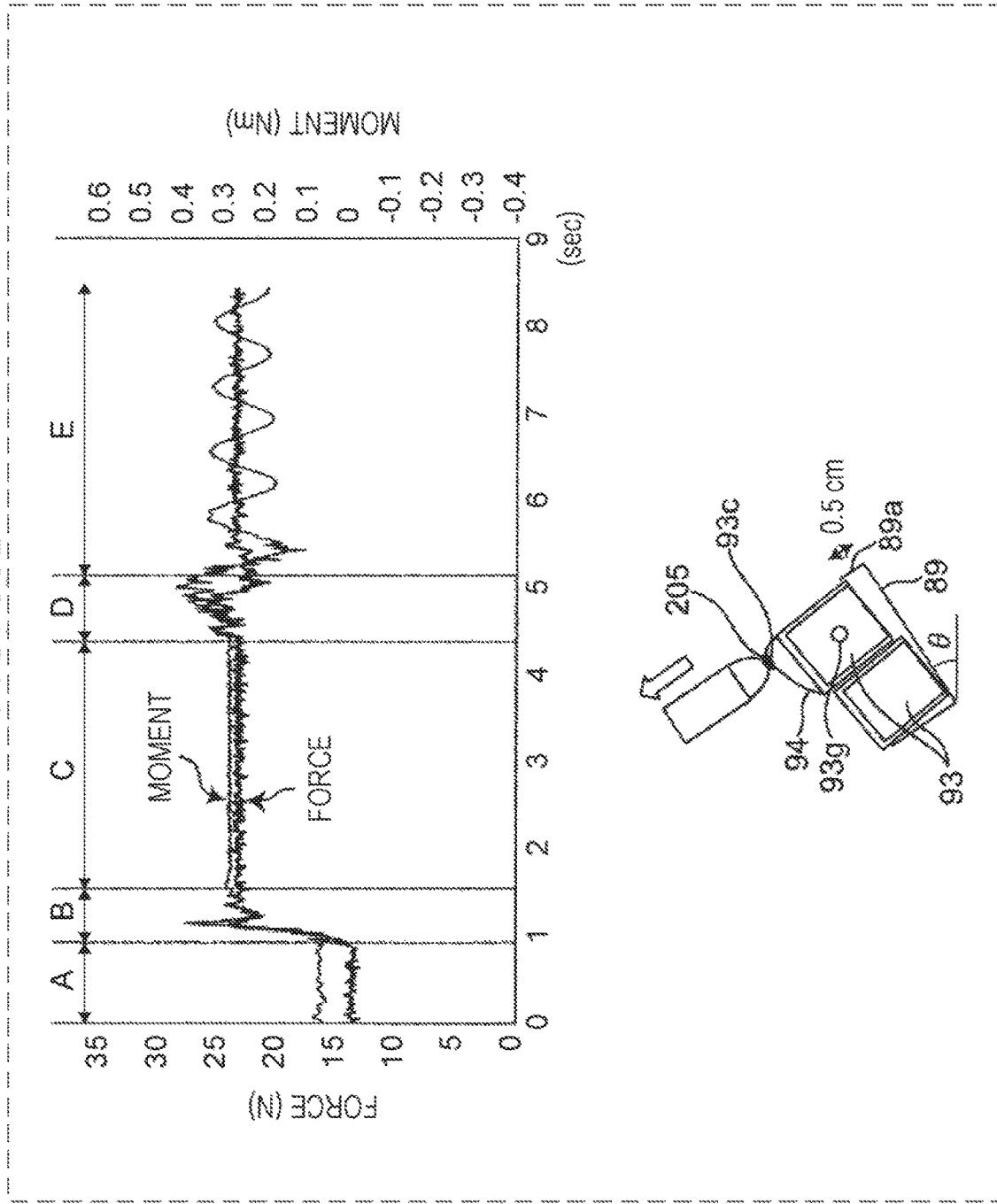
FIG. 33B illustrates, in a graph, time-series data of a moment which is applied to a suction position during a period in which, after the suction position is changed to a position closer to a fence than a center position 93b corresponding to the center of gravity is close to, an operation of taking out an object from a placement board with a fence with a height of 0.5 cm in periods A to D and a following period in FIG. 31 until the object is successfully held by suction, and also illustrates a situation when the taking-out operation is stopped.

In contrast, in FIG. 33 and FIG. 33B, the suction position of the object 93 is changed to a position 93c shifted in a direction of climbing the slope so as to be closer to the fence 89a, which is an example of another object, than the center position 93b of the object 93. Thereafter, in the operation in periods A to D in FIG. 31, the robot arm 201 is operated such that the object 93 is sucked by the suction nozzle 205. That is, the robot arm 201 was operated such that when the object 93 placed on the placement board 89 inclined by an inclination angle of θ=20° was sucked and held, the suction position 93c sucked by the suction nozzle 205 was located at a higher position on the upward slope than the center position 93b of the object 93. This experiment is denoted as Experiment 4.

In this case, when the object 93 was fully taken out from the placement board 89 after period D, the object 93 did not fall down although a small swing occurred. On the top of FIG. 33A and FIG. 33B, time-series data of the moment (in units of Nm) applied to the suction position is shown in the form of a graph for a period from period A to period D and a period thereafter in which the object 93 was held by suction successfully. Note that the operations in periods A, B, and C are respectively the same as the operations A, B, and C shown in FIG. 31, FIG. 32A, and FIG. 32B in Experiment 3. In the operation in period D in Experiment 4, unlike the operation in period D in Experiment 3, no large moment was applied to the object 93, and the operation of fully taking out the object from the placement board 89 was successful. In this case, it can be seen that a large difference in moment occurs between period A and period C in FIG. 33A and FIG. 33B, and the different was as large as corresponding to the first threshold value.

The results obtained in Experiments 3 and 4 indicate that it is possible to estimate the swing that will occur when the object 93 is taken out from the placement board 89 based on the difference in moment applied to the object 93 between period A and period C as in Experiments 1 and 2 described above.

In Experiment 3, as shown in FIG. 31, FIG. 32A, and FIG. 32B, there was almost no difference in the value of the moment between period A and period C. However, in period D in which the object 93 was fully taken out, a large moment was suddenly applied to the object 93, and thus the object 93 fell down from the suction nozzle 205.

On the other hand, in Experiment 4, as shown in FIG. 33A and FIG. 33B, a larger moment than in period A already occurred in period C. As a result, in period D, almost no further increase in the moment from the moment in period C occurred As can be seen from the above description, by comparing the moment that appears when the object 93 is sucked period A and the moment that appears when the object 93 is lifted up to a height equal to the height of the fence or the like, it is possible to estimate the magnitude of the swing that will occur when the object 93 is taken out from the placement board 89.

The results of Experiments 3 and 4 described above are for the case in which the object 93 was placed on the placement board 89 inclined by an inclination angle θ of 20°.

Furthermore, experiments were carried out also for the case where the object 93 was placed on the placement board 89 having inclination angles θ of 0° and 10°.

From Experiments 3 and 4, it can be seen that the behavior of the object 93 is the same regardless of the height up to which the object 93 is lifted in the lifting operation as long as the object 93 is separated from the placement surface. As for the distance of lifting, it is necessary at least to lift the object 93 to a height at which the bottom surface of the object 93 is separated from the placement surface of the placement board 89. For example, the height of the separation from the placement surface may be 0.1 cm. In the experiments, the separation height was 0.5 cm.

It can be seen from the results of Experiments 3 and 4 that when the difference in moment between period A and period C is within an appropriate range depending on the inclination angle θ and shown in FIG. 34 and the situation in which the object 93 is placed as shown in FIGS. 27A, 27G, and 27J, the object 93 does not fall down when the object 93 is taken out from the placement board 89.

For example, in the situation where the object 93 is placed in the manner as shown in FIG. 27A, the appropriate range of the moment is from −0.1 to 0.1 Nm for the inclination angle θ=0°, the appropriate range of the moment is from 0.05 to 0.1 Nm for the inclination angle θ=10°, and the appropriate range of the moment is from 0.1 to 0.15 Nm for the inclination angle θ=20°.

In the situation where the object 93 is placed in the manner as shown in FIG. 27G, the appropriate range of the moment is from −0.1 to 0.1 Nm for the inclination angle θ=0°, the appropriate range of the moment is from 0.1 to 0.2 Nm for the inclination angle θ=10°, and the appropriate range of the moment is from 0.2 to 0.4 Nm for the inclination angle θ=20°.

In the situation where the object 93 is placed in the manner as shown in FIG. 27J, the appropriate range of the moment is from −0.1 to 0.1 Nm for the inclination angle θ=0°, the appropriate range of the moment is from 0.1 to 0.3 Nm for the inclination angle θ=10°, and the appropriate range of the moment is from 0.3 to 0.5 Nm for the inclination angle θ=20°.

Therefore, for example, in the situation in which the object 93 is placed in the manner as shown in FIG. 27G, when the inclination angle θ=20°, if the difference in moment between period A and period C is out of the appropriate moment range from 0.2 to 0.4 Nm, the object 93 falls in the taking-out operation regardless of the height from the placement surface in the lifting operation. Contrarily, if the difference in moment between period A and period C is withing the appropriate moment range from 0.2 to 0.4 Nm, the taking-out operation can be performed successfully without the object 93 falling down regardless of the height from the placement surface in the lifting operation.

As described above, the appropriate range of the moment varies depending on the situation in which the object 93 is placed and the inclination angle θ of the board on which the object 93 is placed. In view of the above, information on the relationship among the inclination angle θ, the situation in which the object 93 is placed, and the appropriate moment is acquired in advance via an experiment as shown in FIG. 34, and the acquired information is stored in a storage unit such as the operation result database, which will be described later. This makes it possible, based on the stored information, the situation in which the object 93 is placed, and the inclination angle θ, to estimate whether or not the object 93 will fall when the object 93 is taken out, from the moment acquired by the moment measurement unit 105 which will be described later. Note that in a case where values fluctuate in period A and period C, for example, the average value of the moments for a predetermined time is used in the estimation.

Figure 35:
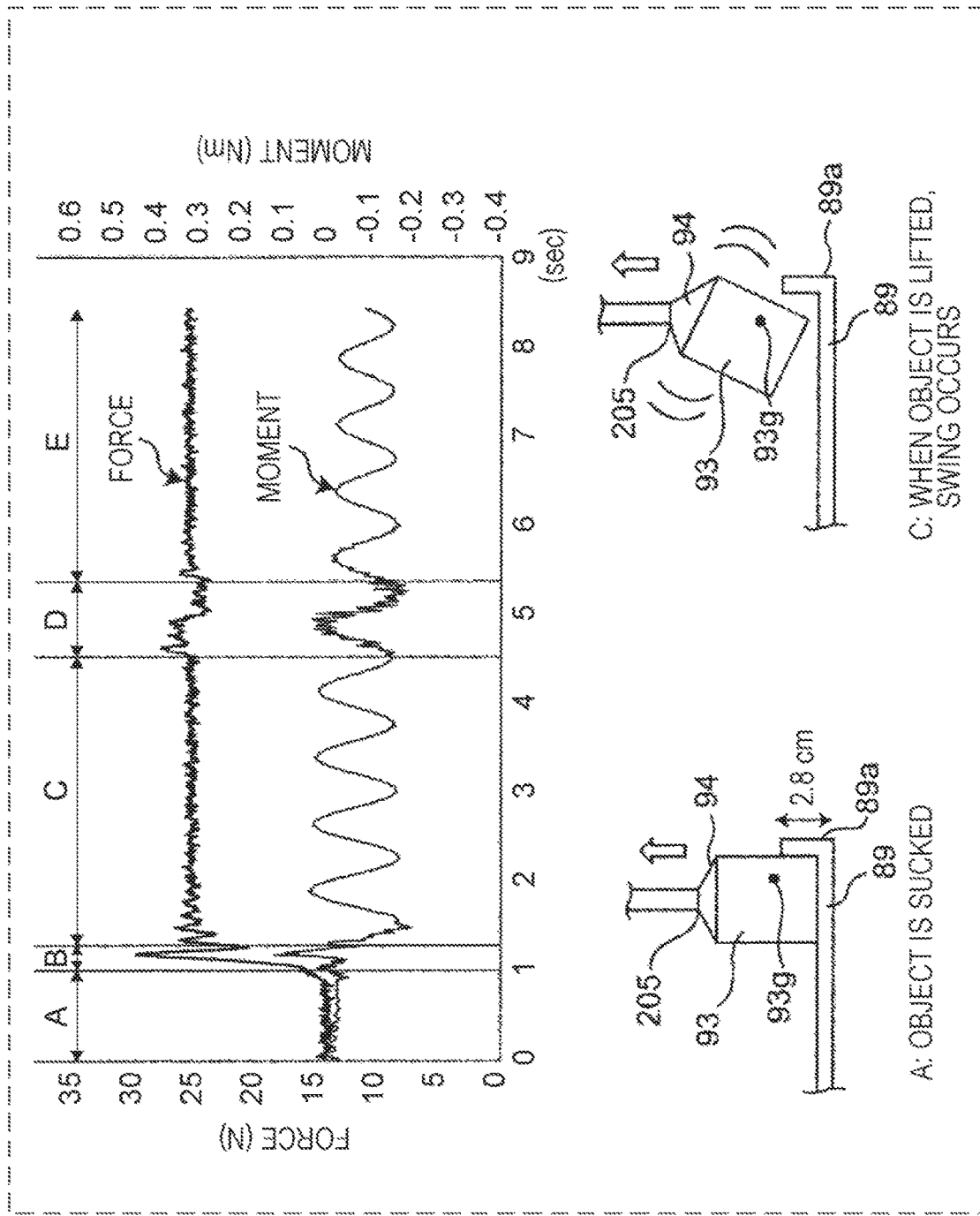
FIG. 35 illustrates, in a graph, time-series data of a moment applied to a suction position that occurs in a case, unlike the situation shown in FIG. 33A, where a taking-out operation is changed as an exceptional operation performed in a situation in which an object is placed as shown in FIG. 27A, and also illustrating the taking-out operation.

In the situation in which the object 93 is placed as shown in FIG. 27A, if the center of gravity 93g is located closer to the fence 89a than the center of the object 93 as shown in FIG. 35, then an exceptional operation is performed, for example, such that the suction position is changed to a position farther away from the fence 89a than the position corresponding to the center of gravity 93g is away from the fence 89a, and then lifting operation in period C is performed. In this case, when the change in the moment when the lifting is temporarily stopped after the lifting operation in period C (that is, the difference between the maximum value and the minimum value) is equal to or greater than a particular value (for example, 0.1 Nm), the taking-out operation can be changed. Examples of the change of the operation include stopping the subsequent operation, issuing a warning, or the like. In this example, the height of the fence 89*a* is 2.8 cm.

In another example, in the situation in which the object 93 is placed as shown in FIG. 27A, if the center of gravity 93*g* is located farther away from the fence 89*a* than the center of the object 93 is away as shown in FIG. 36, then an exceptional operation is performed, for example, such that the suction position is changed to a position closer to the fence 89*a* than the position corresponding to the center of gravity 93*g* is close to, and then lifting operation in period C is performed. In this case, after the lifting operation in period C is performed, the object 93 comes into contact with the fence 89*a* and stops. When the object 93 is further lifted in period E, the object 93 had a large swing because the moment was greater than the maximum appropriate value of the moment (that is, the second threshold value) of 0.1 Nm, although the object 93 did not fall. Also in this case, the taking-out operation may be changed. Examples of the change of the operation include stopping the subsequent operation, issuing a warning, or the like.

It should be noted that although the present disclosure has been described based on the embodiments and the modifications, the present disclosure is not limited to these embodiments and the modifications as a matter of course. For example, the present disclosure also includes the following cases.

Part of or all of the first controller 102 and the second controller 103 may be implemented specifically in a computer system including a microprocessor, a ROM, a RAM, a hard disk unit, a display unit, a keyboard, a mouse, and/or the like. A computer program is stored in the RAM or the hard disk unit. Each controller achieves its function by the microprocessor operating according to the computer program. Here, the computer program is configured by combining instruction codes indicating instructions to the computer so as to achieve a predetermined function.

For example, each component can be realized by a program execution unit such as a CPU reading and executing a software program stored in a storage medium such as a hard disk or a semiconductor memory.

Software that realizes part or all of the elements forming each controller in the above-described embodiments or modifications is a program such as that described below.

That is, the program is a program for controlling an actuator apparatus to perform an operation of taking out an object from a placement table while sucking the object with a suction nozzle, the objects being placed on the placement table such that side surfaces of the objects are in contact with each other, the actuator apparatus including the actuator apparatus including an actuator, a first setter, an operation controller, and a first acquirer, the actuator including the suction nozzle for sucking the object, the program causing a computer to have a function of sucking the object at a first suction position by the suction nozzle and taking out the object from the placement table while a side surface of the object is in contact with another object; a function for the first setter to set a taking-out movement distance by which the actuator is to move the object from the placement table; a function for the operation controller to control the sucking and taking-out operation of the actuator; a function for the first acquirer to acquire a moment applied to the suction nozzle, (i) a function for the first acquirer to acquire a difference in the moment between a first moment applied to the suction nozzle when the object is sucked by the suction nozzle and a second moment applied to the suction nozzle when the object is taken out by a first taking-out movement distance by the suction nozzle from the placement table, where the first taking-out movement distance is a distance by which the object is moved until the object is taken out from the placement table, and (ii) a function for the operation controller to control whether or not to further continue the taking-out operation based on the difference between the first and second moments acquired by the first acquirer.

The program may be downloaded from a server or the like and executed, or the program may be stored in a predetermined storage medium (for example, an optical disk such as a CD-ROM, a magnetic disk, or a semiconductor memory) and the program may be read out from the storage medium and executed.

As for the computer that executes the program, a single computer or computers may be employed. That is, centralized processing may be performed or distributed processing may be performed.

By properly combining arbitrary embodiments or modifications of the above-described various embodiments or modifications, the effects thereof can be realized. Furthermore, a combination of aspects, a combination of embodiments, and a combination of aspects and embodiments are possible. Furthermore, a combination of features of different aspects or embodiments is also possible.

INDUSTRIAL APPLICABILITY

An actuator apparatus, a method for taking out an object using the actuator apparatus, and an object taking-out system according to the present disclosure are applicable to an actuator apparatus having an actuator such as a robot arm which has a holding mechanism by suction and is capable of autonomously operating.

What is claimed is:

1. An actuator apparatus, comprising:
an actuator including a suction nozzle for sucking a first object;
a setter;
an operation controller; and
an acquirer,
wherein:
the actuator is configured to take out the first object from a placement table while the suction nozzle sucks the first object at a suction position and a side surface of the first object is in contact with a side surface of a second object, the first object and the second object being on the placement table with the side surface of the first object being in contact with the side surface of the second object before the suction nozzle sucks the first object;
the setter is configured to set a taking-out movement distance by which the first object is to be moved by the actuator from the placement table;
the operation controller is configured to control a sucking operation of the actuator and a taking-out operation of the actuator;
the acquirer is configured to acquire a moment applied to the suction nozzle;
the acquirer is configured to acquire, as the moment, a difference between a first moment applied to the suction nozzle when the first object is sucked by the suction nozzle and a second moment applied to the suction nozzle when the first object is taken out by a first taking-out movement distance by the suction nozzle from the placement table;

the first taking-out movement distance is a distance by which the first object is moved until the first object is taken out from the placement table, the first object being in contact with the second object immediately after the first object is moved by the first taking-out movement distance; and the operation controller is configured to control whether or not to further continue the taking-out operation based on the difference between the first moment and the second moment.

2. The actuator apparatus according to claim 1, wherein:
the placement table is a packing box; and
the suction nozzle is configured to suck the first object and take the first object out from the packing box while the first object is in contact with an inner wall of the packing box.

3. The actuator apparatus according to claim 1, wherein the first object is a rectangular parallelepiped.

4. The actuator apparatus according to claim 1, wherein the operation controller is configured to perform control such that: (i) in a first case where the difference between the first moment and the second moment is equal to or greater than a threshold value, the taking-out operation is continued; and (ii) in a second case where the difference between the first moment and the second moment is smaller than the threshold value, the taking-out operation is not continued and is stopped.

5. The actuator apparatus according to claim 1, wherein:
the setter is a first setter, and the suction position is a first suction position;
the actuator apparatus further comprises a second setter configured to set a second suction position at which the first object is to be sucked by the suction nozzle;
in a case where the taking-out operation is stopped and the first object is returned to a state in which the first object is placed before the first object is taken out from the placement table, the second setter is configured to set the second suction position so as to be different from the first suction position; and
the operation controller is configured to perform control such that the first object is sucked at the second suction position and the taking-out operation is performed.

6. The actuator apparatus according to claim 1, wherein the operation controller is configured to perform control such that, based on the difference between the first moment and the second moment, the taking-out operation is further continued and the first object is moved by a distance greater than the first taking-out movement distance and greater than a height of the first object so that the first object is taken out from the placement table to an outside of the placement table.

7. The actuator apparatus according to claim 1, wherein the suction position of the first object is covered with vinyl or cellophane.

8. The actuator apparatus according to claim 1, wherein the placement table is on a shelf board inclined by an acute inclination angle.

9. The actuator apparatus according to claim 1, wherein the placement table is on a shelf board with an inclination angle of 0°.

10. The actuator apparatus according to claim 1, wherein:
the operation controller is configured to control a suction pressure at the suction position to be changeable between a first suction pressure and a second suction pressure higher than the first suction pressure; and
the operation control is configured to, when the taking-out operation is not continued, perform further control such that: (i) after the taking-out operation is stopped and the first object is returned to an original position on the placement table, the suction pressure at the suction position is changed from the first suction pressure to the second suction pressure; and (ii) the actuator is controlled such that the first object is sucked at the suction position and the taking-out operation is performed again, the difference between the first moment and the second moment is acquired again, and additional control is performed whether or not to further continue the taking-out operation.

11. The actuator apparatus according to claim 1, wherein in a case where the difference between the first moment and the second moment is equal to or greater than a first threshold value and is greater than a second threshold value, the operation controller is configured to perform control such that the taking-out operation is not continued and is stopped.

12. An object taking-out method, comprising:
setting, by a setter, a taking-out movement distance by which a first object is to be moved by an actuator including a suction nozzle for sucking the first object from a placement table on which the first object and a second object are placed with a side surface of the first object being in contact with a side surface of the second object before the suction nozzle sucks the first object, and controlling, by an operation controller, a suction operation performed by the actuator and a taking-out operation performed by the actuator such that the first object is sucked by the suction nozzle at a suction position and taken out from the placement table while the side surface of the first object is in contact with the side surface of the second object;
acquiring, by an acquirer, as a moment applied to the suction nozzle, a difference between a first moment applied to the suction nozzle when the first object is sucked by the suction nozzle and a second moment applied to the suction nozzle when the first object is taken out by a first taking-out movement distance by the suction nozzle from the placement table,
wherein the first taking-out movement distance is a distance by which the first object is moved until the first object is taken out from the placement table, the first object being in contact with the second object immediately after the first object is moved by the first taking-out movement distance; and
controlling, by the operation controller, based on the difference between the first moment and the second moment, whether or not the taking-out operation is further continued.

13. A non-transitory computer-readable storage medium having a program stored thereon for causing a computer to perform an object taking-out method, the object taking-out method comprising:
setting, by a setter, a taking-out movement distance by which a first object is to be moved by an actuator including a suction nozzle for sucking the first object from a placement table on which the first object and a second object are placed with a side surface of the first object being in contact with a side surface of the second object before the suction nozzle sucks the first object, and controlling, by an operation controller, a suction operation performed by the actuator and a taking-out operation performed by the actuator such that the first object is sucked by the suction nozzle at a suction position and taken out from the placement table while the side surface of the first object is in contact with the side surface of the second object;

acquiring, by an acquirer, as a moment applied to the suction nozzle, a difference between a first moment applied to the suction nozzle when the first object is sucked by the suction nozzle and a second moment applied to the suction nozzle when the first object is taken out by a first taking-out movement distance by the suction nozzle from the placement table, wherein the first taking-out movement distance is a distance by which the first object is moved until the first object is taken out from the placement table, the first object being in contact with the second object immediately after the first object is moved by the first taking-out movement distance; and controlling, by the operation controller, based on the difference between the first moment and the second moment, whether or not the taking-out operation is further continued.

14. An object taking-out system, comprising:

actuator apparatuses disposed in respective environments, each of the actuator apparatuses including an operation controller, an acquirer, and an actuator including a suction nozzle for sucking a first object;

a setter;

a server;

an operation target object database; and an operation result database, wherein:

the server is connected to each of the actuator apparatuses, the setter, the operation target object database, and the operation result database;

each of the actuators is configured to take out the first object from a placement table while one of the suction nozzles sucks the first object at a suction position and a side surface of the first object is in contact with a side surface of a second object, the first object and the second object being on the placement table with the side surface of the first object being in contact with the side surface of the second object before the one of the suction nozzles sucks the first object;

the setter is configured to set a taking-out movement distance by which the first object is to be moved by one of the actuators from the placement table, and store the taking-out movement distance in the operation target object database via the server;

the operation controller is configured to control a sucking operation by one of the actuators and a taking-out operation by the one of the actuators based on the taking-out movement distance, the acquirer is configured to acquire a moment applied to the one of the suction nozzles;

the acquirer is configured to acquire, as the moment, a difference between a first moment applied to the one of the suction nozzles when the first object is sucked by the one of the suction nozzles and a second moment applied to the one of the suction nozzles when the first object is taken out by a first taking-out movement distance by the one of the suction nozzles from the placement table, where the first taking-out movement distance is a distance by which the first object is moved until the first object is taken out from the placement table, the first object being in contact with the second object immediately after the first object is moved by the first taking-out movement distance; and the operation controller is configured to control whether or not to further continue the taking-out operation based on the difference between the first moment and the second moment.

15. An object taking-out method, comprising:

setting a distance by which a first object is to be moved from among objects including the first object and a second object;

causing a suction nozzle of an actuator apparatus to suck a first part of the first object;

acquiring, in a first period starting immediately after the sucking, first moments output by a force sensor;

causing arms of the actuator apparatus to move the first object immediately after the first period;

causing the arms to stop moving the first object when the first object moves by the distance such that the first object touches the second object before the suction nozzle sucks the first part of the first object and immediately after the arms stop moving the first object;

acquiring, in a second period starting immediately after the stopping, second moments output by the force sensor;

continuing the stopping over the second period; and causing the suction nozzle to suck a second part of the first object which is different from the first part of the first object in a case where an average value of the second moments is equal to or greater than a sum of an average value of the first moments and a predetermined value, wherein the force sensor is between the suction nozzle and the arms.

16. An apparatus, comprising:

an actuator having a suction nozzle;

a setter configured to set a distance; and a computer for controlling the actuator, wherein the computer is configured to perform, when the suction nozzle sucks a first object from among objects including the first object and a second object placed on a placement table with a side surface of the first object being in contact with a side surface of the second object and the first object is taken out from the placement table with the side surface of the first object being in contact with the side surface of the second object:

acquiring a difference between a first moment applied to the suction nozzle when the first object is sucked by the suction nozzle and a second moment applied to the suction nozzle when the first object is in a process of being taken out by the suction nozzle, the process including moving the first object by the distance, and the first object being in contact with the second object immediately after the first object is moved by the distance; and controlling, based on the difference between the first moment and the second moment, whether or not the taking-out operation is to be further continued.

* * * * *